(12) United States Patent  
Deb et al.

(10) Patent No.: US 9,201,720 B2  
(45) Date of Patent: Dec. 1, 2015

(54) FLEXRAY NETWORK RUNTIME ERROR DETECTION AND CONTAINMENT

(71) Applicant: NXP B.V., Eindhoven (NL)

(72) Inventors: Abhijit Kumar Deb, Eindhoven (NL); Alexander Kordes, Kirchhundem (DE); Hubertus Gerardus Hendrikus Vermeulen, Eindhoven (NL)

(73) Assignee: NXP B.V., Eindhoven (NL)

( * ) Notice: Subject to any disclaimer, the term of this patent is extended or adjusted under 35 U.S.C. 154(b) by 327 days.

(21) Appl. No.: 13/959,009

(22) Filed: Aug. 5, 2013

(65) Prior Publication Data

US 2014/0047282 A1    Feb. 13, 2014

Related U.S. Application Data

(60) Provisional application No. 61/682,469, filed on Aug. 13, 2012.

(51) Int. Cl.
| | |
|---|---|
| *G06F 11/00* | (2006.01) |
| *G06F 11/07* | (2006.01) |
| *H04L 12/40* | (2006.01) |
| *H04L 12/24* | (2006.01) |
| *H04L 12/26* | (2006.01) |

(52) U.S. Cl.
CPC ........ *G06F 11/0751* (2013.01); *H04L 12/2602* (2013.01); *H04L 12/40026* (2013.01); *H04L 41/06* (2013.01); *H04L 2012/40241* (2013.01); *H04L 2012/40273* (2013.01)

(58) Field of Classification Search
CPC ................. H04L 2012/40241; G06F 11/0796; G06F 11/076
See application file for complete search history.

(56) References Cited

U.S. PATENT DOCUMENTS

| | | | | |
|---|---|---|---|---|
| 7,586,953 B2* | 9/2009 | Forest | ................... | H03M 13/43 370/230 |
| 8,194,533 B2* | 6/2012 | Johansson | .............. | G06F 11/004 370/216 |
| 8,917,628 B2* | 12/2014 | Steiner | .................. | H04J 3/0652 370/254 |
| 2004/0081079 A1* | 4/2004 | Forest | ................... | H03M 13/43 370/216 |
| 2006/0015231 A1* | 1/2006 | Yoshimura | ............... | B60K 6/46 701/48 |
| 2007/0133612 A1* | 6/2007 | Hatanaka | .............. | H04J 3/0638 370/503 |
| 2009/0089627 A1* | 4/2009 | Matsubara | .......... | G06F 11/0709 714/48 |
| 2009/0122812 A1* | 5/2009 | Steiner | .................. | H04J 3/0652 370/503 |
| 2009/0125592 A1* | 5/2009 | Hartwich | ................ | H04L 49/90 709/206 |
| 2009/0262649 A1* | 10/2009 | Zinke | ...................... | H04L 43/00 370/242 |
| 2010/0014439 A1* | 1/2010 | Fuhrmann | ......... | H04L 12/40013 370/252 |
| 2010/0262689 A1* | 10/2010 | Ungermann | ...... | H04L 12/40032 709/224 |
| 2011/0137510 A1* | 6/2011 | Tsai | ....................... | G07C 5/008 701/31.4 |

OTHER PUBLICATIONS

S. Cranen "Model Checking the FlexRay startup phase", Computer Science Reports 12-01, Eindhoven, Jan. 2012.
FlexRay Communications System—Preliminary Central Bus Guardian Specification, Version 2.0.9, 2004.
FlexRay Communications System Protocol Specification Version 3.0.1, 2006.

* cited by examiner

*Primary Examiner* — Loan L. T. Truong

(57) ABSTRACT

A FlexRay network guardian including: a resetting leading coldstart node (RLCN) detector configured to detect a RLCN failure; a deaf coldstart node (DCN) detector configured to detect a DCN failure; a babbling idiot (BI) detector configured to detect a BI failure; and a FlexRay network decoder configured to output a signal regarding the status of the FlexRay network to the RLCN detector, DCN detector, and BI detector, wherein the RLCN detector, DCN detector, and BI detector are configured to send an indication of a failure to a containment module.

19 Claims, 31 Drawing Sheets

```
dcl zStartupCycle              T_CycleCounter;
dcl vRF                        T_ReceiveFrame;
dcl vRH                        T_Header;
dcl zBranch                    T_Branch;
dcl vBranch                    T_Branch;
dcl zStartupNodeID             T_FrameID;
dcl zSyncCalcResult            T_SyncCalcResult;
dcl zStartupX                  T_SyncFrameIDCount;
dcl zRefX                      Boolean;
dcl zLeader                    Boolean;
dcl zCritical                  Boolean;
dcl vRemainingColdstartAttempts  Integer;
dcl zError                     T_RLCNDetectorError;

µT timer tSecondFrame          := pMicroPerCycle + pRateCorrectionOut;
```

FIG. 30

```
dcl vRF              T_ReceiveFrame;
dcl zBranch          T_BranchNumber;
dcl vBranch          T_BranchNumber;
dcl vHR              T_ReceiveHeader;
dcl zStartupNodeID   T_FrameID;
dcl zSyncCalcResult  T_SyncCalcResult;
dcl zStartupX        T_SyncFrameIDCount;
dcl zRefX            Boolean;
dcl vCASPermission   Boolean;
dcl zCriticalPhase   Boolean;
dcl vCASSend         Boolean;
dcl zBit             T_BitLevel;
dcl zErrorDetection  T_DCNDetectorError;

µT timer tAllowCAS   := pdCCSListenTimeout;
```

FIG. 35

```
dcl vSlotCounter       T_SlotCounter;
dcl vCycleCounter      T_CycleCounter;
dcl zDecodingError     T_DecodingError;
dcl vCEAllowed         Boolean;
dcl vErrorCnt          Integer;
dcl vBranch            T_Branch;

ST timer tFrameEnd     := (aFrameLength + cChannelIdleDelimiter) * cSamplesPerBit
```

FLEXRAY NETWORK RUNTIME ERROR DETECTION AND CONTAINMENT

CROSS-REFERENCE TO RELATED APPLICATIONS

This application is a non-provisional application claiming benefit to provisional Application No. 61/682,469, filed on Aug. 13, 2012. The entire disclosure of the prior application is hereby incorporated by reference herein in its entirety.

TECHNICAL FIELD

Various exemplary embodiments disclosed herein relate generally to FlexRay network runtime error detection and containment.

BACKGROUND

In-vehicle communication in today's automotive sector gives rising requirements on robustness and high data rates. The number of sensors and actuators increases with almost every new invented technology. Comfort orientated and safety critical systems, and even telematics are embedded in a vehicle. The latest requirement is x-by-wire (x=Brake, Steer, . . . ), where the mechanical parts of safety critical systems are replaced by electronic systems. This saves material costs in production and lets companies build lighter and more efficient cars. Communication protocols for these purposes are used to gain the management of complexity, in matters of the data transfer, the fault detection and the fault containment.

In a vehicle the electronic systems are connected to electronic control units (ECU), sensors and actuators. As a result, the number of ECUs, the complexity of the networks and the complexity of the communication increases.

In today's vehicles, usually more than one communication network is used. Different networks are used for different applications. For example, the climate control has different requirements for robustness and data rates versus the air bag system in the side crash region of a vehicle. For safety and mission critical applications in vehicles, FlexRay networks may be used.

The safety relevant difference versus older systems is, that x-by-wire systems have to be protected from software and hardware faults, in order not to endanger the passengers. This leads to high speed real-time communication and the highest possible robustness as requirements for those systems. Accordingly there is a need to increase the robustness of FlexRay networks through runtime error detection and containment.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a FlexRay network guardian including: a resetting leading coldstart node (RLCN) detector configured to detect a RLCN failure; a deaf coldstart node (DCN) detector configured to detect a DCN failure; a babbling idiot (BI) detector configured to detect a BI failure; and a FlexRay network decoder configured to output a signal regarding the status of the FlexRay network to the RLCN detector, DCN detector, and BI detector, wherein the RLCN detector, DCN detector, and BI detector are configured to send an indication of a failure to a containment module.

Further, various exemplary embodiments relate to a FlexRay network guardian including: a resetting leading coldstart node (RLCN) detector configured to detect a RLCN failure; a deaf coldstart node (DCN) detector configured to detect a DCN failure; a babbling idiot (BI) detector configured to detect a BI failure; a FlexRay network decoder connected to the RLCN detector, DCN detector, and BI detector; a protocol operation control device connected to the FlexRay network decoder, RLCN detector, DCN detector, and BI detector; a macrotick generation device connected to the protocol operation control device, RLCN detector, DCN detector, and BI detector; a clock synchronization processing device connected to the protocol operation control device, macrotick generation device, RLCN detector, DCN detector, and BI detector; a frame and symbol processing device connected to the protocol operation control device, clock synchronization processing device, FlexRay network decoder, RLCN detector, DCN detector, and BI detector; a media access control device connected to the protocol operation control device, macrotick generation device, frame and symbol processing device, RLCN detector, DCN detector, and BI detector, wherein the RLCN detector, DCN detector, and BI detector receive signals regarding the status of the FlexRay network from the media access control device, the macrotick generation device, the frame and symbol processing device, the clock synchronizing processing device, FlexRay network decoder, and the protocol operation control device, wherein the RLCN detector, DCN detector, and BI detector are configured to send an indication of a failure to a containment module.

Further, various exemplary embodiments relate to a resetting leading coldstart node (RLCN) detector configured to detect a RLCN failure on a FlexRay network including: a header detector configured to detect a valid header for a received communication event (CE) on the FlexRay network; a trailer validator configured to detect a valid trailer for the received CE on the FlexRay network after the valid header has been detected; a RLCN synchronization analyzer configured to analyze a synchronization state of the FlexRay network during a cold start process; a CE start state detector configured to detect when the FlexRay network is in a CE start state; and a RLCN synchronization error detector configured to detect when a synchronization error occurs on the FlexRay network during the cold start process.

Further, various exemplary embodiments relate to a method of detecting a resetting leading coldstart node (RLCN) failure on a FlexRay network including: receiving a communication event (CE) from the FlexRay network; detecting a valid header for the received CE on the FlexRay network; detecting a valid trailer for the received CE on the FlexRay network after the valid header has been detected; analyzing a synchronization state of the FlexRay network during a cold start process; detecting when the FlexRay network is in a CE start state; and detecting when a synchronization error occurs on the FlexRay network during the cold start process.

Further, various exemplary embodiments relate to a method of detecting a deaf coldstart node (DCN) failure on a FlexRay network including: receiving a plurality of communication events (CE) from the FlexRay network; detecting a first and second decoded collision avoidance symbol (CAS) during an allowed CAS time window, wherein the first decoded CAS and the second decoded CAS are a first CE and a second CE of the plurality of CEs; detecting that a decoded CAS is too long, wherein the decoded CAS is a third received CE; detecting a potential frame start for a fourth received CE then detecting a decoding error or detecting if a the fourth CE header is valid; and detecting that a fifth received CE is a channel idle recognition point (CHIRP).

Further, various exemplary embodiments relate to deaf coldstart node (DCN) detector configured to detect a DCN failure on a FlexRay network including: a network interface that receives a communication event (CE) from the FlexRay network; a detector circuit configured to: detect a first and second decoded collision avoidance symbol (CAS) during an allowed CAS time window; detect that a decoded CAS is too long; detect a potential frame start for a received CE then detecting a decoding error or detects if the CE header is valid; and detect that received CE is a channel idle recognition point (CHIRP).

Further, various exemplary embodiments relate to a method of detecting a babbling idiot (BI) failure on a FlexRay network including: receiving a plurality of communication events (CE) from the FlexRay network; detecting for a first CE a CE decoding error or a CE content error on the FlexRay network; incrementing an error count; detecting a potential CE frame start for the second received CE then detecting a decoding error or detecting if the second CE header is valid; and determining if the error count exceeds an error count threshold; and indicating a BI failure if the error count exceeds an error count threshold.

Further, various exemplary embodiments relate to a deaf babbling idiot (BI) detector configured to detect a BI failure on a FlexRay network including: a network interface that receives a communication event (CE) from the FlexRay network; a detector circuit configured to: detect a CE decoding error or a CE content error on the FlexRay network; increment an error count; detect a potential CE frame start for the received CE then detecting a decoding error or detecting if the CE header is valid; and determine if the error count exceeds an error count threshold; and indicate a BI failure if the error count exceeds an error count threshold.

In various embodiments, the RLCN detector, DCN detector, and BI detector receive signals regarding the status of the FlexRay network from a media access control device, a macrotick generation device, a frame and symbol processing device, a clock synchronizing processing device, and a protocol operation control device.

In various embodiments, the containment module disables a single node in a FlexRay network.

In various embodiments, the containment module disables a network branch in a FlexRay network.

In various embodiments, a portion of the received signals regarding the status of the FlexRay network are extensions to the FlexRay network protocol.

In various embodiments, the BI detector is further configured to: set a timer upon the detection of the BI failure; upon expiration of the set timer, determining that the BI failure has ceased; sending an indication to the containment module that the BI failure has ceased.

In various embodiments, detecting a BI failure includes detecting a decoding error or a content error on the FlexRay network, incrementing an error count, and determining if the error count exceeds an error count threshold.

In various embodiments, detecting a RLCN failure includes detecting leading coldstart node resetting during one of a plurality of predetermined time periods indicative of a RLCN failure.

In various embodiments, detecting a DCN failure includes detecting when a second check failure occurs.

In various embodiments, detecting a DCN failure includes detecting when a second collision avoidance symbol (CAS) error occurs.

In various embodiments, wherein detecting a DCN failure includes detecting when multiple nodes on a branch are sending data at the same time on the FlexRay network.

In various embodiments, further include after detecting a potential frame start for the fourth received CE then detecting a decoding error or detects if the fourth CE header is valid, determining if the fourth CE is transmitted during a critical phase.

In various embodiments, further include detecting that the a CAS decoding error is not a CAS too long decoding error.

In various embodiments, further include after detecting that the fifth received CE is a CHIRP, waiting for a next CE to start.

In various embodiments, further include determining if the received CE is allowed, and if not indicating a BI failure.

BRIEF DESCRIPTION OF THE DRAWINGS

In order to better understand various exemplary embodiments, reference is made to the accompanying drawings, wherein:

FIG. 30 illustrates the declarations for the RLCN detection process;

FIG. 35 illustrates the declarations for the DCN detector;

To facilitate understanding, identical reference numerals have been used to designate elements having substantially the same or similar structure and/or substantially the same or similar function.

DETAILED DESCRIPTION

Figure 1:
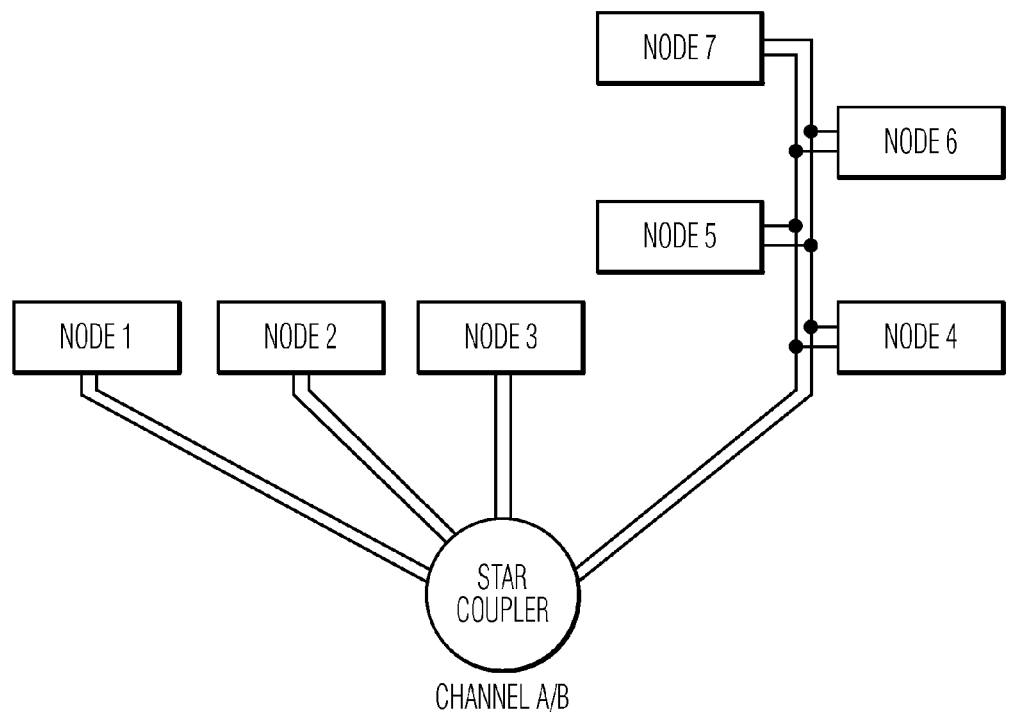
FIG. 1 illustrates a FlexRay network with a hybrid topology.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

FlexRay Bus Protocol Overview

FlexRay is a bus protocol that combines high speed time triggered bus communication with event triggered communication. The communication cycles are divided into defined periodic time slots. The protocol provides basic fault detection mechanisms.

The goal of the development of FlexRay was the development of a complete communication system. This comprises the FlexRay protocol, the physical layer, tools for the configuration, and bus analysis.

The main requirements for the protocol are: high data rates (up to 10 Mbit/s per channel); redundancy (up to two channels); synchronized time base; time- and event-triggered behavior; guaranteed message transmission; and extendibility of an existing network without reconfiguration.

Because of the high data rate, it is also possible to use FlexRay as a backbone in the vehicle, to connect different networks. The protocol is used for hard real time applications because of the guaranteed cycle time with only minimal fluctuations. With extensions of the protocol it is also possible to use it in safety critical applications, like x-by-wire. In the following sections we describe the relevant parts of the FlexRay specification, in more detail.

FlexRay Bus Protocol Details

The FlexRay Protocol Specification version 3.0.1 was released in 2010. See Protocol Specification, Version 3.0.1, FlexRay Consortium, October 2010. Available online: http://www.flexray.com. The description of the FlexRay Protocol below is based on this protocol version. The specification is divided into the physical and data link layer of the OSI model. The electrical physical layer specification and the FlexRay protocol specification define these two layers.

First possible topologies and the basic components in a FlexRay system are described below. Then a more detailed view of the relevant parts of the protocol specification is described blow. Especially, the startup phase is described in detail.

FlexRay Topologies

FlexRay was developed for a two channel topology but can also be used with only one channel. The topology for a single channel may be a bus, star or a hybrid network. FIG. 1 illustrates a FlexRay network with a hybrid topology. The network includes seven nodes and a star coupler for each channel. Star and hybrid topologies may be implemented with active or passive star couplers. Both of these star couplers have electrical connections, also called branches. A passive star coupler is a connection point for nodes and bus lines. It has no active components. An active star coupler is a component that can increase the signal strength. It is possible to connect nodes or a whole bus to the branches of the star. Hence, a FlexRay system may include an active or passive star coupler.

FlexRay ECU

Figure 2:
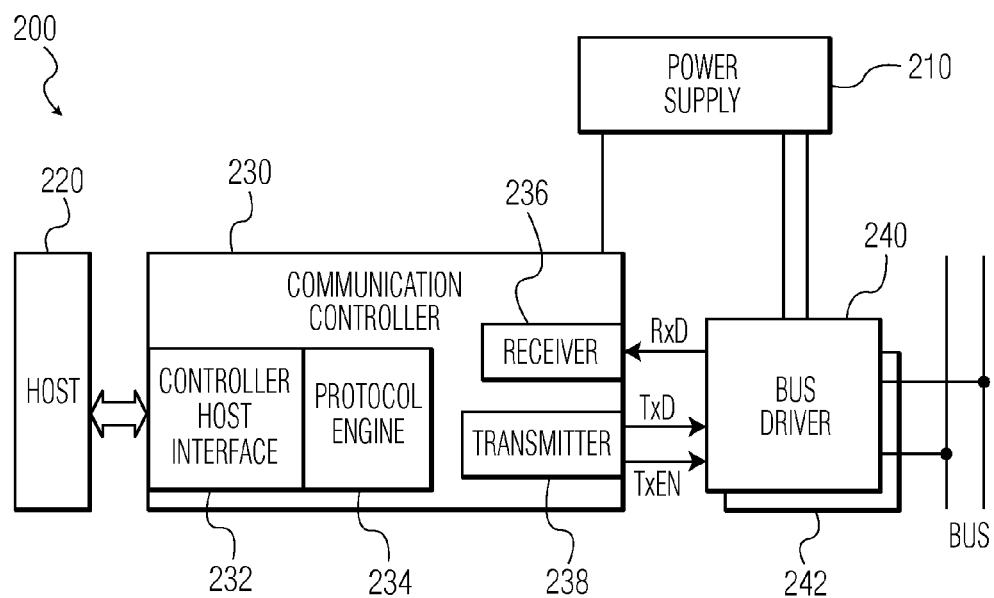
FIG. 2 illustrates an embodiment of a FlexRay ECU.

FIG. 2 illustrates an embodiment of a FlexRay ECU. The electronic control unit (ECU) may include a power supply 210, host 220, a FlexRay communication controller (CC) 230, and bus drivers (BD) 240, 242. The ECU may include two bus drivers 240, 242 to drive up to two channels.

The interface to the host is not standardized. It depends on the implementation. The interface from the CC 230 to the BD 240, however, is standardized and has three connections. The RxD (receive data) signal is used to transmit the received data sequence to the CC 230. The TxD (transmit data) signal is used to transmit data from the CC to the bus. The TxEN (transmit data enable not) is used to indicate the request of the CC 230 to the BD 240 to set it in a transmission ready state.

The CC 230 may include a controller host interface (CHI) 232, a protocol engine 234, a receiver 236, and a transmitter 238. The CHI 232 establishes communication between the CC 230 and the host 220. The CHI 232 manages a buffer for data and communication. The PE 234 is used to transmit and receive data via the receiver 236 and transmitter 238. The transmitter encodes data to the BD 240 and the receiver decodes data from BD 240.

FlexRay Protocol Overview

The communication protocol is specified in the FlexRay protocol specification, which defines the data link layer of the OSI model. The FlexRay specification uses special identifiers for global and local parameters used for several computations. The parameters are defined in the FlexRay Protocol Specification. They use a lower case letter plus a variable name, e.g., vSlotCounter.

Figure 3:
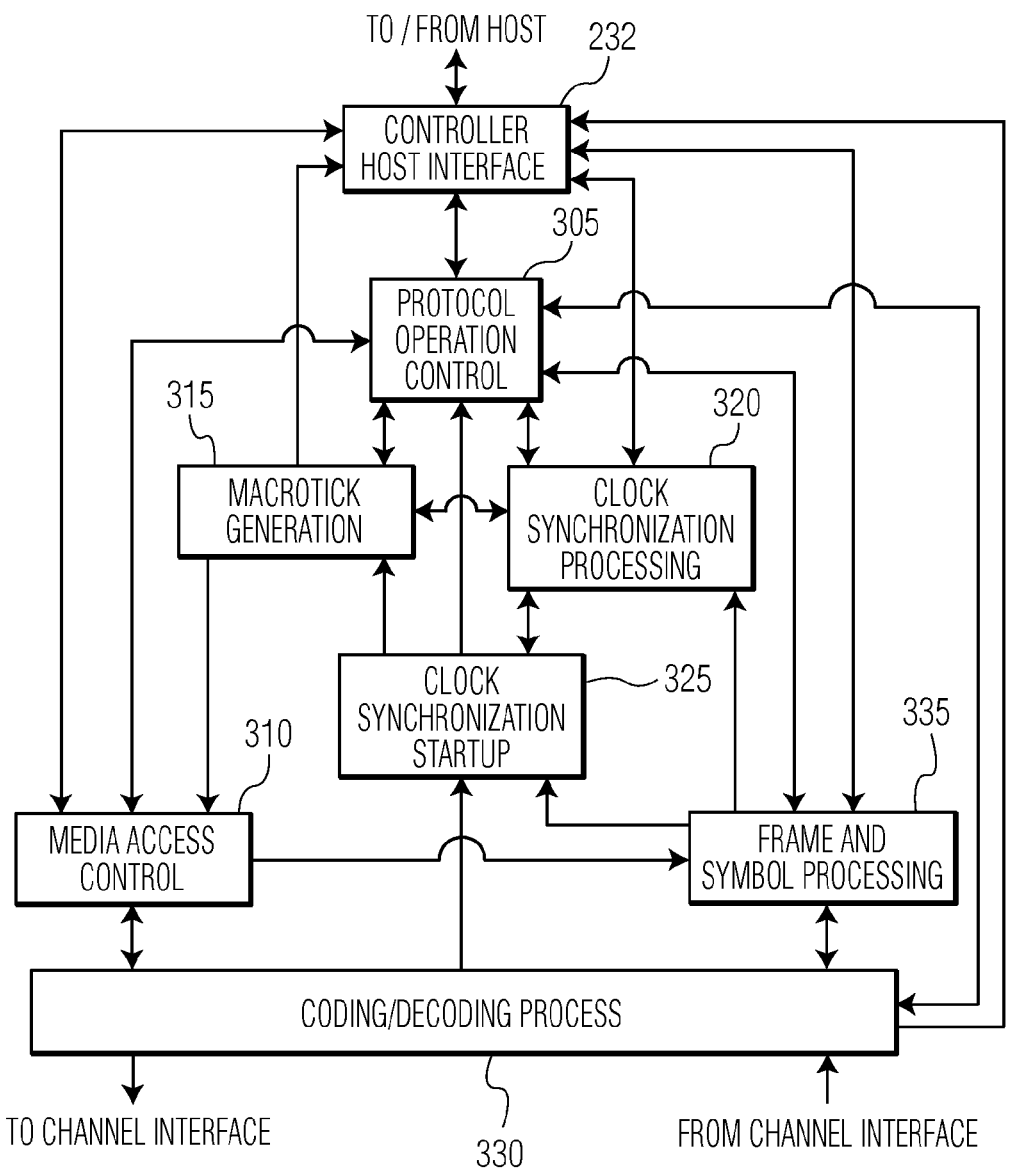
FIG. 3 illustrates the core functions of the FlexRay protocol.

FIG. 3 illustrates the core functions of the FlexRay protocol. FIG. 3 only illustrates one channel for clarity. The overview shows the processes realized in a FlexRay CC 230. The host 220 programs the specific local node parameters via the CHI 232. If a node is in an operational mode, the protocol operation control (POC) 305 controls all other processes, i.e., it is able to start, control and terminate processes. The media access control (MAC) 310 offers two media access schemes: the time division multiple access TDMA scheme and the dynamic mini-slotting based scheme. Therefore, the MAC 310 sets boundaries in time to start segments and slots during the communication cycle. The internal timing hierarchy is generated from the macrotick generation (MTG) 315 process. It cooperates with the clock synchronization startup (CSS) 325 and the clock synchronization processing (CSP) 320 processes, to synchronize the node-local time with the network. The coding/decoding process (CODEC) 330 is used to assemble frames and symbols, to transmit them to the network or to receive and decode them. While receiving, the CODEC 330 performs checks regard the correct reception of the frame. The frame and symbol processing (FSP) 335 checks the correct timings of received frames and symbols with respect to the used TDMA scheme. It also applies tests regarding syntactical and semantically correctness of the received frames.

FlexRay Communication Cycle

Figure 4:
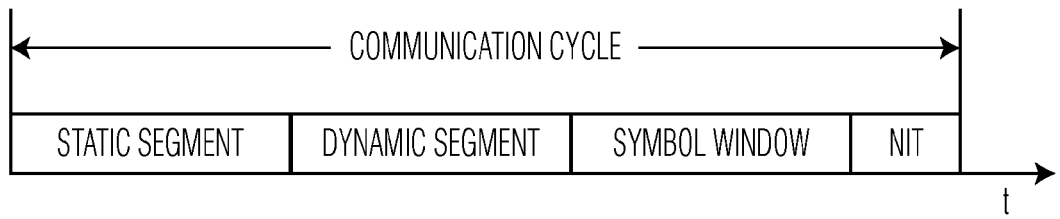
FIG. 4 illustrates a FlexRay communication cycle.
Figure 5:
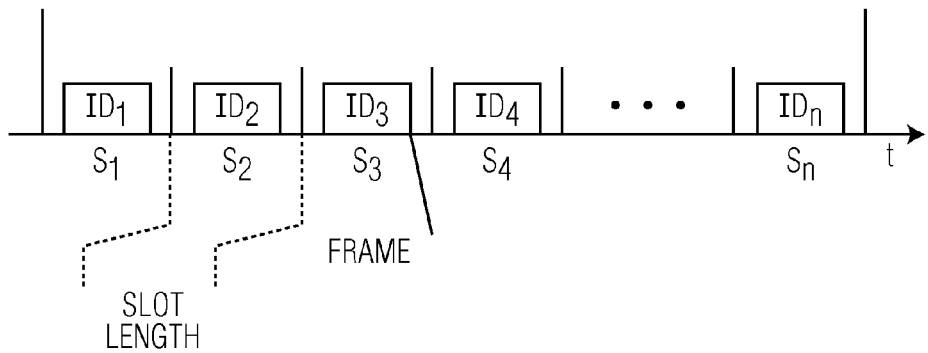
FIG. 5 illustrates the static segment of the FlexRay communication cycle.

FIG. 4 illustrates a FlexRay communication cycle. The communication cycle is divided into segments. If no frame or symbol is sent, the bus is idle. This is represented by a constant high signal. The static segment is mandatory to permit synchronization. FIG. 5 illustrates this in more detail. The segment is divided into static slots of the same length. The TDMA access scheme is used in the static segment to prevent collisions on the bus. Therefore, every node has to detect the segment and slot number (S) of the current cycle. Every node is configured with the slot numbers in which they are supposed to send their frames. The transmitted frame contains a field for the frame ID (ID). It has to have the same number as the used slot. The used slots per node are unique. Hence, it is not possible that two nodes transmit in the same static slot.

Figure 6:
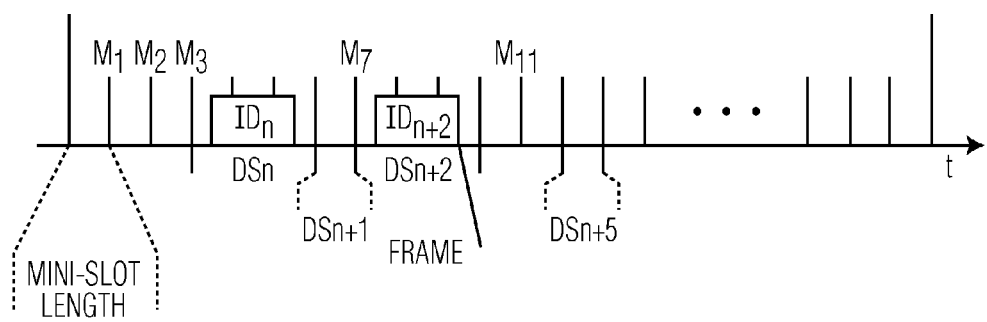
FIG. 6 illustrates the dynamic segment of the FlexRay communication cycle.

FIG. 6 illustrates the dynamic segment of the FlexRay communication cycle. The dynamic segment is optional. The dynamic segment is divided into so called mini-slots (M). These are smaller than the static slots. Nodes transmit in so called dynamic slots (DS). A dynamic slot has the length of one or more mini-slots and a slot number. The nodes have configured slot numbers in which they can transmit frames but are not required to transmit. Hence, the bandwidth is handled dynamically in this segment. If no frame is transmitted, the nodes increment the slot counter after every mini-slot, otherwise it is incremented after the dynamic slot. The number of mini-slots used depends on the frame length. Because the dynamic segment has a fixed duration, it is possible that frames cannot be transmitted, because the end of the dynamic segment is reached before the slot ID has the same value as the DS ID. Hence, the frame ID represents the priority of a frame. The node with the assigned low priority slot tries to send a frame in the next dynamic segment.

The next segment is the symbol window. In this window the nodes are allowed to transmit symbols, like a wake up pattern (WUP), a wake up during operation pattern (WUDOP), a collision avoidance symbol (CAS) or a media test symbol (MTS). The CAS and MTS are represented by the same symbol. The symbol window is an optional segment.

The last segment is the network idle time (NIT) where the bus remains idle. After this, the next cycle starts.

FlexRay Timing Hierarchy

Figure 7:
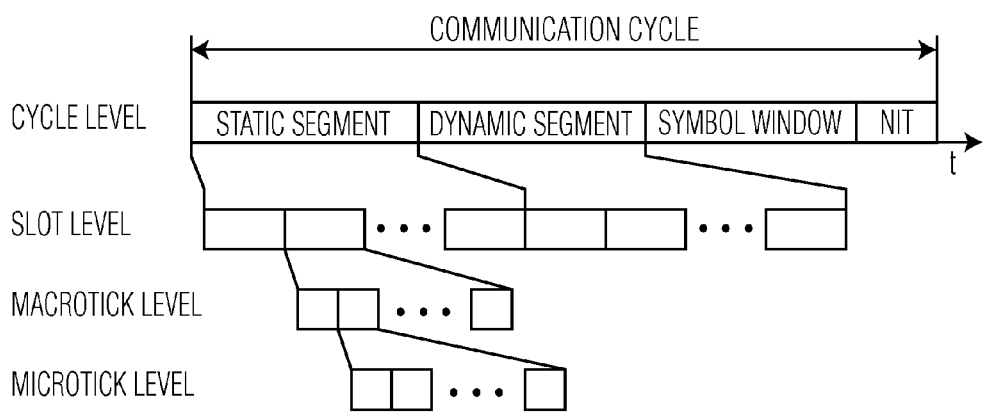
FIG. 7 illustrates the division of segments, slots, Macroticks, and Microticks.

Every node in the FlexRay network has its own clock oscillator for the local view of time. The nodes try to synchronize to the other nodes to get the same global view of time. This is mandatory for the TDMA method. Therefore, the communication cycle is divided into segments and slots. Slots are divided into time slices, called Macroticks (MT). MTs are divided into the oscillator clock ticks, the so called Microticks ($\mu T$). FIG. 7 illustrates the division of segments, slots, MT, and $\mu T$. The cycle time is the same for all nodes in the network. The number of MT per cycle is also the identical. Only the $\mu T$ duration can differ among the nodes. Hence, a MT can have a different number of $\mu T$ depending on the oscillator clock tick of the node. The FlexRay Protocol Specification defines how the nodes synchronize and stay in synchronization.

FlexRay Frame Format

Figure 8:
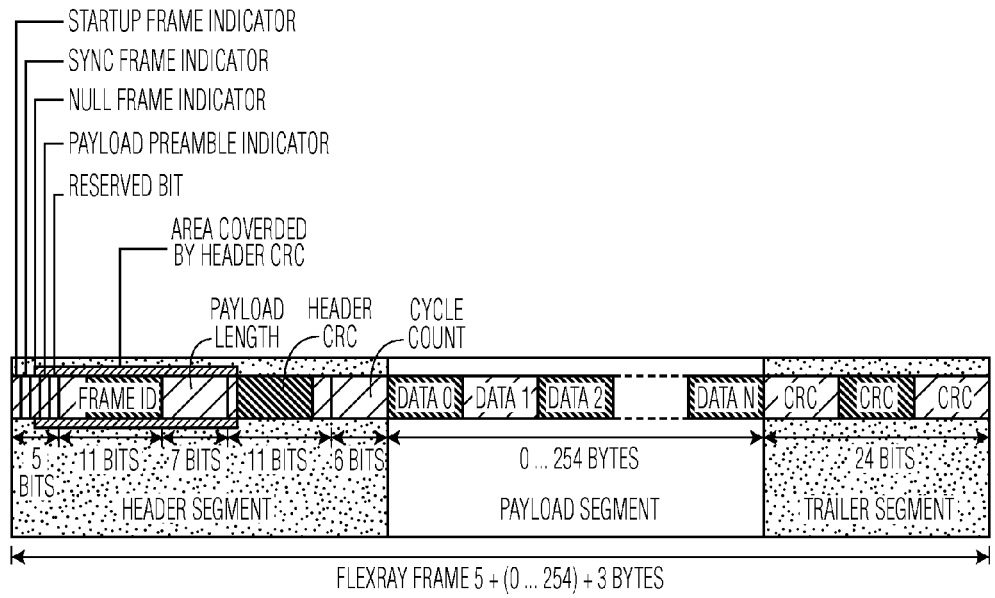
FIG. 8 illustrates the FlexRay header segment.

FIG. 8 illustrates the FlexRay header segment. Only the static frames are described. The frame format consists of a header segment, a payload segment and a trailer segment. The header segment consists of five bytes. They contain: the reserved bit, the payload preamble indicator, the null frame indicator, the sync frame indicator, the startup frame indicator, the frame ID, the payload length, the header CRC field and the cycle count.

The reserved bit has to have a value of '0'. The payload preamble indicator indicates the presence of a network management vector at the beginning of the payload segment. The null frame indicator indicates a null frame. The payload segment does not contain valid data. If the frame is a sync frame, the sync frame indicator is set to '1'. If the frame is a startup frame the startup frame indicator is also set to '1'.

The frame ID is an eleven bit field for the binary representation of the frame ID. This field is used for consistency checks, to verify if the frame is transmitted in the correct slot. Both numbers have to match for a valid frame.

The payload length field indicates the size of the payload segment. The encoded number multiplied with two gives the length of the payload segment in bytes. It has a range from zero to cPayloadLengthMax. Hence, frames without a payload segment are also valid frames. The maximum payload length is 254 bytes.

The header CRC (cyclic redundancy check) field is a computed value over the first 23 bits. The result of the check is an indicator for a correct frame transmission.

The cycle count is the last field of the header. The current cycle count is stored in this field. The cycle count starts with zero if the first frame is sent and is counted up to gCycleCountMax. The next cycle lets the counter reset from gCycleCountMax to zero. In some cases it is important to know if the cycle is an even or an odd one. Therefore, the cycle counter is stored in the frame header. The payload segment contains zero to 254 bytes of data.

The trailer segment contains the frame CRC field. It is from the whole header and payload segment.

Figure 9:
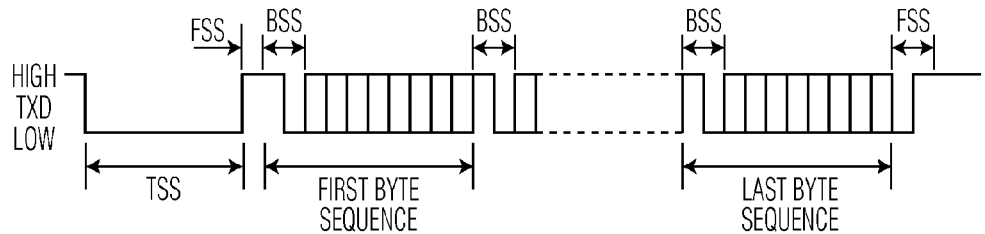
FIG. 9 illustrates a FlexRay static frame.

FIG. 9 illustrates a FlexRay static frame. The static frame starts with a transmission start sequence (TSS) composed of low bits. This sequence has a duration of multiple gdBit durations, where gdBit is the nominal bit time. The length of the TSS is gdTSSTransmitter. Next comes the frame start sequence (FSS) of the duration of one gdBit and the first byte start sequence (BSS) of one high and one low bit and a byte follows. Every byte starts with a BSS. The last byte ends with a frame end sequence (FES), which is represented by one low bit and one high bit. The receiver decodes and checks these sequences for fault detection.

FlexRay Symbol Format

The possible symbols in FlexRay are the CAS/MTS, the WUP, and WUDOP. The CAS/MTS is used to start up the network and to restart communication after a collision on the bus.

Figure 10:
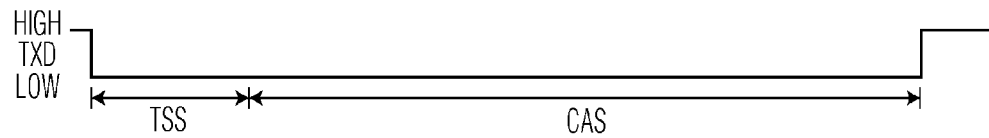
FIG. 10 illustrates the CAS/MTS symbol.

FIG. 10 illustrates the CAS/MTS symbol. The CAS is a constant low signal with a length of gsTSSTransmitter plus cdCAS in gdBit. Hence, it includes the TSS and the low phase for the CAS. A CAS can only be decoded if the channel is decoded as idle before and after the symbol.

Figure 11:
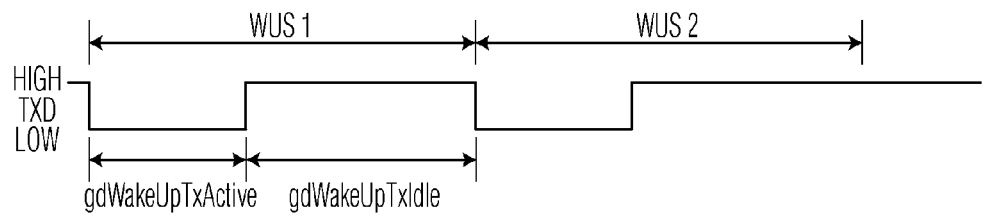
FIG. 11 illustrates the WUP symbol.

The WUP and WUDOP are used to wake up nodes from sleep mode. The WUP is usually the first symbol on the bus and used to wake up the network. One or more nodes are configured to transmit a WUP. If the other nodes decode the symbol, they wake up. FIG. 11 illustrates the WUP symbol.

To wake up a network, the node transmits a WUP consisting of two wakeup symbols, WUS1 and WUS2. Both have the same low phase of gdWakeupTxActive followed by a high phase of gdWakeupTxIdle. The network can also be configured without the need of a wake up symbol.

FlexRay Protocol Operation Control

The FlexRay protocol is described by a variation of the Specification and Description Language (SDL), a graphical description language to describe and specify distributed systems. In the protocol specification the concepts of processes and all signal related aspects, like signal transport and signal input queues are used. The concept of timers, to represent time, in the terms of Microticks, Macroticks and sample ticks, is an extension of the standard.

In SDL, a system is described by blocks that are connected by signals. Every block is described by one or more processes. These processes can communicate with each other by input and output events. An existing process can create and terminate others. A process follows the underlying concept of extended finite state machines (EFSM).

Figure 12:
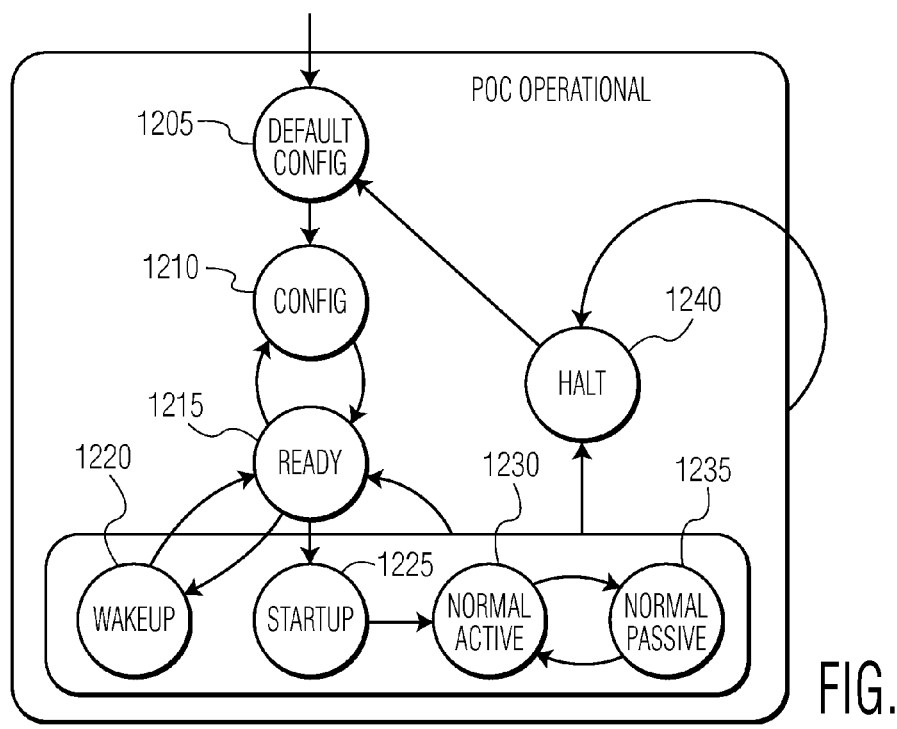
FIG. 12 illustrates an overview of the POC process.

FIG. 12 illustrates an overview of the POC process. After a node is powered on, the POC transitions into the default config state 1205. It loads the default configuration for the communication with the CHI. The POC process transitions to the config state 1210. In this state the host configures the CC. The POC process transitions into the ready state 1215. From this state, it can transition to the wakeup 1220 or startup state 1225. This depends on the configuration. Because the network is not configured at wake up, the network transitions with the CHI RUN command to the startup state 1225. The CODEC process is started and the state transitions to the startup macro. If the node is not configured as a coldstart node, it tries to integrate into ongoing communication and transitions to the normal active state 1230, when the network is started up. A coldstart node integrates into ongoing communication or sends its own startup attempts if no other node is transmitting frames. If other coldstart nodes answer to one of the attempts, the network can start up and the node transitions into the normal active state 1230. The startup requirements of the network are fulfilled and all nodes in the same state start to send frames in their attached static slots. The network may also halt 1240 or enter a normal passive state 1235. The following section describes the startup process in more detail.

FlexRay Startup

Figure 13:
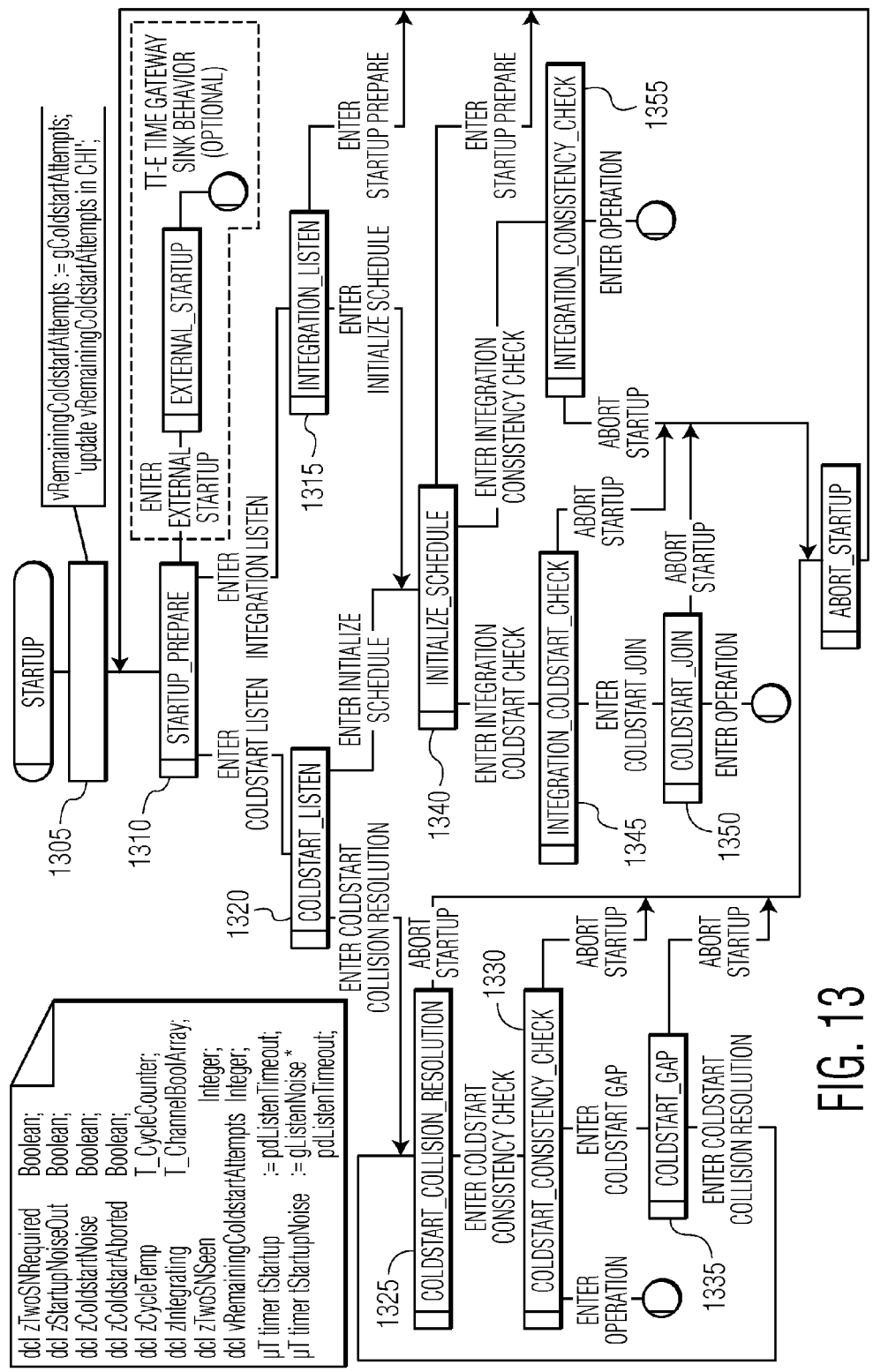
FIG. 13 illustrates the startup macro.

The startup process is handled from the startup macro. FIG. 13 illustrates the startup macro. The POC sets the configured number of coldstart attempts when it enters the startup macro 1305. The variable vRemainingColdstartAttempts is set to the global configuration parameter gColdstartAttempts. Then the POC process enters the startup prepare macro 1310. The FSP and MAC processes are set to a standby state and the CSP process to NOSYNC because the node is not synchronized yet. If the variable pKeySlotUsedForStartup is configured with false, the POC process leaves the STARTUP PREPARE macro and enters the INTEGRATION LISTEN macro 1315. The node is not configured as a coldstart node. If the node is configured as coldstart node, it has two or more coldstart attempts left and it is allowed to perform a coldstart from the CHI, it enters the macro COLDSTART LISTEN 1320. The remaining startup attempts are configured in the variable vRemainingColdstartAttempts. The different scenarios for different configurations and activities on the bus are described in the following. Further details on the additional steps in the startup macro may be found in the FlexRay Protocol Specification.

FlexRay Leading Coldstart Node

Figure 14:
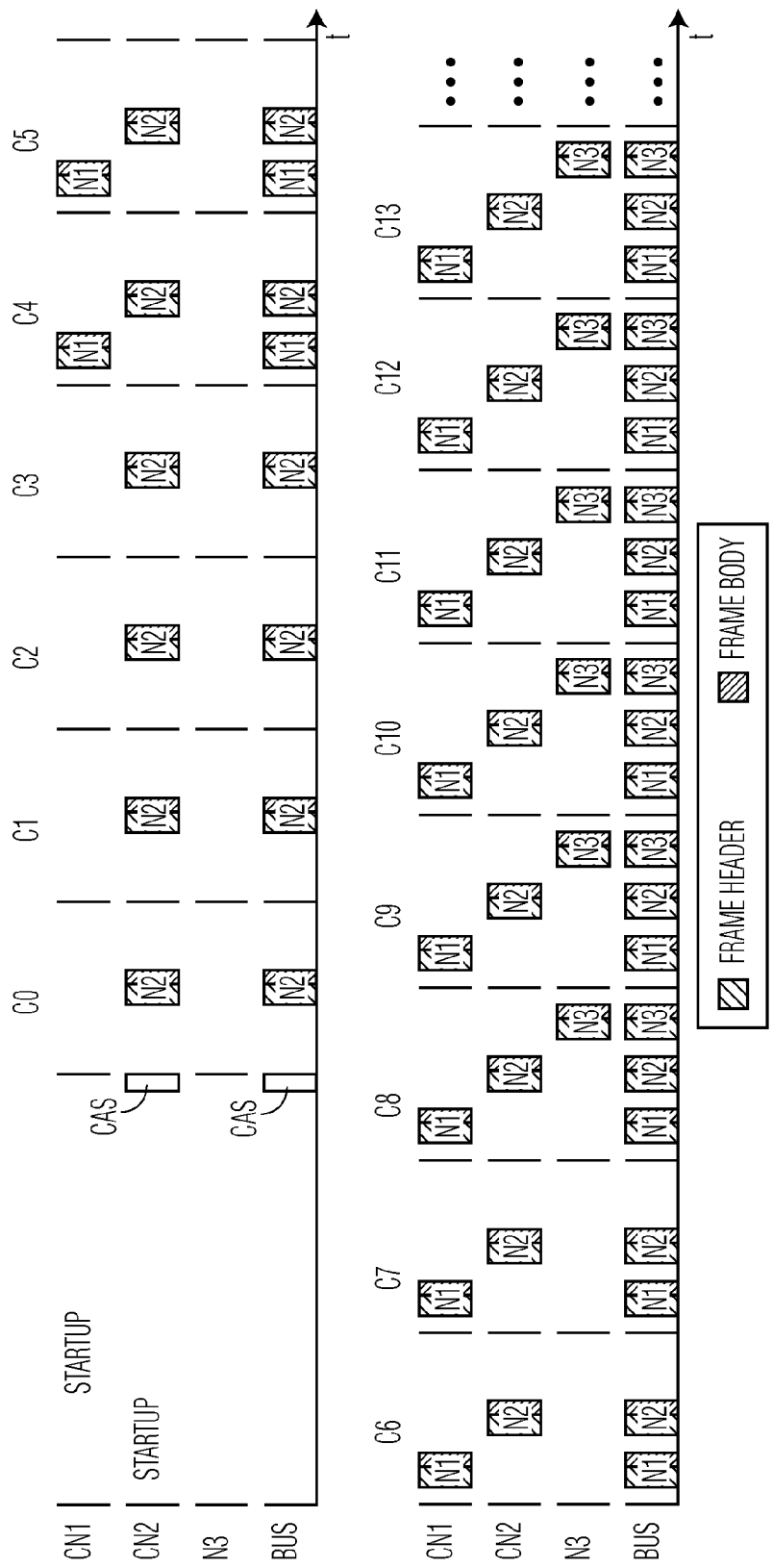
FIG. 14 illustrates a network startup with a leading coldstart node.

FIG. 14 illustrates a network startup with a leading coldstart node. NODE 1 CN1 and NODE 2 CN2 are configured as coldstart nodes. NODE 3 N3 is not a coldstart node. The cycles are denoted with C. The communication on the bus is also depicted. NODE 2 takes the lead by sending out the CAS. NODE 1 integrates into the startup attempt and responds with startup frames, beginning with cycle four (C4). In more detail, the leading coldstart node enters the COLDSTART LISTEN macro 1320 and starts the tStartup timer (FIG. 14). If the channel remains idle until the timer tStartup expires, there is no ongoing communication. The POC process sets the FSP process into STARTUP mode, the MAC process into STARTUPFRAMECAS mode, and the CSP process into SYNC mode. It sends the coldstart event to the macrotick generation (MTG) process 315 and enters the COLDSTART COLLISION RESOLUTION macro 1325. The leading coldstart node counts down one coldstart attempt from the variable vRemainingColdstartAttempts.

The MAC process sets the timer tCASActionPoint to wait for the first Macrotick event. It does not take the duration of one MT because the timer counts down when it receives the first Macrotick event. The MTG process 315 sends out the first Macrotick event and sets the cycle counter to the value of gCycleCountMax. Hence, the MAC process 310 sends out the transmit symbol on A event with the argument CAS_MTS. The CODEC process 330 receives this event, stops decoding, and starts transmitting a CAS. While it transmits, it does not listen to the bus to decode possible frames or symbols of the other nodes. It takes the duration of one gdStaticSlot from the start of the CAS until the first cycle starts. The node has to wait for the slot with the same ID as the configuration parameter pKeySlotID. This is the slot in the static segment in which it can send its startup frame. After the CAS is transmitted, it listens to the bus again. If it does not decode valid headers or a CAS, it starts sending its first startup frame in cycle zero and waits for the computed SyncCalcResult from the CSP process 320. The SyncCalcResult is computed over the cycle and transmitted in the NIT at the end of the cycle. Because the node has transmitted the first valid header, it is the leading coldstart node. Other nodes try to integrate into the communication and derive their schedule and clock correction from the leading coldstart node.

Figure 17:
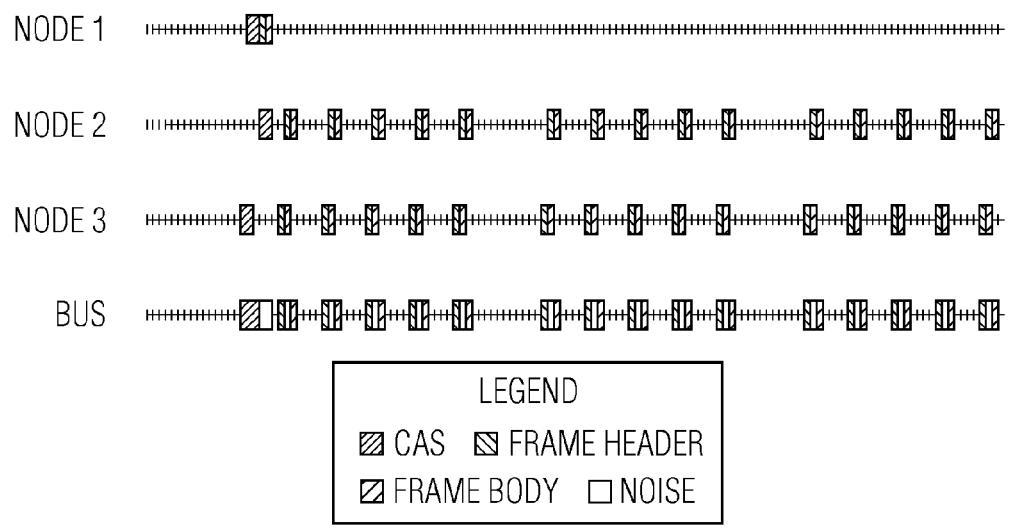
FIG. 17 illustrates a DCN failure.

The leading coldstart node sends four frames in consecutive cycles, beginning with an even one. If it does not decode a valid header or CAS during this time, the POC process enters 305 the COLDSTART CONSISTENCY CHECK macro 1330 (FIG. 17). In this macro it transitions to the coldstart consistency check state. It waits for the end of the fifth cycle and checks the computed argument zStartupX from the received SyncCalcResult. zStartupX is the number of received startup frames during the current cycle. The node does not count its own startup frame. If no node responds with a startup frame on the coldstart attempt, the zStartupX is zero. If it is zero and the node still has a positive number of coldstart attempts left, the POC enters the COLDSTART GAP macro 1335. The POC process 305 transitions into the coldstart gap state and waits for one cycle to start the next coldstart attempt in cycle six.

If a node is responding in cycle five, the POC process 305 waits for another cycle and sends out a frame in cycle six. If the computed argument zStartupX, which is received in the NIT of the sixth cycle, is bigger than zero, and the frames are transmitted in the correct schedule, the POC process enters operation. At least one following coldstart node is responding. The nodes enter the normal active state in cycle eight.

Following Coldstart Node

A following coldstart node behaves like a leading coldstart node and gets into the COLDSTART LISTEN macro 1320 (see NODE 1 in FIG. 14). If it decodes a communication element (CE) on the bus, the bitstrober (BIT-STRB) process sends out the CE (communication element) start on A and the idle end on A event. The POC process resets the timer tStartup. Then the timer is stopped.

If the node decodes a CAS or valid header from another node, it sets the tStartupNoise timer. This timer is used to guarantee a startup also if noise is present on the bus. If a valid even startup frame is decoded in an even cycle, the POC process 305 receives an integration started on A event from the CSS process and enters the macro INITIALIZE SCHEDULE 1340. If the integration is successful after receiving a valid odd startup frame, the POC process enters the INTEGRATION COLDSTART CHECK 1345 because of the value, TRUE, of the variable pKeySlotUsedForStartup. The POC process transitions into the integration coldstart check state and sets the mode of the FSP process to STARTUP. The mode of the MAC process 310 is set to NOCE to not send frames or symbols, and the mode of the CSP process 320 is set to NOSYNC. The POC process 305 waits for the next computed SyncCalcResult. The frame is decoded.

If the POC process 305 is in an even cycle, it waits for the next SyncCalcResult event. If it is in an odd cycle and the argument zRefX is true, the POC process enters the COLDSTART JOIN macro 1350. In odd cycles the variable zRefX is true when a startup pair of two startup frames in consecutive cycles is seen. In even cycles there has to be one startup frame, in the cycle, which has the same frame ID, like the valid even startup frame, that caused the integration started on A event. If the following coldstart node sees more than one startup frame, the argument zRefX is not taken into account. If the POC process enters the COLDSTART JOIN macro 1350, it sets the mode of the FSP process to STARTUP, the mode of the MAC process 310 to STARTUPFRAME and the mode of the CSP process 330 to sync. The node has derived its schedule and clock correction from the coldstart node in the last two cycles. The node sends up to two startup frames in consecutive cycles and enters operation when there is at least one other coldstart node transmitting startup frames in the right schedule.

Non-Coldstart Node

NODE 3 N3 in FIG. 14 is a non-coldstart node. This node enters the INTEGRATION LISTEN macro 1315. The POC transitions 305 to the integration listen state. It waits for a starting integration. The integration is started when the CSP process 320 has received a valid even startup frame. The POC process 305 enters the INITIALIZE SCHEDULE macro 1340. If the node receives the consecutive valid odd startup frame, the integration is successful and the POC process enters the INTEGRATION CONSISTENCY CHECK macro 1355.

The node derives its schedule and clock correction from the coldstart node. In the following double cycles, the node tries to find two startup frames that fit into its own schedule. The frames have to be from two coldstart nodes. If the node fails, it aborts the startup and enters the STARTUP PREPARE macro, to try again. If the node has found two valid startup frames with different frame IDs in two consecutive double cycles, it enters operation.

Startup with More than One Coldstart Node at the Same Time

Figure 15:
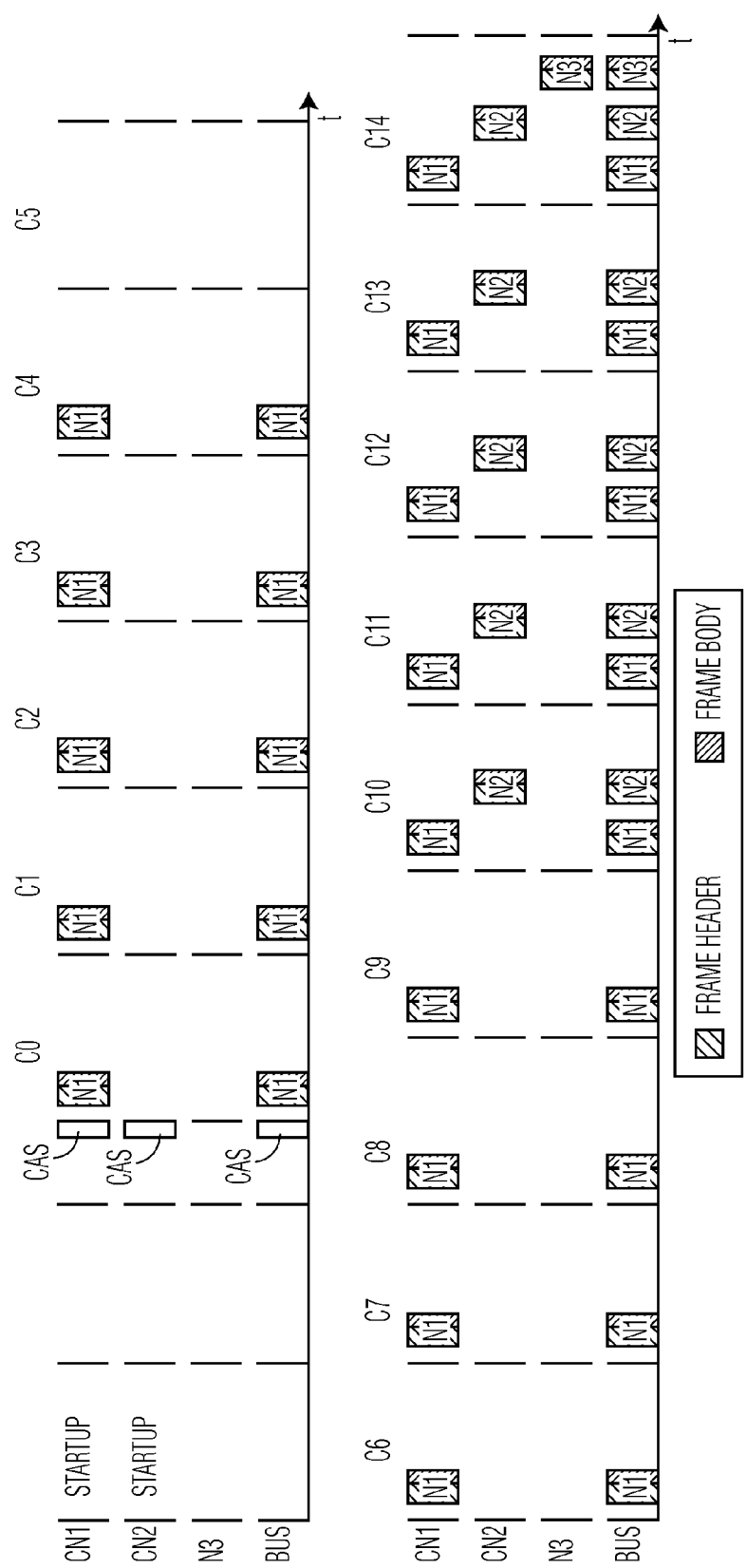
FIG. 15 illustrates a scenario where NODE 1 and NODE 2 are configured as coldstart nodes.

FIG. 15 illustrates a scenario where NODE 1 and NODE 2 are configured as coldstart nodes. NODE 3 is not configured as coldstart node. If more than one coldstart node enters the COLDSTART COLLISION RESOLUTION macro 1325 at the same time, and these nodes transmit a CAS at the same time. The CODEC 330 does not decode the bus during transmission. Hence, the nodes wait for their slot in the static segment to transmit their startup frame. Because of the unique configuration of slots in the nodes, one node has a lower slot number and therefore transmits the frame first and takes the lead. This node becomes the leading coldstart node. The other nodes decode the valid header and abort startup. The POC process 305 sets the mode of the FSP, MAC and CSP process to STANDBY and resets the macrotick generation. It enters the STARTUP PREPARE macro 1310 again and tries to integrate into the ongoing communication. These nodes are the following coldstart nodes. The first frame was not taken into account for the integration. Hence, the integration can start with the first valid even startup frame in the second cycle. The nodes do not respond in the fourth cycle and the leading coldstart node enters the COLDSTART GAP macro 1335. The next coldstart attempt lets the following coldstart nodes integrate. Hence, the integration is delayed to the eighth cycle and the coldstart join is performed in the tenth and eleventh cycle. The network starts up and the none coldstart nodes start sending in cycle fourteen.

Specific FlexRay Failure Types

The robustness of a FlexRay network can be decreased by an error in a single node affecting the entire network. In the current FlexRay specification these failure scenarios are not taken into account. The FlexRay Consortium did publish preliminary bus guardian specifications. Hence, certain failure scenarios are known and there is an approach to increase the robustness. But these specifications are incomplete in case of most implementation and containment details. Also not all possible failure scenarios are described. The following sections provide an overview of the failure scenarios found in literature.

FlexRay Failure Scenarios Overview

A FlexRay network may be prevented from starting up or from communicating after startup by several failure scenarios. Studies mention the following three scenarios, which are discussed below: Resetting Leading Coldstart Node (RLCN); Deaf Coldstart Node (DCN); and Babbling Idiot (BI).

In each of the three cases the failure affects FlexRay nodes from behaving fault free. In the worst-case scenario, the network cannot even start up. In case of the Babbling Idiot, the fault free nodes get less bandwidth or no bandwidth anymore because of ongoing traffic from the faulty node. The failures may affect a bus topology as well as a hybrid topology, unless there is an active component to prevent the error propagation. These three failure scenarios are not acceptable for safety critical applications and should be prevented to establish a more robust communication in a FlexRay network.

The following sections describe the behavior of a node that is influenced by one of these three failures. In addition, the sections below describe how fault free nodes react upon the presence of a faulty node, the origin of a startup problem for the first two faults and a loss of bandwidth in the third case. A startup problem occurs when the network cannot startup.

Resetting Leading Coldstart Node

The coldstart node with the highest priority in the TDMA schedule becomes the leading coldstart node. If it is influenced by a periodical reset, so that it cannot transmit messages in four consecutive communication cycles, the network has a startup failure. This node is called a RLCN. The startup failure goes on for infinite time in the worst-case scenario. More related to the protocol, the four consecutive frames are transmitted in the coldstart collision resolution state. The reset in this phase of the leading coldstart node causes the other coldstart nodes to abort startup.

Figure 16:
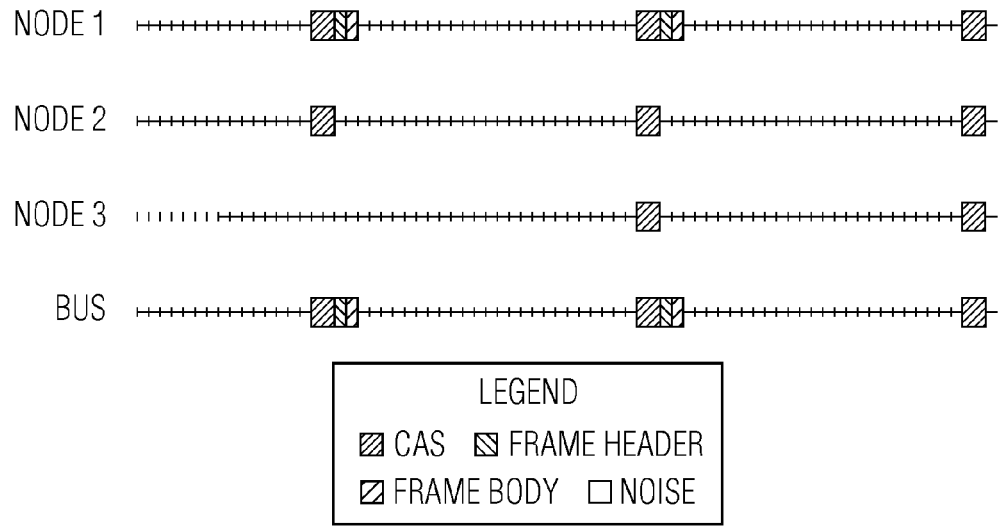
FIG. 16 illustrates a RLCN failure.

RLCN is a node that periodically resets after sending its first startup frame. It is also possible to reset periodically after the header. All other coldstart nodes cannot take the lead when they see ongoing communication from the leading node. FIG. 16 illustrates a RLCN failure. The RLCN is configured with the same parameters as the other coldstart nodes except for the slot in which it transmits the first startup frame.

It is assumed that more than one coldstart node is present in the network and all of them start at the same time. Hence, they listen to the bus for a defined time to detect ongoing communication. After this time they transmit a CAS at the same time. None of the coldstart nodes listens to CASs of the other coldstart nodes.

The RLCN sends the first frame, takes the lead, and resets. After this reset, the node is in the same state as it was after powering on. All protocol parameters are reset to the programmed defaults. Between the reset events the RLCN behaves like a functional node. The RLCN may either listen and react to ongoing bus communication or transmit signals on the bus according to the protocol specification. All coldstart nodes need the same time to transmit the next CAS for their next coldstart attempt, and the RLCN takes the lead again.

Deaf Coldstart Node

The DCN failure or incoming link failure prevents the affected node from listening to the bus. This causes a startup problem when the node is one of three coldstart nodes and overwrites, first, parts of the header of the leading coldstart node with its CAS and then every trailer of the next leading coldstart node. FIG. 17 illustrates the DCN failure. In FIG. 7, Node 2 is the DCN.

Overwriting the frames from Node 1 and Node 3 with the CAS and frames from Node 2 causes noise on the bus. Hence, every startup frame is overwritten and cannot be decoded as valid. All coldstart nodes lose their startup attempts and stop transmitting.

Babbling Idiot

The Babbling Idiot failure scenario is defined as a node sending messages outside of its specified time interval. By sending out noise or frames in unspecified time intervals in a FlexRay network, it is possible that the Babbling Idiot interrupts the startup process as well as ongoing communication after startup. This varies from taking a slot to which it is not assigned to taking all the bandwidth. A network with a Babbling Idiot node may even lose synchronization if the Babbling Idiot constantly sends data or when other nodes cannot transmit valid data anymore.

Deficiency in FlexRay to Respond to RLCN, DCN, and BI Failures

The RLCN, DCN, and BI failure scenarios decrease the robustness of the FlexRay protocol. One faulty node can affect the whole network from starting up or communicating. The current FlexRay fault checks cannot detect or prevent these failures. To increase the robustness of FlexRay networks, there is a need to prevent these failures. Accordingly detectors may be added to the FlexRay network in order to detect these failures so that protective measures may be taken to keep the FlexRay network operational. Such detectors are described below.

Previous Solutions

Various previous solutions have been proposed to prevent failures on FlexRay networks. Some of these solutions are discussed below.

Local Bus Guardian

For the detection and possible containment of failures on a bus, a local bus guardian (LBG) may be used. The LBG is a device that observes the ongoing communication of a specific node on a FlexRay network bus. When the observed node generates failures, the LBG disconnects it from the bus communication and tries to contain the failure.

Central Bus Guardian

For the detection and possible containment of failures on a bus, a central bus guardian (CBG) may be used. The CBG is a central device. Nodes are connected directly or via a bus on several branches to a CBG.

Currently there are no LBG or CBG that detect RLCN, DCN, and BI failures. Below is an analysis of these failures scenarios. From this analysis, detectors may be developed to detect RLCN, DCN, and BI failures.

Problem Analysis

The RLCN, DCN, and BI failure scenarios are analyzed, referring to the FlexRay Protocol Specification version 3.0.1. Failures are defined in phases or timing bounds. Also the effects on the network communication are defined. When the RLCN and DCN can affect the startup process in a way that a startup failure occurs is analyzed. Ways in which the Babbling Idiot failure affects the ongoing communication in the static segment are analyzed.

Conditions for the Analysis

It is necessary to analyze all processes of the faulty node, as well as of the fault free nodes, that transmit or receive data during communication. The root causes of all possible scenarios in which the faulty node can affect a startup failure or disturb the communication in a way that the network loses the synchronization must be determined. To minimize the complexity of the analysis, it is important to figure out first, how many nodes are at most needed to generate the faulty behavior.

Some network and node specific effects and configurations only increase the complexity of the analysis by altering the signals on the bus. Apart from the faulty node, every failure scenario by its own in a fault free environment should be analyzed. The complexity of the analysis is reduced when the minimal configuration in case of the network topology is used. The analysis starts with a minimal configuration that is then mapped onto more complex configurations.

Resetting Leading Coldstart Node Analysis

In a RLCN scenario, the faulty node takes the lead when all coldstart nodes start at the same time. Therefore the slot in which it sends the first startup frame has to be configured as the first one. Further, it is assumed that all nodes are powered on at the same time. This causes the special startup behavior described above.

The RLCN failure is defined as a node that is periodically resetting. It is assumed that the delay from powering on is the same as the delay from resetting to the next reset. When the reset is executed, all protocol parameters of the node and host are reset to their programmed defaults, e.g., the number of coldstart attempts is set to gColdstartAttempts. The node behaves like it is just powered on and is not driving the bus actively.

The scenario for a RLCN failure requires that three coldstart nodes start up the network when one of them is faulty and the others are not faulty. Because of the fact that the RLCN periodically takes the lead in establishing the network and prevents communication from other coldstart nodes, this scenario is even possible with the maximum number of configured coldstart nodes.

Figure 18:
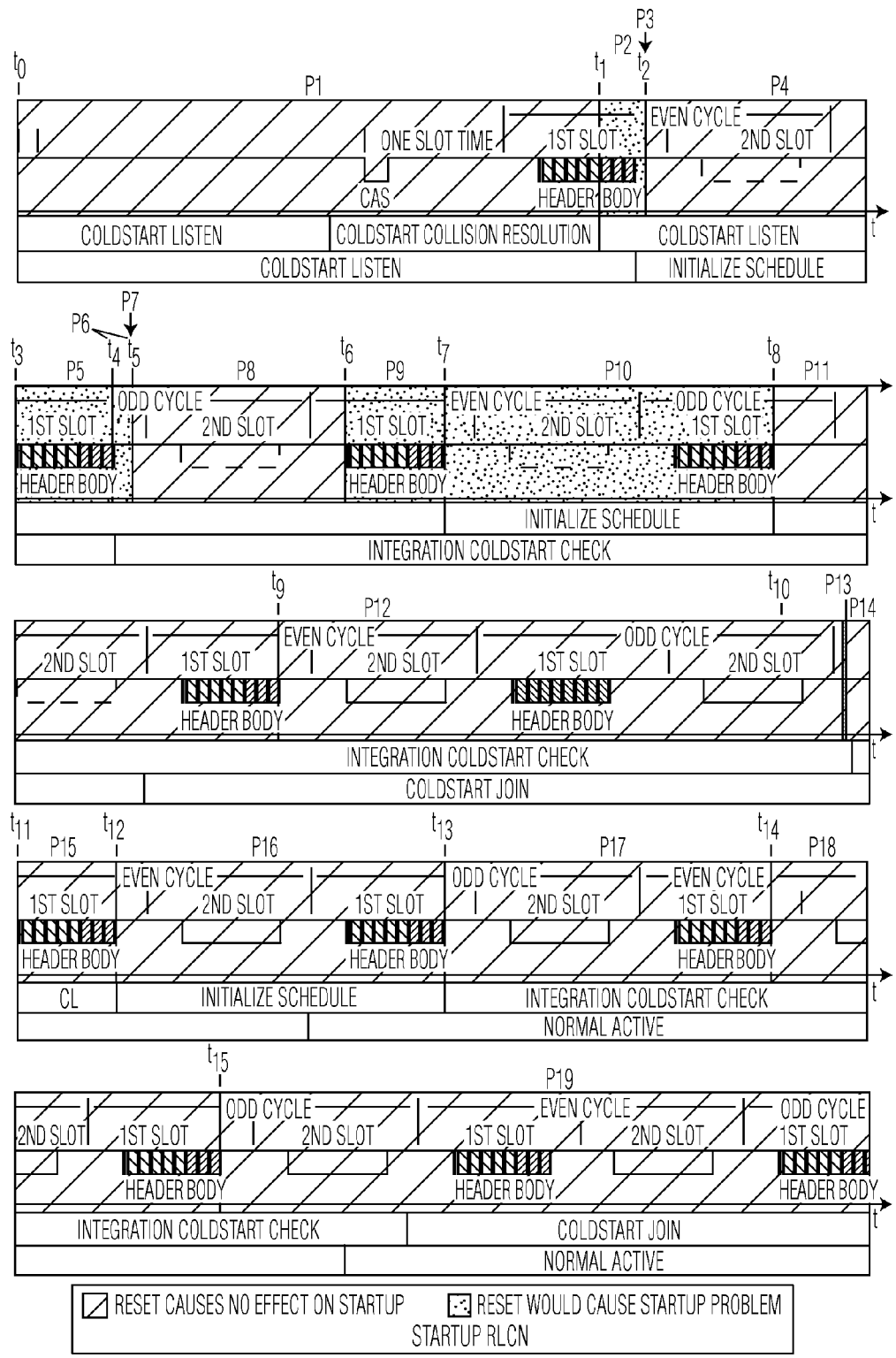
FIG. 18 illustrates various phases during startup where a RLCN failure may occur.

The normal startup process may be partitioned into phases. These phases cause different behavior, depending on when a reset from the leading coldstart node is executed. FIG. 18 illustrates various phases during startup where a RLCN failure may occur.

In the following description, all phases are described in detail. In order to facilitate the description, the description will begin with phase 1, 2 and so on, in order to understand the whole startup process and the periods in which a reset can occur during the startup. The times t0 to t15 are used to define the boundaries of the phases. Therefore the smallest time step equal to the nominal bit duration of 1 gdBit is used. When the reset occurs in one phase, it has the same effect on the other coldstart nodes. After the reset, the RLCN starts again at t0 till it reaches the reset point. In non critical phases, other coldstart nodes can take over the lead from the RLCN and start up the network. In critical phases a startup failure occurs.

To analyze the phases in more detail it is necessary to know the behavior of the normal startup. It is also necessary to define some time durations in the following equations. The configuration time (tC) defines the time a node needs to go through the default config state, config state and ready state. This time is dependent on the implementation of the node and is assumed the same for all nodes in the network.

The function CycleStart(CycleNumber) returns the start of the cycle with the number CycleNumber. This is indicated by the cycle start event of the cycle. This function is defined in Equation (1). tStaticSlot is defined in Equation (2), for the duration of one static slot, and tCycle is defined in Equation (3), for the duration of one cycle.

$$\text{CycleStart(CycleNumber)}=tC+t\text{Startup}+t\text{StaticSlot}+ \\ t\text{Cycle-CycleNumber with CycleNumber} \in N \quad (1)$$

$$t\text{StaticSlot}=gd\text{StaticSlot} \quad (2)$$

$$t\text{Cycle}=g\text{MacroPerCycle} \quad (3)$$

Equation (5) defines the function to calculate the time from powering on the RLCN to the cycle start event of the cycle, given by the variable CycleNumber. This function is called FrameStart(CycleNumber). Therefore tActionPoint is defined in Equation (4) as the duration for the action point offset and slot for the configured slot number of the RLCN in which the first startup frame is sent.

$$t\text{ActionPoint}=gd\text{ActionPointOffset} \quad (4)$$

$$\text{FrameStart(CycleNumber)}=\text{CycleStart(CycleNumber)}+t\text{ActionPoint}+\text{slot} \cdot t\text{StaticSlot with slot} \in N, \\ 0 \le \text{slot} \le c\text{StaticSlotIDMax} \quad (5)$$

The used time durations in the frames are defined by the following times:

$$\text{TSS length:} t\text{TSS}=gd\text{TSSTransmitter} \quad (6)$$

$$\text{FSS length:} t\text{FSS}=1 \text{ gdBit} \quad (7)$$

$$\text{FES length:} t\text{FES}=2 \text{ gdBit} \quad (8)$$

$$\text{BSS length:} t\text{BSS}=2 \text{ gdBit} \quad (9)$$

$$\text{A byte length:} t\text{Byte}=8 \text{ gdBit} \quad (10)$$

$$\text{Header segment length:} t\text{Header}=5 \cdot (t\text{Byte}+t\text{BSS})=50 \\ \text{gdBit} \quad (11)$$

$$\text{Payload segment length:} \\ t\text{Payload}=g\text{PayloadLengthStatic} \cdot 2 \cdot (t\text{Byte}+ \\ t\text{BSS})=g\text{PayloadLengthStatic} \cdot 20 \text{ gdBit} \quad (12)$$

$$\text{Trailer segment length:} t\text{Trailer}=3 \cdot (t\text{Byte}+t\text{BSS})=30 \\ \text{gdBit} \quad (13)$$

$$\text{Duration of the channel idle delimiter:} \\ t\text{Idle}=c\text{ChannelIdleDelimiter}=11 \text{ gdBit} \quad (14)$$

$$\text{Frame length:} t\text{Frame}=t\text{TSS}+t\text{FSS}+t\text{Header}+t\text{Payload}+ \\ t\text{Trailer}+t\text{FES} \quad (15)$$

$$\text{The duration of the NIT:} t\text{NIT}=gd\text{NIT} \quad (16)$$

tSyncCalcResult is defined as the time a node needs to calculate the Sync-CalcResult in the NIT. This value is dependent on the specific implementation of a FlexRay node.

In the following sections, all phases are described. The effects during communication in the processes of the involved nodes are described. The phases (P1 to P19) are defined with timing bounds in the sections.

Phase 1 (P1)

All nodes are powered on at t0. The POC process is started and the nodes have to go through the states of tC. The POC goes into the startup state after the ready state. In the startup state, the macro STARTUP PREPARE starts all necessary processes to listen to ongoing communication on the bus and the POC process goes into coldstart listen state when it is a coldstart node with at least two attempts to start up the network. In this case, it is a coldstart node with a minimum of two coldstart attempts configured. Because all coldstart nodes were started at the same time, they are all in the same state of the POC. They all start the timers tStartup and tStartupNoise and listen to ongoing communication. Because no node is sending anything, they all reset the startup timer after it expires and transmits the coldstart event to transition to the state coldstart collision resolution.

The coldstart event starts the MTG to wait for tStaticSlot to start the first cycle. At the same time when the coldstart event is sent, the MAC is directed to transmit a CAS signal to the bus.

The MAC waits for tCASActionPointOffset to start transmitting the CAS. This time is not the duration of 1 MT, rather it is the time the MTG process needs to start up and transmit the first Macrotick event.

Because the nodes are unable to transmit and receive at the same time, all coldstart nodes transmit a CAS and go on with starting up the network. When the MTG process of every coldstart creates the cycle start event, they all wait for their assigned slot.

The RLCN may try to transmit the header of the first frame, but in P1 the reset occurs at a time less than t1. The second bit of the BSS is missing, and on the bus an idle is decoded by the other coldstart nodes. Hence, when the RLCN is reset during P1, it does not transmit a valid header and the coldstart node with the next assigned slot number transmits the next frame. All coldstart nodes decode this and go to the ABORT STARTUP macro. The second coldstart node now takes the lead.

The RLCN starts with the tC and goes to the coldstart listen state, because the coldstart attempts are also reset to their default value. It starts the timer tStartup and tStartupNoise. These timers never expire, because, while counting down, there is always an event, like an idle end, caused by activity of another node on the bus. This resets the startup timer. It is also possible, that the node decodes a valid header from the leading coldstart node. This sets the tStartupNoise timer. When it decodes a valid even startup frame, the integration starts and the node transitions to the state enter initialize schedule. Hence, the RLCN never takes the lead and does not disturb the communication.

This phase is specified by following equations:

$$t0 \leq P1 < t1$$

$$t0 = 0$$

$$t1 = \text{FrameStart}(0) + t\text{TSS} + t\text{FSS} + t\text{Header}.$$

Phase 2 (P2)

Phase 2 starts at time t1. The header is transmitted and when the reset occurs while sending the frame body, the receiving nodes listen to an idle. The receiving nodes are all in the coldstart listen state, because of the aborted startup. After the duration of tIdle of no activity on the bus, they set the timer tStartup again. When Equation (17) is true, the resetting node takes the lead by transmitting the first CAS after expiration of the tStartup timer.

$$t\text{Idle} > tC \qquad (17).$$

The other nodes are still in the coldstart listen state and reset the tStartup timer, because of the low signal during the transmitted CAS. The other nodes try to join, when they decode the frame from the RLCN, but cannot join, because the next reset interrupts the frame. The other nodes set their timer again and are all stuck in a loop. The network does not start up. This error is critical because it causes a startup problem. The timing bounds are defined by the following equations:

$$t1 \leq P2 < t2$$

$$t2 = t1 + t\text{Payload} + t\text{Trailer} + t\text{FES} + t\text{Idle} - tC.$$

Phase 3 (P3)

Phase 3 is also critical, because the reset is at the decoded channel idle recognition point (CHIRP) on A minus the duration of tC. Therefore Equation (17) has to be true. This causes the RLCN to reset and wait for the duration of tC. All other coldstart nodes set the tStartup timers after generating the CHIRP on A event. Hence, they start the tStartup timer simultaneously with the RLCN. All nodes enter the coldstart listen state at the same time and enter the coldstart collision resolution state after expiring of the tStartup timer. They all transmit the CAS again and all are stuck in a short loop. They are stuck in this loop as long as they have enough coldstart attempts remaining. This number is decreased by one every time the nodes enter the coldstart collision resolution state. When the coldstart attempts are less than two, the nodes cannot enter the coldstart listen state anymore.

P3 is defined by the following equation:

$$P3 = t2.$$

Phase 4 (P4)

This phase is not critical, because the reset is one gdBit after the CHIRP on A event minus the duration of tC. This has the effect that after a reset, one of the other coldstart nodes takes the lead, because their tStartup timers expire earlier than the timer of the RLCN. They transmit the CAS, so that the RLCN receives at least one low bit and stays in the coldstart listen state. It tries to integrate into ongoing communication and is reset periodically. When there are at least two other coldstart nodes with two startup attempts left, they can start the network.

The following equation defines P4:

$$t2 < P4 < t3$$

$$t3 = \text{FrameStart}(1).$$

Phase 5 (P5)

Phase 5 starts with the transmission of the TSS and ends the duration of tC before the CHIRP on A event is decoded after the frame. When the reset occurs during this phase, the other coldstart nodes are still in the coldstart listen state, because the first frame is not taken into account for an integration attempt. This is, because this frame is decoded in an odd cycle. When receiving ongoing communication, the coldstart nodes reset the tStartup timer. The tStartup timer is only set, if the bitstrober process generates an CHIRP on A event after receiving an idle of the duration of tIdle. Like in P2, it is a critical phase when Equation (17) is true. In this case, the RLCN takes the lead at the next expiration of the tStartup timer, by transmitting a CAS. The other coldstart nodes stay in the coldstart listen state. The other coldstart nodes transition to the state initialize schedule, after receiving the first valid even startup frame, because of the created event integration started on A. It is generated by the CSS process. In the CSS process, the timer tSecondFrame is started, to check if the corresponding odd startup frame is received in time. The reset occurs before this can happen. Hence, the other coldstart nodes never receive the second startup frame and go into the STARTUP PREPARE macro. The other coldstart nodes enter the coldstart listen state to start the tStartup timer after the expiration of the tSecondFrame timer. The RLCN is the first node, sending a CAS again, and the startup nodes are in a loop. A startup problem occurs.

The following equation defines P5:

$$t3 \leq P5 < t4$$

$$t4 = t3 + t\text{Frame}.$$

Phase 6 (P6)

In the first startup attempt, the other coldstart nodes abort startup, when they decode the first valid header of the first frame. In P6 the valid odd startup frame is sent by the RLCN. When the reset occurs, after receiving the second frame, it takes at least the duration of tIdle of no activity on the bus, to decode the CHIRP on A event for the following coldstart node. Then they set the tStartup timer. This is only possible when Equation (18) is true.

$$P6 < t\text{Idle} - tC - 1 \text{ gdBit}$$

$$\text{with } tC - 1 \text{ gdBit} < t\text{Idle} \qquad (18).$$

In this case, the tStartup timer of the RLCN expires earlier than the timers of the other coldstart nodes. The coldstart nodes are in the coldstart listen state and stay there, because of the received CAS from the RLCN. When the other coldstart nodes decode the first valid even frame, the coldstart nodes start their integration and transition the state to initialize schedule. The next state is the integration coldstart check, when the valid odd startup frame is received. The integration successful on A event is transmitted to the POC process. The coldstart nodes wait for the SyncCalcResult event that is generated during the NIT of the next cycle. This event has three arguments attached. Because of the reset, there is no frame decoded, zStartupX is zero, and the nodes abort startup. The tStartup timer of the RLCN expires first and the node takes the lead with sending another CAS. From now on the nodes are in a loop and a startup problem occurs.

The following equation defines P6 referring to Equation (18):

$$t4\_P6 < t5$$

$$t5 = t4 + t\text{Idle} - tC.$$

Phase 7 (P7)

P7 is like P3. The reset occurs at the decoded CHIRP on A event minus the duration of tC. The effect of counting down the remaining startup attempts in the following coldstart nodes is the same. When the remaining coldstart attempts are less than two, the following coldstart nodes cannot enter the coldstart collision resolution state anymore. In this case they go out of the reset loop and try to integrate during the following startup attempts of the RLCN. But the integration is never successful, because of the periodical reset of the RLCN. A startup problem occurs.

Following equation defines the time of P7:

$$P7 = t5.$$

Phase 8 (P8)

P8 is not critical, because the tStartup timers of the following nodes expire earlier than the one from the RLCN after its reset. The following nodes always set the timer at the decoded CHIRP on A event. The RLCN resets and needs first tC and then tStartup to take the lead, but the other coldstart nodes transmit their CAS first. One of them takes the lead. The RLCN tries to integrate and affects only its own communication with the reset.

The boundaries of this phase are defined in the following equation:

$$t5 < P8 < t6$$

$$t6 = \text{FrameStart}(2).$$

Phase 9 (P9)

Because of the TSS, the tStartup timer is reset in P9. When a reset is performed during the third frame, the channel goes idle. After the CHIRP on A event is decoded, the tStartup timer of the following coldstart nodes is set again.

With Equation (17), the RLCN takes the lead by sending out the CAS. The following coldstart nodes stay in the coldstart listen state and go to the initialize schedule state after decoding the first valid even startup frame. After the next startup frame, the following coldstart nodes transition to the state integration coldstart check. The next frame is interrupted by the reset, so that during the next NIT, the argument zSyncCalcResult of the event SyncCalcResult is MISSING TERM and the startup is aborted. With Equation (18), the RLCN takes the lead again, by transmitting the CAS first and all nodes are stuck in a loop. The startup problem occurs.

The following equation defines P9:

$$t6 \le P9 < t7$$

$$t7 = t6 + t\text{Frame}.$$

Phase 10 (P10)

The following coldstart nodes transition their state from coldstart listen to initialize schedule, when the following coldstart nodes receive the second even startup frame from the RLCN. The tSecondFrame timer is started in the CSS process. When the RLCN resets in this phase, the next frame is not transmitted nor interrupted. The timer tSecondFrame expires and the event integration aborted on A is created. This causes the following coldstart nodes to abort startup and go to the coldstart listen state again. Because of Equation (18), the RLCN takes the lead again and transmits a CAS. The following coldstart nodes try to integrate and transition the state from coldstart listen to initialize schedule with the integration attempt on A event. The following coldstart nodes transition to the integration coldstart check state, when the consecutive odd frame is received. The next frame is in an even cycle, so that the POC stays in the integration coldstart check state. The odd frame is never received. Hence, during the NIT of cycle three, the calculated argument zSyncCalcResult of the event SyncCalcResult is MISSING TERM. The following coldstart nodes abort startup and the loop begins, with the RLCN taking the lead when the tStartup timer expires for the RLCN.

The boundaries of P10 are defined by the following equation:

$$t7 \le P10 < t8$$

$$t8 = \text{FrameStart}(3) + t\text{Frame}.$$

Phase 11 (P11)

In P11 the RLCN transmits the fourth frame in cycle three and resets before the next frame is sent. The following coldstart nodes are in the initialize schedule state and transitions to the integration coldstart check state, when they receive the second valid frame (the first two are discarded because of the simultaneous CAS). The next event is the SyncCalcResult in the NIT of cycle four. Because the frame is never transmitted completely in this cycle, the argument zSyncCalcResult of the event SyncCalcResult is MISSING TERM. The RLCN is reset and the timer tStartup expires before another coldstart node can take the lead by sending a CAS. The following coldstart nodes integrate and transition the state from coldstart listen to initialize schedule, with decoding the first valid even frame. The following coldstart nodes transition the state to integration coldstart check, with the consecutive odd startup frame. In the next two cycles, the frames are taken into account for calculating the SyncCalcResult in the NIT of cycle three.

The result is that argument zSyncCalcResult equals WITHIN_BOUNDS. This is in an odd cycle, so that the state transitions to coldstart join. In the next cycle, all following coldstart nodes transmit their startup frames, because of the event MAC control on A (STARTUPFRAME), while entering the coldstart join state. When there is more than one following coldstart node, the following coldstart nodes transmit their startup frames in the next cycle and count at least one other startup frame (they cannot count their own startup frame). Hence, the following coldstart nodes calculate a SyncCalcResult with the argument zStartupX greater than zero and stay in this state, until the third SyncCalcResult is calculated. The following coldstart nodes transmit their startup frames and transition to enter operation state. The network starts up after one reset. After the next reset, the RLCN tries to join, because it receives the ongoing communication. Hence, it only affects its own slot with the reset.

The following equation defines P11:

$$t8 \le P11 < t9$$

$$t9 = \text{FrameStart}(4) + t\text{Frame}.$$

Phase 12 (P12)

A reset during Phase 12 does not affect the ongoing communication, because in this phase the RLCN does not transmit a frame. When the fifth frame is transmitted, no other coldstart node responds and the RLCN goes into the coldstart gap state. It waits for one cycle to start the next coldstart attempt.

The following coldstart nodes abort startup, because of the calculated argument tSyncCalcResult of MISSING TERM in the NIT of cycle five. The upper bound of this phase is tC−1 gdBit before the SyncCalcResult is calculated. Hence, the RLCN takes the lead by sending the CAS first and the following coldstart nodes initialize the schedule in the first two cycles, go to the integration coldstart check state for the next two cycles and join the startup in the next cycle. From this point on they do not need the RLCN anymore to start up the network.

The following equation defines the boundaries for P12:

$$t9 \leq P12 < t10$$

$$t10 = \text{CycleStart}(6) - t\text{NIT} + t\text{SyncCalcResult} - tC.$$

Phase 13 (P13)

In P13 the RLCN is reset, the duration of tC before the SyncCalcResult is sent. The SyncCalcResult has to be calculated and sent before the NIT ends. Hence, the time period tSyncCalcResult, from the start of the NIT to the sending of the SyncCalcResult event, is an implementation specific time period. The reset occurs at t10. This has the effect that the following coldstart nodes and the RLCN start their tStartup timer at the same time and the network is in a loop. The following coldstart nodes start with sending the CAS at the same time.

This is a critical phase like P3 and P7, because of the loss of coldstart attempts for the following coldstart nodes, when they go to the coldstart collision resolution state in every pass. When the coldstart attempts are less than two, the coldstart nodes cannot startup the network anymore. Now they can integrate into the next startup attempt of the RLCN and start the network by themselves.

P13 is defined by the following equation:

$$P13 = t10.$$

Phase 14 (14)

A reset in P14 lets the following coldstart node, with the lowest slot number, in which it sends its startup frame, take the lead. The tStartup timer expires shortly before the one of the RLCN. Once the other coldstart nodes transmit the CAS, the RLCN integrates into the ongoing communication and only affects its own slot, with the periodical resets. The network starts up with at best two functional coldstart nodes.

P14 is defined in the following equation:

$$t10 < P14 < t11$$

$$t11 = \text{FrameStart} \qquad (6).$$

Phase 15 (P15)

P15 lets the following coldstart nodes reset their tStartup timer because they are in the coldstart listen state. When a reset occurs, the RLCN takes the lead, because of the Equation (17). In the next pass, the following coldstart nodes can integrate and start up the network without the RLCN, because they transmit startup frames, beginning in cycle four.

The timing bounds of P15 are defined in the following equation:

$$t11 \leq P15 < t12$$

$$t12 = t11 + t\text{Frame}.$$

Phase 16, 17 and 18 (P16, P17 and P18)

A reset in P16 causes a calculated argument zSyncCalcResult of MISSING TERM in cycle seven. The RLCN takes the lead by sending a CAS first and the following coldstart nodes perform the startup for their own, in cycle four. Then the RLCN is not needed anymore to participate in the startup process. In P17 and P18, the same behavior occurs, except for the cycle of the argument zSyncCalcResult of MISSING TERM. It is calculated in cycle eight for a reset in P17, and in cycle nine for a reset in P18.

The phases P16, P17, and P18 are defined in the following equations:

$$t12 \leq P16 < t13$$

$$t13 = \text{FrameStart}(7) + t\text{Frame}$$

$$t13 \leq P17 < t14$$

$$t14 = \text{FrameStart}(8) + t\text{Frame}$$

$$t14 \leq P18 < t15$$

$$t15 = \text{FrameStart}(9) + t\text{Frame}.$$

Phase 19 (P19)

A reset in P19 only affects the RLCN, because the following coldstart nodes start to send startup frames. When a coldstart node receives at least one valid startup frame in cycle ten, it goes on with the startup of the network. Hence, two functional coldstart nodes fulfill the minimum number of nodes to start the network from this phase on.

P19 is defined with the following equation:

$$t15 \leq P19.$$

RLCN Failure Summary

The RLCN scenario is created with a minimum of three coldstart nodes. This scenario shows the simultaneous startup of all coldstart nodes and depicts, that a RLCN can cause a startup problem. This begins after sending the first valid frame header and ends in the coldstart gap state in P13 with a long startup delay. When the reset occurs in P11 to P19, it causes a delay for the startup. A periodical reset in P13 lets all following coldstart nodes lose first, all coldstart attempts and then integrate into the next coldstart attempt of the RLCN. The phases P3 and P7 create a startup scenario, in which all coldstart nodes lose all their coldstart attempts. This is only possible when Equation (17) true.

Deaf Coldstart Node Failure Overview

A deaf node can only affect the communication when it is configured as a coldstart node, otherwise it just listens to the bus and receives an idle signal. Hence, it never transmits symbols or frames. A DCN can affect the communication in different ways. This depends on the start time of the node. When it is started during communication, it transmits a CAS and starts the first coldstart attempt by sending five startup frames in consecutive cycles and then stops sending for one cycle. This is repeated gColdstartAttempts times, because the node is deaf and does not react on other communication on the bus, like integration attempts or ongoing communication. Hence, it is possible, that a DCN overwrites frames or just transmits in idle phases of the segments. The analysis focuses on failures during the startup process in this failure scenario.

For the analysis it is necessary to find out, if a startup failure can happen and to describe at least one scenario in which it is possible. There are three startup scenarios that are analyzed in more detail in the following sections. First, the incoming link failure describes a DCN, taking the lead, while the network starts up. Second, the deaf coldstart node failure defines the DCN as delayed to the other coldstart nodes, to overwrite the frames of them. Third, the DCN can overwrite the header of the first leading coldstart node with its CAS, as well as the frames of a second leading coldstart node with its frames.

Incoming Link Failure

Figure 19:
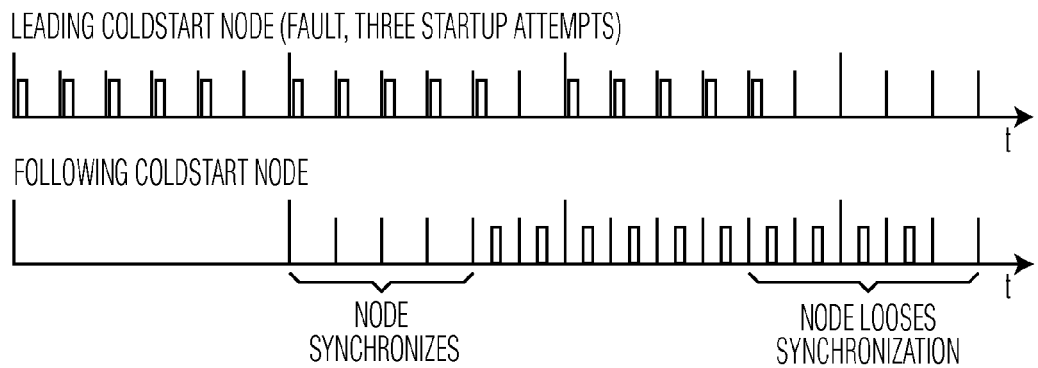
FIG. 19 shows a DCN failure due to an incoming link failure.

The incoming link failure is a scenario with a DCN starting first of all coldstart nodes. This does not affect an ongoing communication. The other coldstart nodes become following coldstart nodes, when they receive the CAS from the first attempt by the faulty node to start the network. A startup failure when it is in the COLDSTART JOIN macro it transmits startup frames. It aborts startup, if it receives a zSync-CalcResult equal to EXCEEDS BOUNDS or MISSING TERM. Here, it is MISSING TERM. The node is not receiving a synchronization frame or a synchronization frame pair. The following coldstart node lose the synchronization after the first coldstart gap phase and integrates in the next fifth cycle. FIG. 19 shows a DCN failure due to an incoming link failure.

In the second scenario with two following coldstart nodes, the network can startup with two following coldstart nodes, because they can both enter the COLDSTART JOIN macro and decode at least one sync frame or sync frame pair to continue the startup process. This causes a zSyncCalcResult equal to WITHIN_BOUNDS. The argument zStartupX is also greater than zero, because this is the number of startup nodes in even and startup node pairs in odd cycles. The only difference is that the first following coldstart node loses its synchronization after the second coldstart attempt.

Deaf Coldstart Node Failure Model

Figure 20:
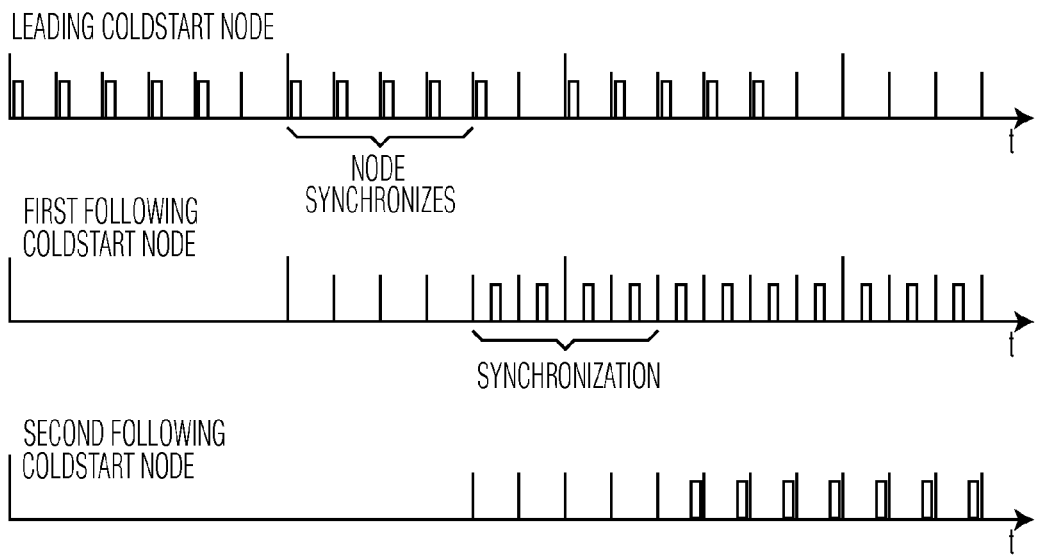
FIG. 20 illustrates an incoming link failure with two following coldstart nodes.

The modeling of the DCN Failure may include three nodes NODE 1, NODE 2, and NODE 3. NODE 2 is the DCN. When one node has an expiring tStartup timer, it enters the coldstart collision resolution state first and transmits the CAS almost immediately. Therefore, the POC process sends a coldstart event to the MTG process. The MTG process sends a Macrotick event to the MAC process, to let the tCASActionPoint-Offset timer expire. This happens almost immediately. The delayed node is still in the coldstart listen state, decodes an idle end on A event and resets the tStartup timer. This makes the transmitting node to the leading coldstart node and other node to a following one. Node 1 is not sending a frame and does not lose a startup attempt. FIG. 20 illustrates an incoming link failure with two following coldstart nodes.

DCN Startup Failure Scenario

The analysis of the possible DCN scenarios leads to another failure scenario. The DCN can overwrite the header of the first leading coldstart node with its CAS, as well as the frames of a second leading coldstart node with its frames. This causes NODE 3 to ignore the overwritten frame from NODE 1 and NODE 1 to abort the startup because of the decoded communication from NODE 3. The frames from NODE 3 are overwritten by NODE 2, the DCN, so that NODE 1 cannot integrate. All nodes lose at least one startup attempt. If the number of startup attempts is configured to the minimum of two, then no node can startup the network anymore. A startup failure occurs.

Figure 21:
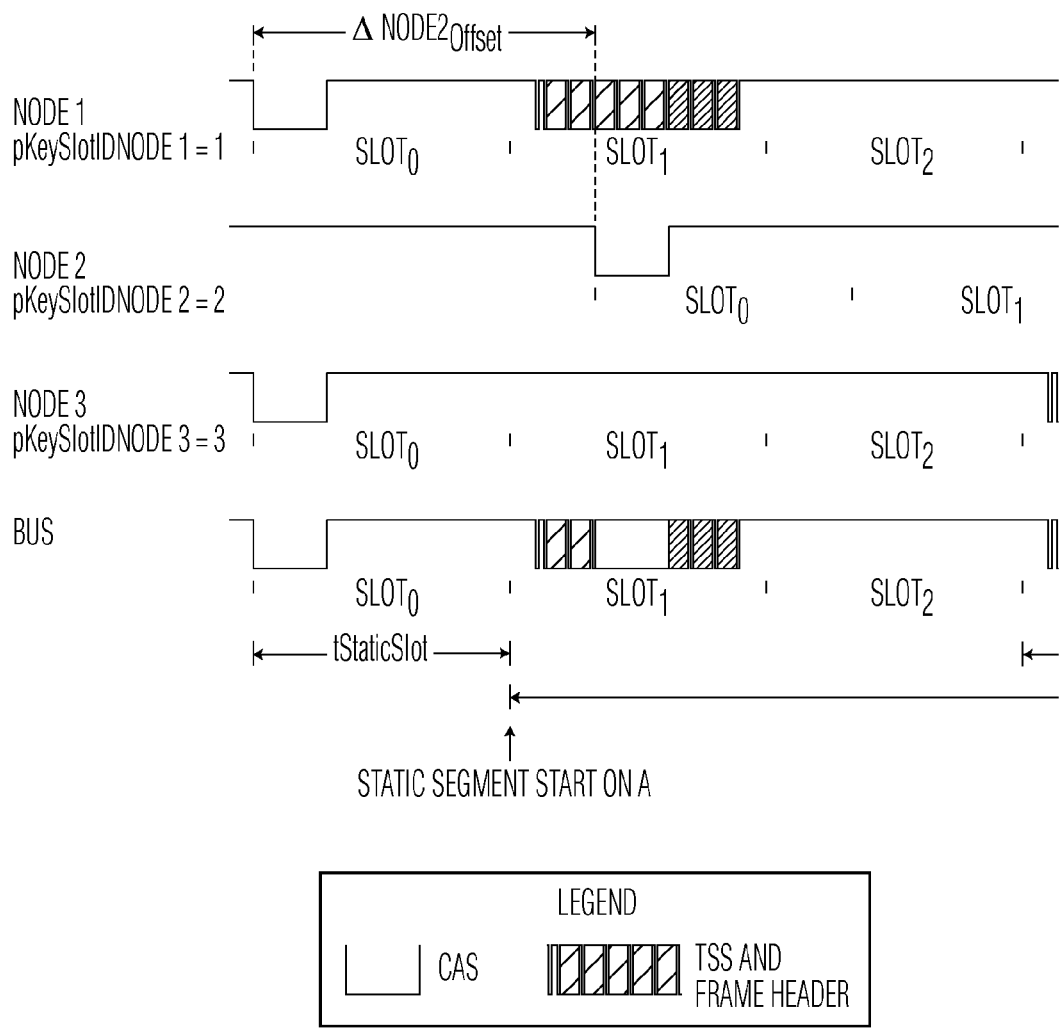
FIG. 21 illustrates a third DCN failure scenario.

For the analysis, it is necessary to create a valid configuration, in which a DCN can overwrite the header of the leading coldstart node and parts of the frames from a second leading coldstart node. FIG. 21 illustrates a third DCN failure scenario. The time from a coldstart node, sending the first Macrotick event to start the transmission of the CAS until the end of the static segment is subdivided. The time from starting the transmission of the CAS to the static segment start on A event is tStaticSlot. Each slot in the static segment has the duration of tStaticSlot. Hence, we can subdivide this time period in slices of the duration of tStaticSlot.

The variable slot, is defined with $i \in N$ to define the slots of a coldstart node in the static segment. In this slots it sends the CAS and the startup frame. Therefore, we define $slot_0$ as the slot in which the CAS is sent. This is possible because of the same length of tStaticSlot.

The slot number of the startup frame depends on the configured parameter pKeySlotID of the node. A pKeySlotID configured to zero, defines a node, which does not send a startup frame. Equation (19) defines the configuration of the parameter pKeySlotID for a coldstart node:

$$0 < pKeySlotID \le gNumberOfStaticSlots \quad (19)$$

The slot in which the node sends its startup frame is defined by $slot_{pKeySlotID}$.

The coldstart nodes are defined by NODE 1, NODE 2 and NODE 3. The DCN is NODE 2. The index of a slot is defined as $i \in N$, $0 \le i \le cStaticSlotIDMax$. NODE 1 and NODE 3 start at the same time to send their CAS at the same time. NODE 1 has the lowest and NODE 3 the highest configured pKeySlotID. The start of the DCN has to be delayed by $\Delta NODE2Offset$, to overwrite the frame header of NODE 1 and the Frame of NODE 3. The nodes transmit the CAS in $slot_0$. The startup frame is sent in $slot_{pKeySlotID}$.

The signals on the bus are also divided in slots. In $slot_0$ the CAS from NODE 1 and NODE 3 is visible. To overwrite the header of the startup frame of NODE 1, NODE 2 has to be delayed by $\Delta NODE2_{Offset}$.

Figure 22:
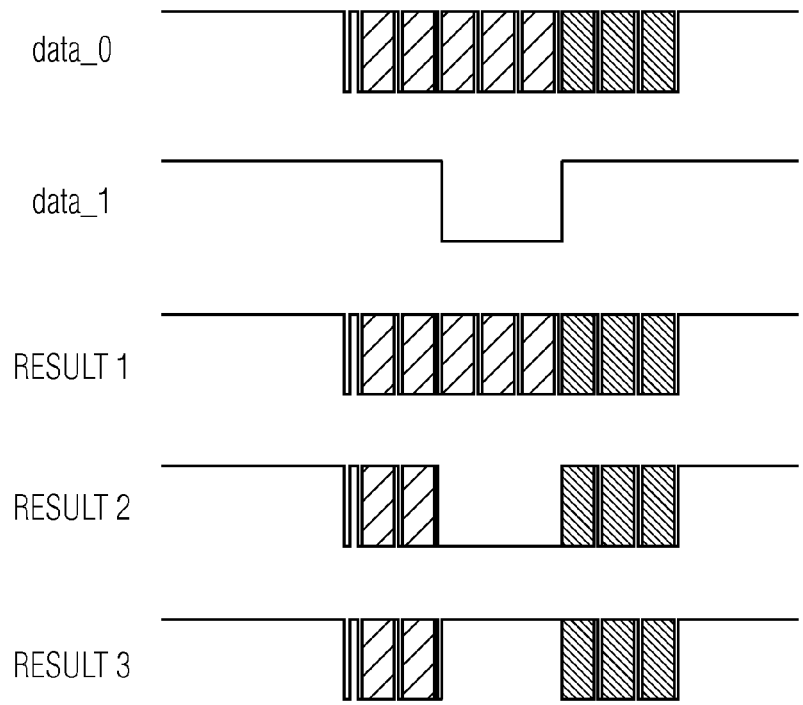
FIG. 22 illustrates overwriting the frame header with a CAS.

Overwriting the frame header with a CAS can result in different ways on the bus level. The FlexRay electrical physical layer specification implies that a collision of data 0 from one node and data 1 from another node equals data 0 or data 1 or idle as a result on the bus. FIG. 22 illustrates overwriting the frame header with a CAS. To prevent NODE 1 from taking the lead, it is necessary that NODE 3 does not decode a valid symbol or header out of the collision. When the CAS is dominant on the bus or the collision results in an idle signal, the start of the overwriting from the frame header with a CAS has a lower and upper bound.

The lower bound is the start of the first BSS. This results at least in a corrupt second BSS, because of the logic low portion of the CAS of cdCAS. The CODEC process of NODE 3 decodes a decoding error on A event and stops decoding the header. The lower bound $\Delta NODE2_{Offset\_CAS\_min}$ is defined in Equation (22) below. Therefore, tActionPoint, defined in Equation (4), tTSS, defined in Equation (6), tBSS, defined in Equation (9), and tByte, defined in Equation (10) are used. We define the length of the logic low portion of the CAS with tCAS in Equation (20):

$$tCAS = cdCAS \quad (20)$$

The start of the CAS transmission of the first leading coldstart node is defined as zero in model's time line. Hence, the start of $slot_{pKeySlotID}$ is defined with Equation (21):

$$tStaticFrame + (pKeySlotID - 1) \cdot tStaticFrame = pKeySlotID \cdot tStaticFrame \quad (21)$$

$$\Delta NODE2_{Offset\_CAS\_min} = pKeySlotID_{NODE1} \cdot tStaticSlot + tActionPoint + tTSS + tFSS + tBSS + tByte - tCAS \quad (22)$$

The upper bound $\Delta NODE2_{Offset\_CAS\_max}$ is defined in Equation (23). Therefore, tHeader defined in Equation (11) is used. The BSS after the header is overwritten from the CAS. This result in a decoding error and not in a header received on A event.

$$\Delta NODE2_{Offset\_CAS\_max} = pKeySlotID_{NODE1} \cdot tStaticSlot + tActionPoint + tHeader \quad (23)$$

The lower and upper bound for the $\Delta NODE2_{Offset}$ also lead to the definition of the minimum frame start of the DCN in Equation (24) and the maximum frame start in Equation (25).

$$\Delta NODE2_{Offset\_CAS\_min} + slot_{pKeySlotIDstart} \quad (24)$$

$$\Delta NODE2_{Offset\_CAS\_max} + slot_{pKeySlotIDstart} \quad (25)$$

Figure 23:
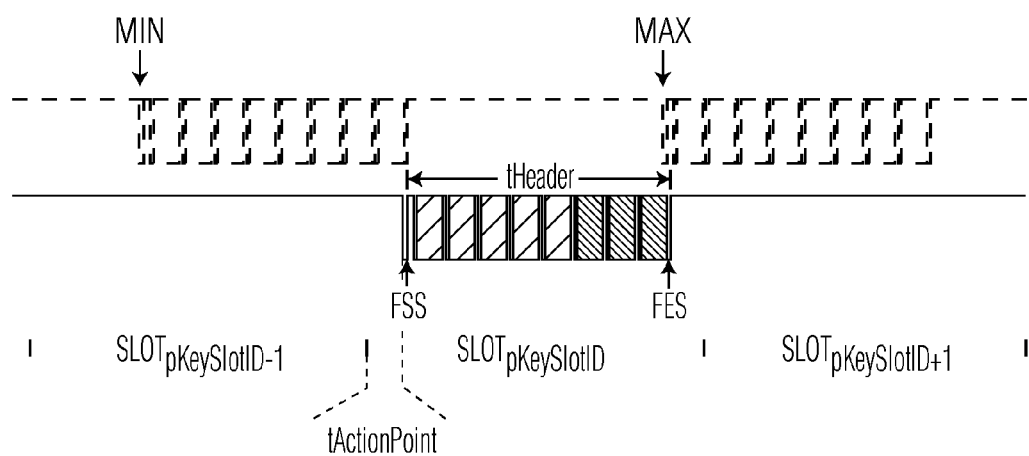
FIG. 23 illustrates the minimum and maximum frame start for a frame collision.

If a frame collides with another frame, there is a lower and upper bound, where this collision results in a decoding error, while decoding the communication on the bus. FIG. 23 illustrates the minimum and maximum frame start for a frame collision. The minimum frame start, to collide with the startup frame of another node, is defined in Equation (26).

$$NODE_{FrameStartMin} = slot_{pKeySlotID} + tActionPoint + tTSS - tFrame \quad (26)$$

The maximum is defined in Equation (27).

$$NODE2_{FrameStartMax} = slot_{pKeySlotID} + tActionPoint + tFrame \quad (27)$$

Because of the graphical representation of the DCN scenario in FIG. 21, it is possible to make the assumption, that Equation (28) is true. It is proven in the following description.

$$pKeySlotID_{NODE2} = pKeySlotID_{NODE3} - pKeySlotID_{NODE1}$$

with $$0 < pKeySlotID_{NODE1} < pKeySlotID_{NODE2} < pKeySlotID_{NODE3} \le cStaticSlotIDMax \quad (28)$$

The configuration parameter from the example may be used to simplify this equation.

$$pKeySlotID_{NODE2} = 3 - 1 = 2 \quad (29)$$

Figure 24:
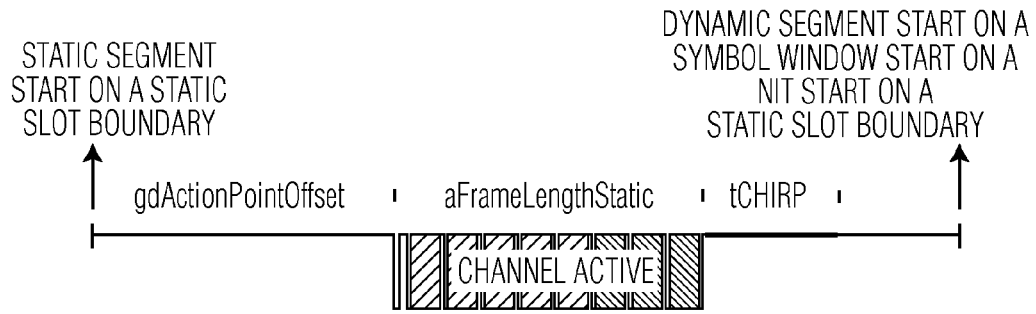
FIG. 24 illustrates the correctness of the minimum and maximum frame start for the DCN.

FIG. 24 illustrates the correctness of the minimum and maximum frame start for the DCN. It is assumed for the minimum delay, that NODE2 starts its frame at $NODE2_{FrameStartMin}$. This is calculated in Equation (30).

$$NODE2_{FrameStartMin} = 2 \cdot tStaticSlot + \Delta NODE2_{Offset\_CAS\_min} = 2 \cdot tStaticSlot + pKeySlotID_{NODE1} \cdot tStaticSlot + tActionPoint + tTSS + tFSS + tBSS + tByte - tCAS = 3 \cdot tStaticSlot + tActionPoint + tTSS + tFSS + tBSS + tByte - tCAS \quad (30)$$

The scenario is valid when following equation is true:

$$\min_{FrameStart} \le NODE2_{FrameStartMin} \le \max_{FrameStart} \Rightarrow 3 \cdot tStaticSlot + tActionPoint + tTSS - tFrame \le 3 \cdot tStaticSlot + tActionPoint + tTSS + tFSS + tBSS + tByte - tCAS \le 3 \cdot tStaticSlot + tActionPoint + tFrame \Rightarrow tTSS - tFrame \le tTSS + tFSS + tBSS + tByte - tCAS \le tFrame \Rightarrow -tFrame \le tFSS + tBSS + tByte - tCAS \le tFrame - tTSS \Rightarrow -tFrame \le 19 \text{ gdBit} \le tFrame - tTSS$$

With the minimum frame length of 80 gdBit and the maximum duration for gdTSSTransmitter of 15 gdBit if follows that:

$$-80 \text{ gdBit} \le 19 \text{ gdBit} \le 65 \text{ gdBit} \quad (31)$$

The scenario is valid with a delay of $\Delta NODE2_{Offset\_CAS\_min}$ for NODE 2. For the maximum value use the following equation may be used:

$$\min_{FrameStart} \le NODE2_{FrameStartMax} \le \max_{FrameStart} \Rightarrow 3 \cdot tStaticSlot + tActionPoint + tTSS - tFrame \le 3 \cdot tStaticSlot + tActionPoint + tFrame \le 3 \cdot tStaticSlot + tActionPoint + tFrame \Rightarrow tTSS - tFrame \le tFrame \le tFrame \quad (32)$$

With the minimum frame length of 80 gdBit and the maximum duration for gdTSSTransmitter of 15 gdBit if follows that:

$$-75 \text{ gdBit} \le 80 \text{ gdBit} \le 80 \text{ gdBit} \quad (33)$$

The scenario is also valid with the highest parameter.

The frame from the DCN collides in both cases with the frame of NODE 3 in a way such that no other node can decode a valid frame. The delay $\Delta NODE2_{Offset}$ is defined in Equation (34).

$$\Delta NODE2_{Offset\_CAS\_min} \le \Delta NODE2_{Offset} \le \Delta NODE2_{Offset\_CAS\_max} \quad (34)$$

To verify Equation (28), choose the $pKeySlotID_{NODE3}$ to be one slot bigger.

$$pKeySlotID_{NODE2} = pKeySlotID_{NODE3} - pKeySlotID_{NODE1} - 1 \quad (35)$$

The configuration parameter from an example may be used to simplify the equation.

$$pKeySlotID_{NODE2} = 4 - 1 - 1 = 2 \quad (36)$$

The minimum delay for a frame start of NODE2 from Equation (26) may be used. The scenario is valid if following equation is true:

$$\min_{FrameStart} \le NODE2_{FrameStartMin} \le \max_{FrameStart} \Rightarrow 4 \cdot tStaticSlot + tActionPoint + tTSS - tFrame \le 3 \cdot tStaticSlot + tActionPoint + tTSS + tFSS + tBSS + tByte - tCAS \le 4 \cdot tStaticSlot + tActionPoint + tFrame \Rightarrow tStaticSlot + tTSS - tFrame \le tTSS + tFSS + tBSS + tByte - tCAS \le tStaticSlotFrame \Rightarrow tStaticSlot - tFrame \le tFSS + tBSS + tByte - tCAS \le tStaticSlot + tFrame - tTSS \Rightarrow tStaticSlot - tFrame \le 19 \text{ gdBit} \le tStaticSlot + tFrame - tTSS \quad (37)$$

The minimum duration of a static slot may be used and gdStaticSlot configured with three MT. A constraint defines the gdMacrotick as shown in Equation (38).

$$gdMacrotick \le ((aFrameLengthStatic - cdFES) \le gdBit - gdSampleClockPeriod + adPropagationDelay - Min) \cdot ((1 \cdot gClockDeviationMax)/(1 + gClockDeviationMax)) \quad (38)$$

It follows Equation (39):

$$gdMacrotick \le tFrame + 1 \text{ gdBit} \quad (39)$$

The tFrame may be subtracted from the gdStaticSlot. Because of tActionPoint Equation (5.40) follows:

$$tStaticSlot - tFrame \ge tActionPoint + 1 \text{ MT} - 1 \text{ gdBit} \Rightarrow tStaticSlot - tFrame \ge 2 \text{ MT} - 1 \text{ gdBit} \quad (40)$$

If the lowest value is assumed the following Equation (51) results:

$$2 \text{ MT} - 1 \text{ gdBit} \le 19 \text{ gdBit} \Rightarrow 2 \text{ MT} \le 19 \text{ gdBit} \quad (41)$$

Using Table B-15 and Table B-17 from the FlexRay Protocol Specification v.3.0.1 it follows that Equation (41) is false. The DCN cannot overwrite the frame from NODE 3. The upper bound is determined as follows. The scenario is valid when following equation is true:

$$\min_{FrameStart} \le NODE2_{FrameStartMax} \le \max_{FrameStart} \Rightarrow 4 \cdot tStaticSlot + tActionPoint + tTSS - tFrame \le 4 \cdot tStaticSlot + tActionPoint + tFrame \le 4 \cdot tStaticSlot + tActionPoint + tFrame \Rightarrow tStaticSlot + tTSS - tFrame \le tFrame \le tStaticSlot + tFrame \quad (41)$$

With the use of Equation (41) it follows that the DCN node cannot overwrite the frame from NODE 3 in this configuration for the key slots. Hence, there is a configuration in which the DCN cannot overwrite the frames from NODE 1 and NODE 3, and this is depicted by Equation (42).

$$p\text{KeySlotID}_{NODE3} \neq 2 \cdot p\text{KeySlotID}_{NODE1} \text{ with } p\text{KeySlotID}_{NODE} > 1 \tag{42}$$

This can be used as a prevention method.

A scenario in which the DCN overwrites the header of NODE 1 and the frames of NODE 3 is therefore possible. All nodes count down one startup attempt when they enter the state coldstart collision resolution. NODE 1 cannot integrate into the startup attempt of NODE 3, because all frames from NODE 3 are corrupted. After NODE 3 and the DCN have lost all coldstart attempts, and all nodes are silent. A startup problem occurs.

Even if more than three coldstart nodes are used, that all start at the same time, they all lose one startup attempt and cannot take the lead after the DCN remains silent. The only possibilities to prevent this scenario are the configuration of the slots, shown in Equation (42), and a higher number of coldstart attempts than two.

Babbling Idiot Failure Analysis

The analysis of the Babbling Idiot failure is confined to the static segment. The nodes are synchronized in this segment. A Babbling Idiot can transmit frames or random data at any time. The static segment begins with the decoded event static segment start on A. From there it is divided in the static slots. A new static slot begins with the event slot boundary on A. The last static slot ends with one of the events dynamic segment start on A, symbol window start on A, or NIT start on A.

The event depends on the configuration of the node and is transmitted from the MAC process. Nodes can be configured to send frames without a dynamic segment and symbol window. A static segment starts with an idle time of gdActionPointOffset, and it follows a time window of aFrameLengthStatic, where the channel can be active. The event CHIRP on A indicates that the channel is idle again. Until the slot boundary the node stays idle. This is depicted in FIG. 24.

To decode a frame, the variable zChannelIdle in the BITSTRB A process has to be true. This happens when the tIdle timer expires. Hence, the channel has to be idle for at least 11 gdBit to be declared as idle. The first low bit decoded from the BITSTRB A process causes the event CE start on A.

The CODEC process reacts to this event and starts decoding the incoming bits. When one of the checked sequences in the frame is incorrect, the decoding error on A event is sent. When a node has to send its own frame in a slot, the decoding halted on A event is sent. This causes the CODEC process to transition to the state wait for CE start. A sending node does not listen to the bus when the frame is supposed to be transmitted. The MAC process generates the slot boundary event and starts the tActionPoint timer. When it is expired, the transmit frame on A event is sent to the CODEC process. The CODEC process generates the decoding halted on A event, stops decoding, and encodes the frame. After the frame is transmitted, the CODEC process sends the decoding started on A event to indicate this.

A babbling node can affect the static segment at every point in time. When the idle phase is corrupted, other nodes try to decode a frame. If there is no CHIRP on A event decoded at the end of the idle phase, a following frame is also not decoded. If the babbling node sends data that collides with a frame, it can cause decoding errors. This causes decoding nodes also to wait for the next generated CE start on A event.

A Babbling Idiot can also send correct frames in wrong slots. This is decoded by the CODEC process of the other nodes and causes the content error on A event, when the FSP process checks the content. This happens when, e.g., the decoded FrameID does not equal the vSlotCounter.

When the synchronization frames are discarded, the other nodes can even lose synchronization. The SyncCalcResult MISSING TERM in odd cycles and EXCEEDS BOUNDS in even and odd cycles cause the POC process to transition to the POC:halt state. The POC:halt state transitions to the POC operational state. The node starts new and tries to synchronize again.

Failure Analysis Summary

The RLCN and the DCN can affect the startup process in a way to create a startup failure scenario. In case of the RLCN this can happen in critical phases that cause the scenario. Assumed that the failure can be contained, the other coldstart nodes can startup the network. It is also possible to get very critical failures that cause that the startup attempts of all coldstart nodes to count down. When the vRemainingColdstartAttempts variable reaches a value less than two, the coldstart nodes have no startup attempts left when a containment would take place. The containment does not help anymore.

The Babbling Idiot can cause nodes to discard frames that were corrupted in their slots. The extreme is a monopolization of the bus by transmitting data in all slots. This causes a loss of synchronization. The network has to start up again. Below a solution based on the analyzed behavior of these failures is described.

Solution to Overcome Failures

The solution may include a prevention, a detection, and a containment part for each failure scenario. The analysis depicts the behavior of nodes on a bus when a failure is present. Based upon the above failure analysis detection processes have been developed to find and observe critical regions in which the errors cause problems. The detectors flag failures via output events to other processes. To further improve the robustness, containment methods are developed to ensure a safe startup and to stop faulty nodes from propagating their failure through the network.

The processes may be part of one or more guardian modules. Therefore these guardians may have almost the whole functionality of a node to observe the bus. It is not necessary for the guardians to send signals or frames. The processes of the FlexRay Protocol Specification are used to fulfill these tasks. In some cases existing behavior may be extended in order to detect failures. The analysis also illustrated that network configuration rules may improve the robustness of the FlexRay network. These rules are described below.

A guardian solution may be placed locally on a CC or in a central device on the network. The local and central placement guardians are described below.

SDL descriptions are used to describe the various processes in order to be consistent with the FlexRay Protocol Specification and as a base for implementing the modules afterwards, for example in hardware such as integrated circuits. Finally there is example description of how to implement the developed detectors in hardware.

Error Prevention

Error prevention may be accomplished by special configurations or by following certain configuration rules. Therefore it is necessary that the configuration still follows the FlexRay Protocol Specification.

The DCN failure occurs only in a special configuration of three coldstart nodes with two coldstart attempts. To prevent the DCN failure more than three coldstart nodes may be used in the network or the number of allowed coldstart attempts may be increased. But when this special configuration is present, it is also possible to set up the coldstart nodes in a way in which they cannot affect each other, when the failure occurs. In this case Equation (42) may be used to constrain the slot numbers in which the three coldstart nodes send their startup frames. Currently, the other two failure scenarios may not be prevented using network architecture.

Error Detection

Below detectors for the three failure scenarios are described. The detector processes the existing FlexRay Protocol Specification to be extended for certain events. These modifications are described first.

All processes may start in a terminated state and may be woken up by a POC of the guardian. This may be done for implementation purposes, because a process cannot be terminated or created in a hardware description language. Therefore the detectors may be extended with the terminated state, and the detectors may transition in and out with terminate and create events.

Extensions to the FlexRay Protocol Specification

The existing FlexRay Protocol Specification may be extended to localize certain errors during the decoding of frames. For localization purposes in a central device, the design may be extended with branch information, so that it may be determined from which branch an activity was initiated.

The decoding error on A event type of the CODEC is extended as shown in Table 1.

TABLE 1

Redeclaration of the formal definition of T_DecodingError.

newtype T_DecodingError
   literals CAS_MTS_TOO_SHORT,
   CAS_MTS_TOO_LONG, FSS_TOO_LONG,
   HEADER_BSS_FIRST_BIT, HEADER_BSS_SECOND_BIT,
   HEADER_CRC_NOT_OK, PAYLOAD_BSS_FIRST_BIT,
   PAYLOAD_BSS_SECOND_BIT, TRAILER_BSS_FIRST_BIT,
   TRAILER_BSS_SECOND_BIT, FRAME_CRC_NOT_OK,
   FES_FIRST_BIT, FES_SECOND_BIT;
endnewtype;

Legend: Old, new

All modifications to existing FlexRay processes are marked with a grey box in the following SDL figures.

Figure 25:
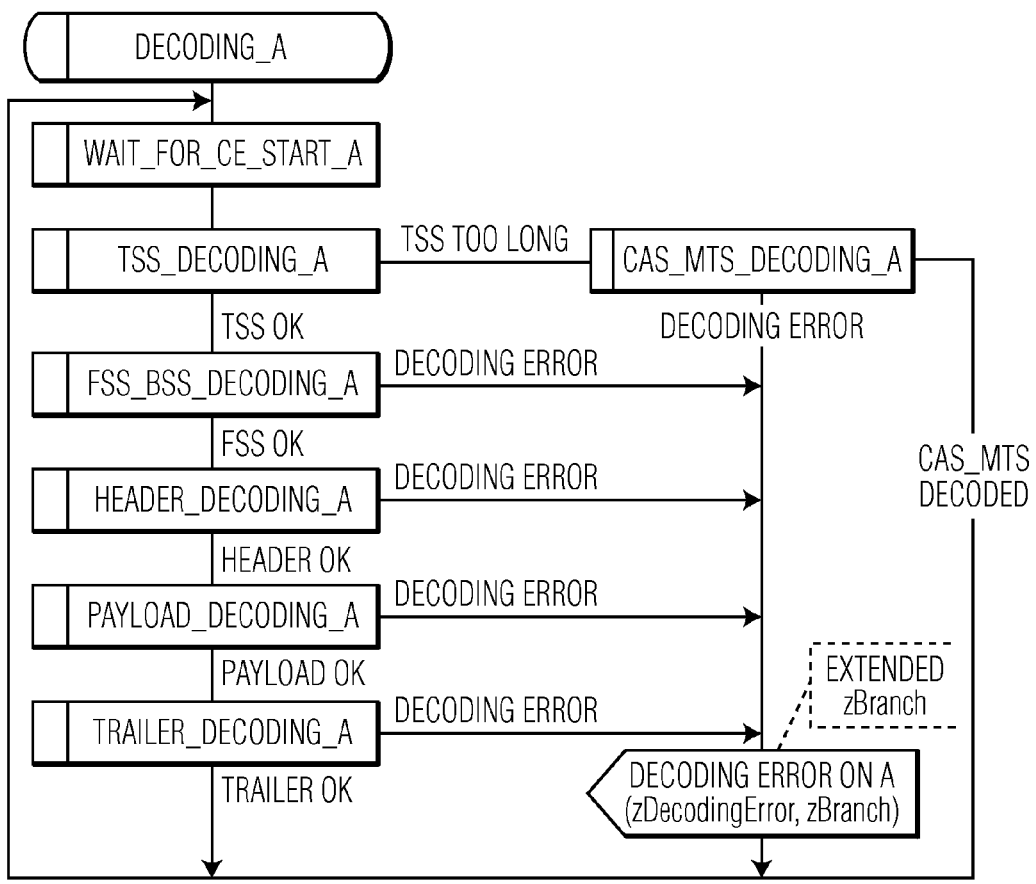
FIG. 25 illustrates modification of the DECODING_A macro.
Figure 26:
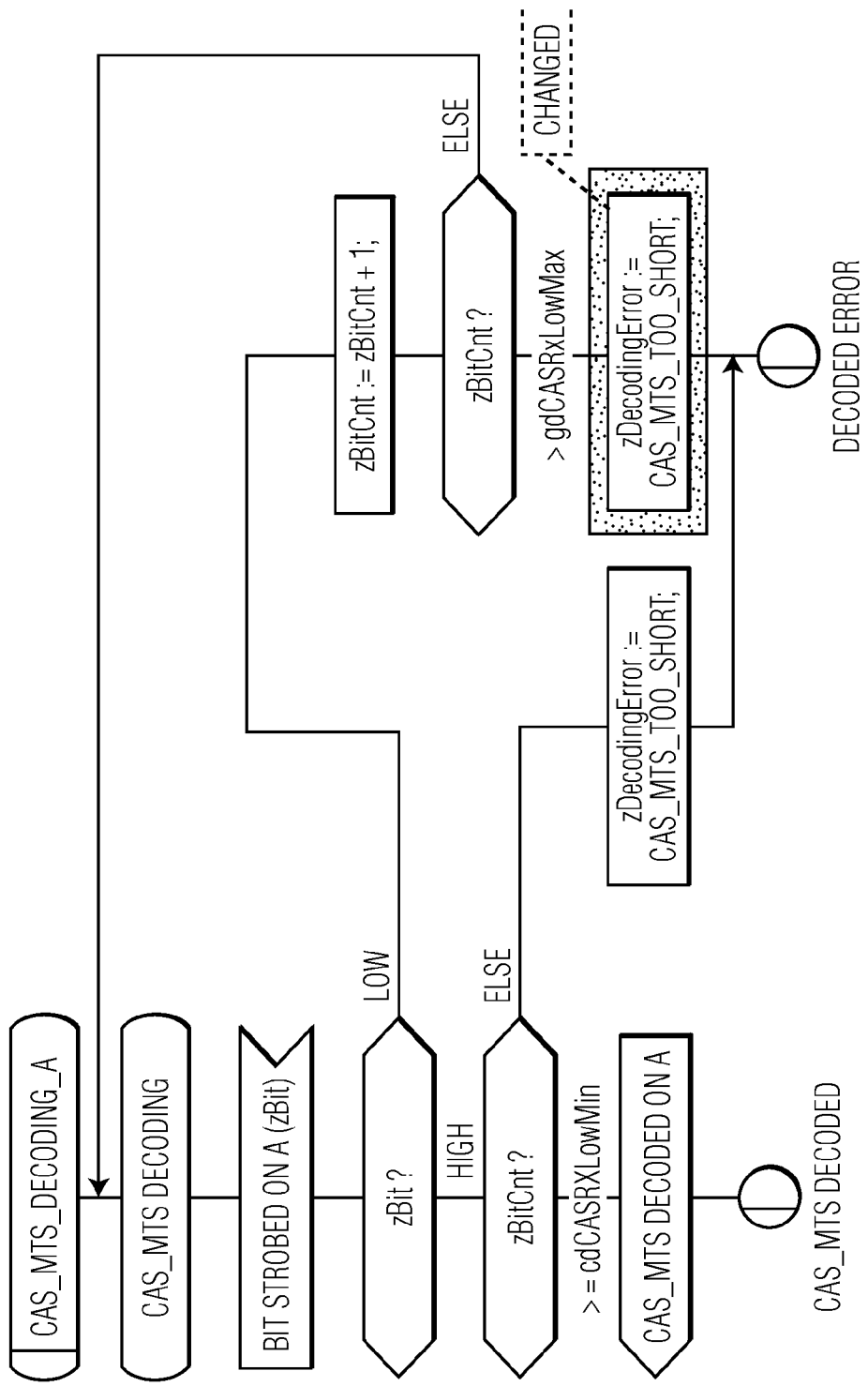
FIG. 26 illustrates modification of the CAS_MTS_DECODING_A macro.

The error type UNSPECIFIED is replaced by the more specific, new types in the DECODING_A process. Therefore, the UNSPECIFIED error declaration is deleted and changed to a shown in FIG. 25. The extension zBranch is described later. As illustrated in FIG. 26, in the CAS_MTS_DECODING macro the unspecific error is changed to CAS_MTS_TOO_LONG.

Figure 27:
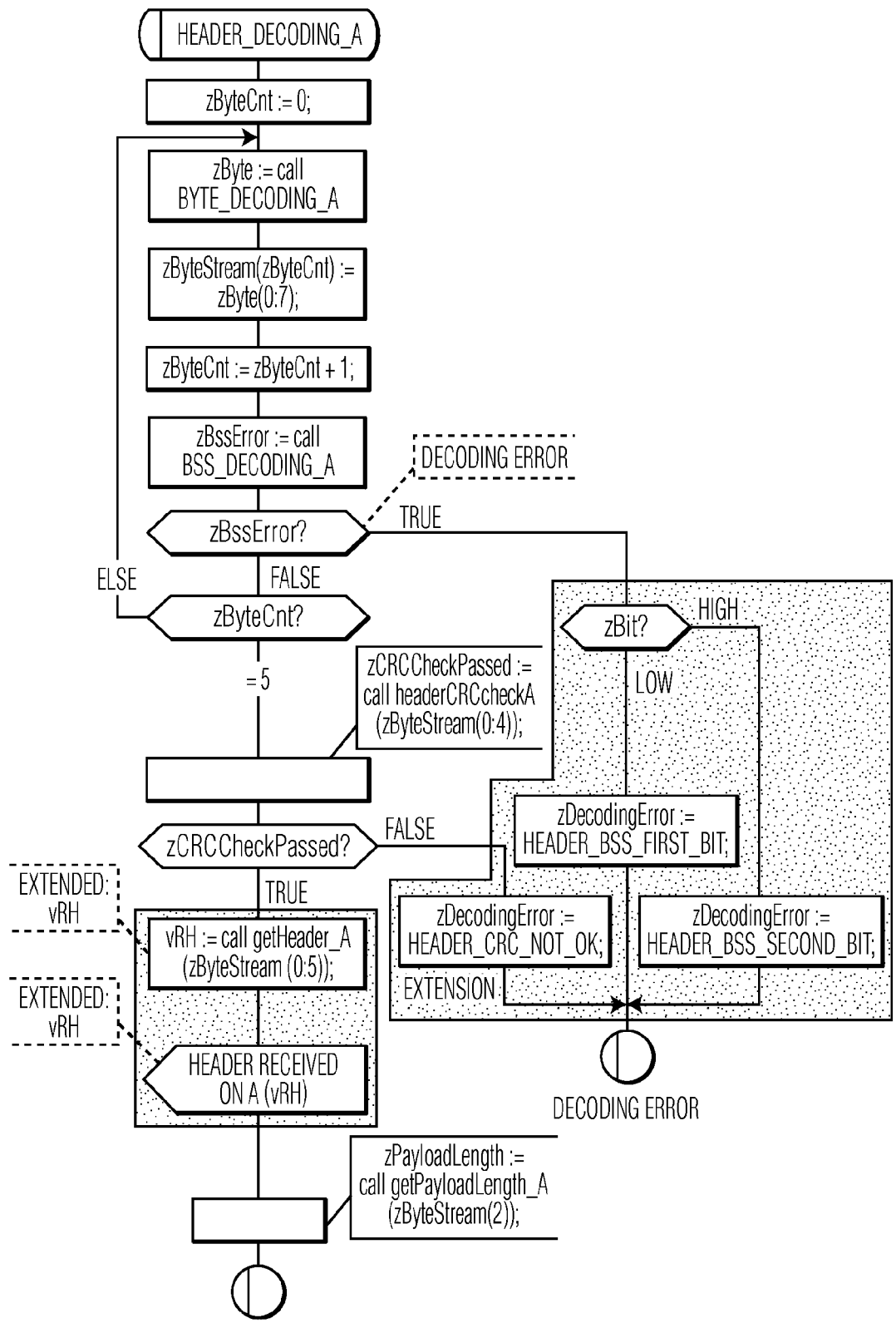
FIG. 27 illustrates extensions to the HEADER_DECODING_A macro.
Figure 28:
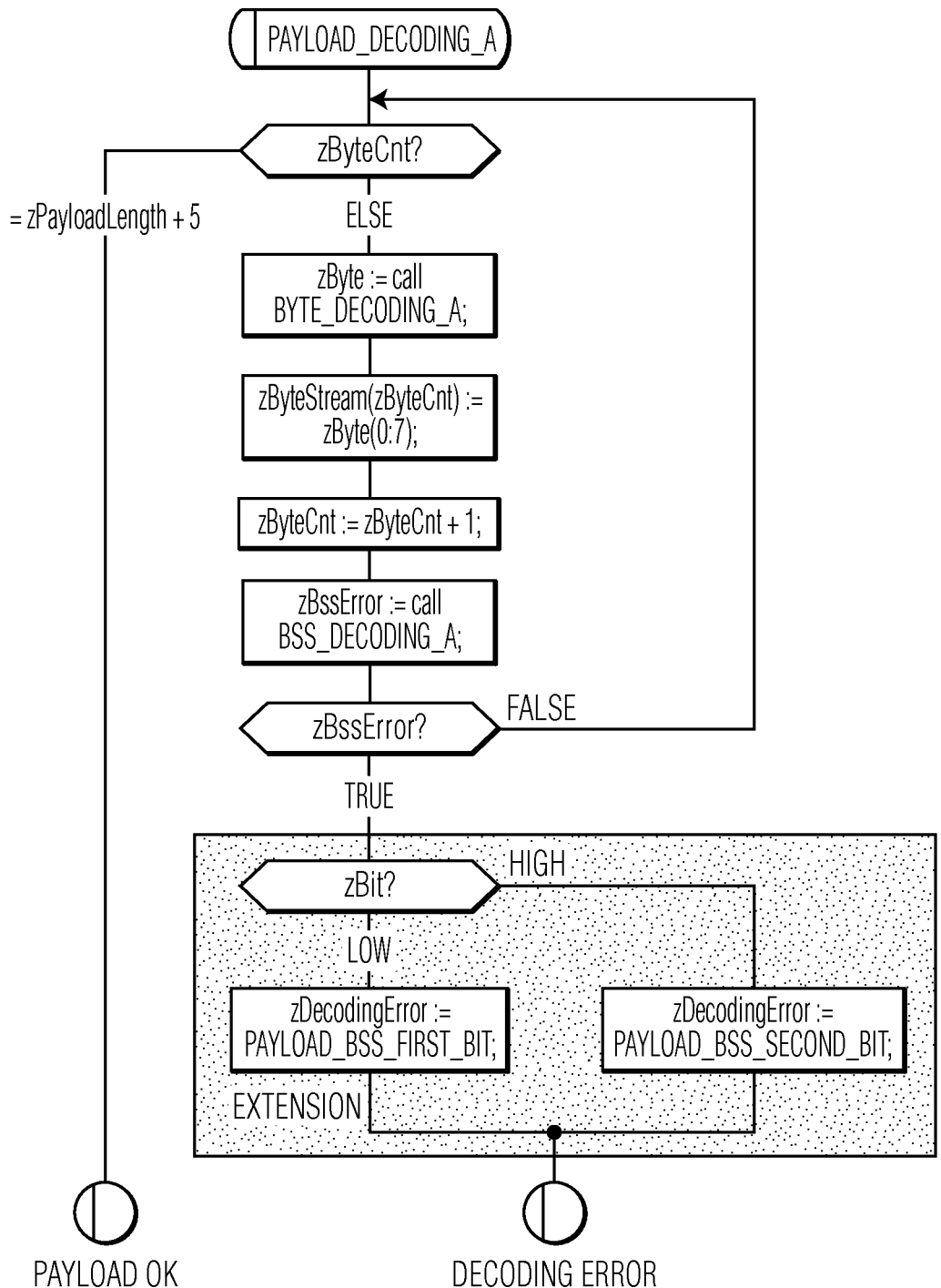
FIG. 28 illustrates extensions to the PAYLOAD_DECODING_A macro.
Figure 29:
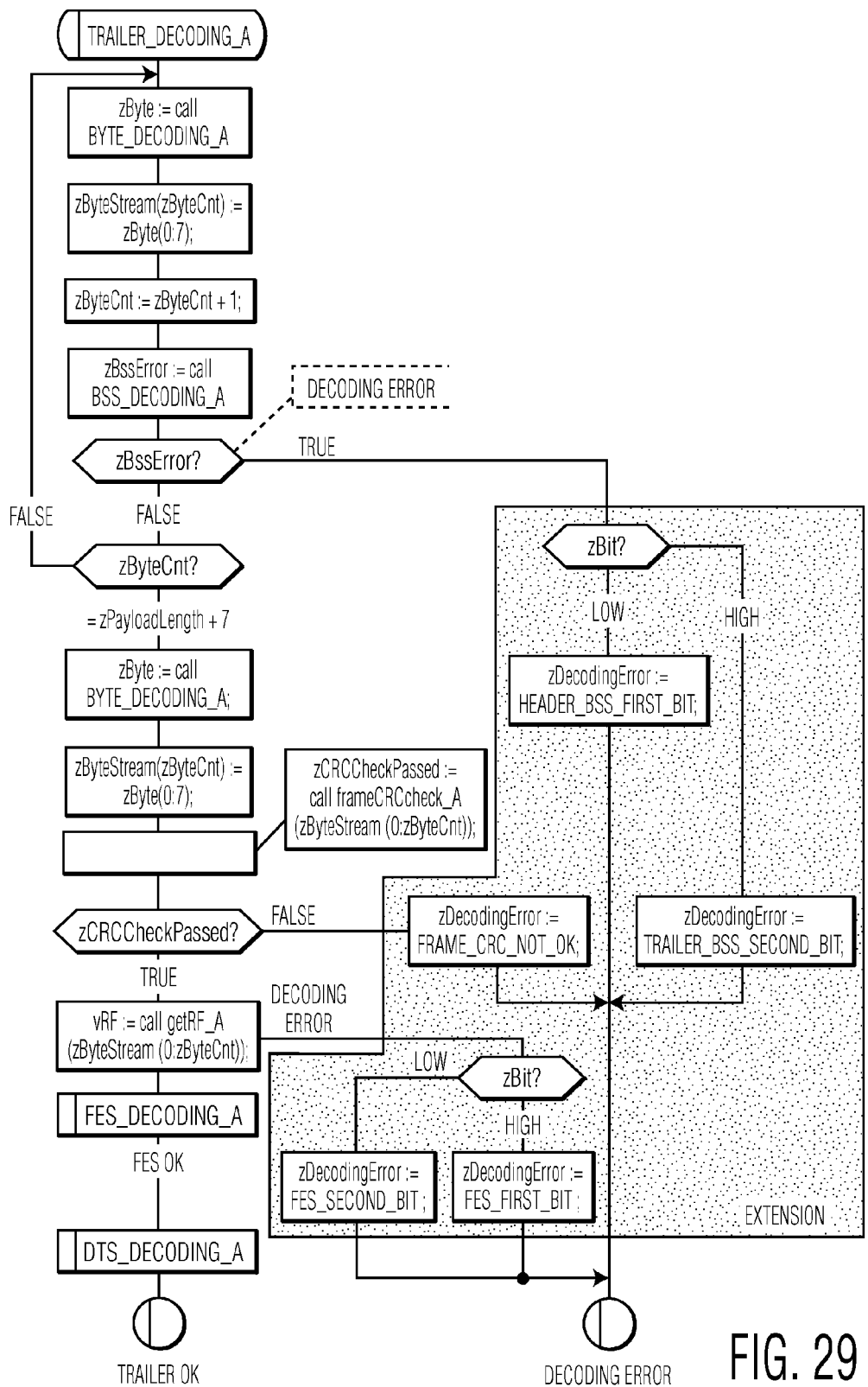
FIG. 29 illustrates extensions to the TRAILER_DECODING_A macro.

FIG. 27 illustrates extensions to the HEADER_DECODING_A macro. The HEADER_DECODING_A macro is extended with specifics to the BSS bit, when the decoding error occurs. Therefore the zBit is interpreted. FIG. 28 illustrates extensions to the PAYLOAD_DECODING_A macro. The CRC check is also extended with a specific error type of HEADER_CRC_NOT_OK. The variable zBit is also used in the PAYLOAD_DECODING_A macro, to expose the specific error type. The last changes are made in the TRAILER_DECODING_A macro. FIG. 29 illustrates extensions to the TRAILER_DECODING_A macro. The BSS error may be specified in the same way as previously described. The frame CRC check may be extended with the error type FRAME_CRC_NOT_OK. The FES error is extended for the first and second bit. It follows that it is possible to detect header, payload, trailer, and FES errors, for the first and second bit of the sequence with these extensions.

The received header type is extended with the decoded frame information vRH. Therefore, new function called getHeader_A may be defined. It may be used in FIG. 27 to extract the decoded header from zByteStream and to return it via the structure variable vRH.

In a central device it is possible to detect which branch is active. Therefore, the events CE start on A, decoding error on A, and content error on A with the argument zBranch may also be extended. The argument is of type T_Branch and returns the branch numbers that are active while sending the specific event.

Resetting Leading Coldstart Node Detection

The detection process for the RLCN may observe the startup phase until enough nodes have joined communication to start up the network, even if a RLCN is present in the system. After a startup, the RLCN detection process waits for a decoded CAS to start again. This marks a new startup attempt.

FIG. 30 illustrates the declarations that define the used variables. It is necessary to define the new type T_RLCNDetectorError for storing the specific error, as shown in Table 2.

TABLE 2

Figure 31:
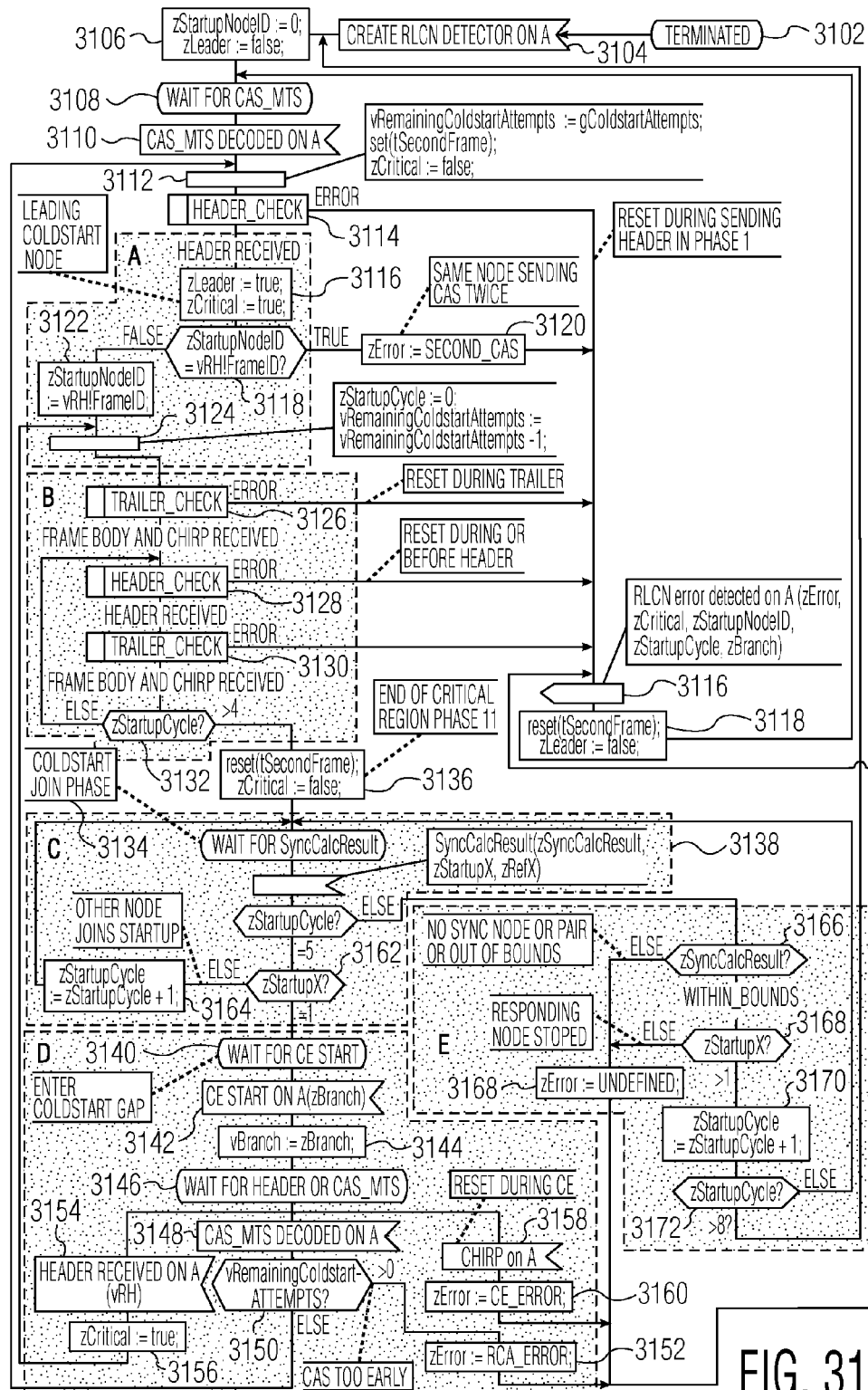
FIG. 31 illustrates the RLCN detection process.

Formal definition of T_RLCNDetectorError newtype T_RLCNDetectorError
   literals HEADER_ERROR, TRAILER_ERROR, SECOND_CAS,
   CE_ERROR, RCA_ERROR, MISSING_FRAME, UNDEFINED;
endnewtype;

FIG. 31 illustrates the RLCN detection process. The RLCN detector may be based on the phases defined with the analysis of the RLCN scenario described above. The phases from FIG. 18 may be used to describe the behavior of the RLCN detector. The RLCN detector may include a header validator 3180, trailer validator 3182, RLCN synchronization analyzer 3184, CE start state detector 3186, and RLCN synchronization error detector 3188. The header detector 3180 detects if a valid header has been received on the FlexRay network. The trailer validator 3180 detects when a valid trailer has been received after the valid header has been received on the FlexRay network. The RLCN synchronization analyzer 3184 analyzes the synchronization state of the FlexRay network during the cold start process. The CE start state detector 3186 detects when the FlexRay network is in the CE start state. The RLCN synchronization error detector 3188 detects when a synchronization error occurs during the cold start process. Each of these elements will be discussed in further detail below.

When the RLCN detector is transition out of the terminated state by the create RLCN detector on A 3102, the RLCN detector may initialize the variable zStartupNodeID with zero 3104, which is not a valid ID of a frame. The variable zLeader may be set to false 3106. It may be used to indicate, that a leading coldstart node is found. The RLCN_DETECTOR_A process transitions to the wait for CAS_MTS state 3108. The RLCN_DETECTOR_A process waits for a decoded CAS 3110, which indicates that a node tries to start the network. If the CAS_MTS decoded on A event is signaled, the variable vRemainingColdstartAttempts is set to the global parameter gColdstartAttempts 3112. The variable zCritical is set to false 3112. It indicates if a RLCN is resetting in one of the phases that cause a startup failure scenario when it is set to true.

Figure 32:
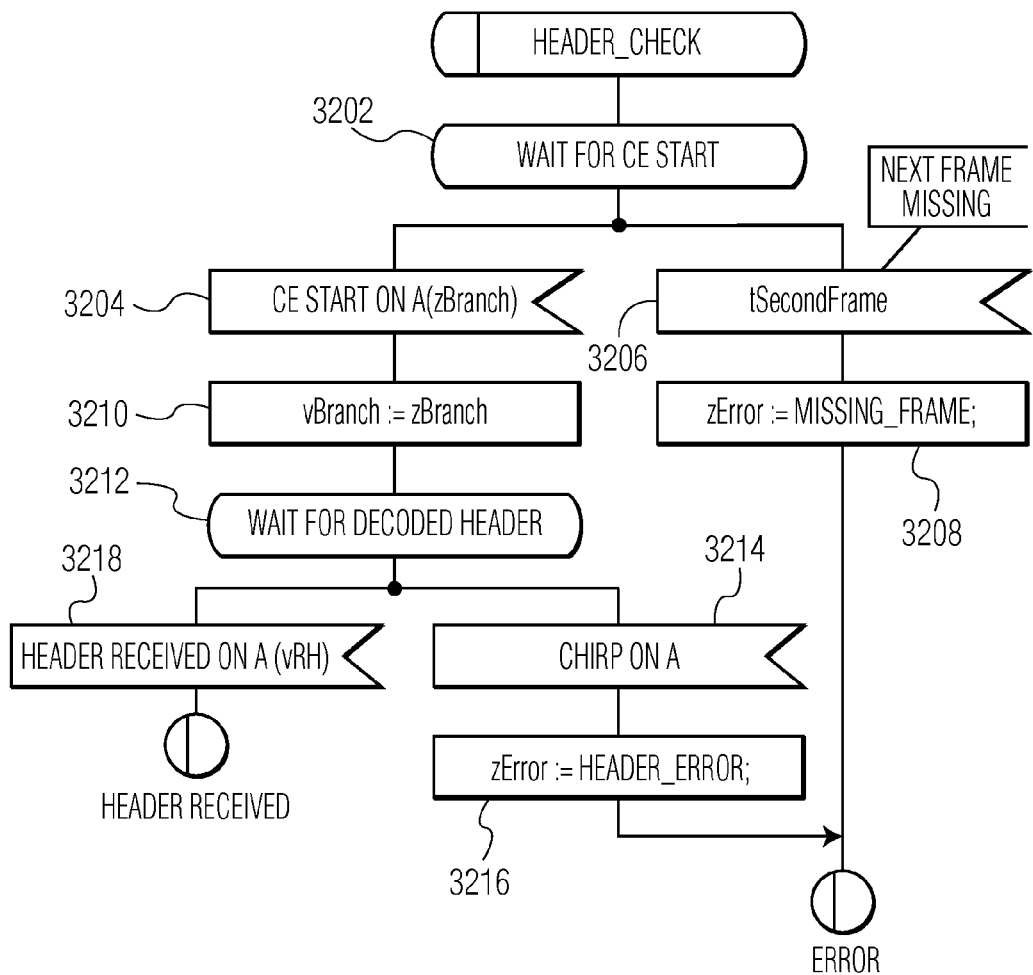
FIG. 32 illustrates the HEADER_CHECK macro.

The timer tSecondFrame is started after decoding the CAS in Phase $P_1$. The RLCN_DETECTOR_A process enters the HEADER_CHECK macro 3114. FIG. 32 illustrates the HEADER_CHECK macro. The RLCN_DETECTOR_A process transitions to the wait for CE start state 3202. It waits for a CE start on A event 3204 or the expiration of the tSecondFrame timer 3206. The tSecondFrame timer of the RLCN_DETECTOR_A process is started eleven gdBit times earlier than the tSecondFrame timer in the CSS process a coldstart node that has decoded the CAS.

When it expires, the coldstart node enters the coldstart collision resolution state and transmits the next CAS to start up the network. If the tSecondFrame timer in the HEADER_CHECK macro expires, no node is sending a frame. The error MISSING_FRAME is set and signaled 3208. The node that sends the CAS has stopped transmitting in P1. The RLCN_DETECTOR_A process transitions to the wait for CAS_MTS state and waits for the next decoded CAS event 3116, 3118, 3108.

A valid header is expected after the reception of a CAS. A decoded CE start on A event leads the RLCN_DETECTOR_A process to store the argument zBranch with the information of the transmitting branches in the variable vBranch 3210. If a CE start on A event is decoded, but does not result in a header received on A but instead in a CHIRP on A event, it is assumed that the leading node executed a restart in Phase P1 during the transmission of the header. This is signaled by setting the error HEADER ERROR 3212, 3214, 3216.

After decoding the first valid header 3218, using the HEADER_CHECK macro, the variable zLeader is set to true 3114 (see Box A in FIG. 31). The variable indicates that the transmitting node is the leading coldstart node. The received frame ID is compared with the stored ID in zStartupNodeID 3118. If they are equal, the transmitting node tries to start up the network for the second time 3120. The leading node has performed a reset in Phase P2 or Phase P3 before. The error SECOND_CAS is sent and the RLCN_DETECTOR_A process transitions back to the wait for CAS_MTS state 3108. If the ID not equal after decoding the first valid header, a leading node starts the network the first time 3122.

The variable zStartupCycle is set to zero and the remaining coldstart attempts stored in vRemainingColdstartAttempts is decreased by one 3124. After the leader selection the next four startup cycles are observed, beginning with the trailer of the current one.

Figure 33:
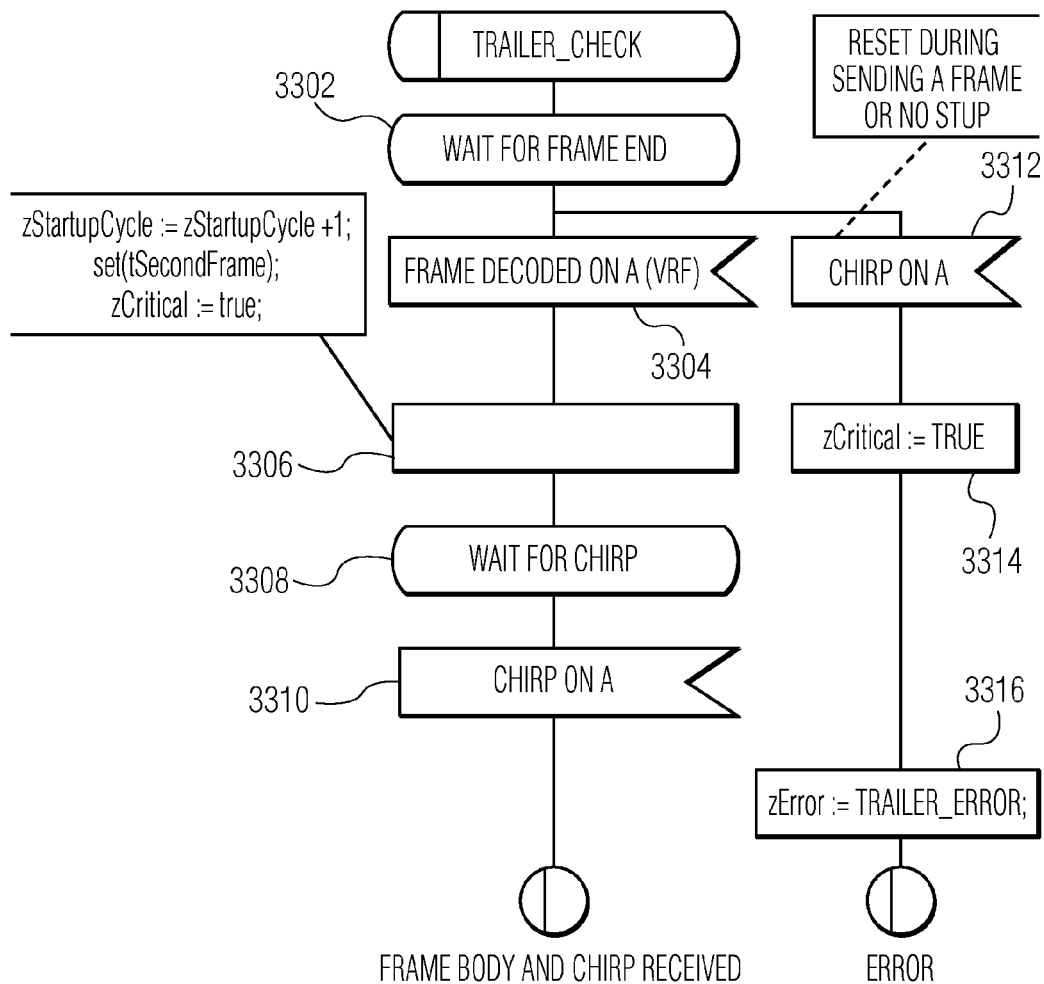
FIG. 33 illustrates the TRAILER_CHECK macro.

The RLCN_DETECTOR_A process enters the TRAILER_CHECK macro and transitions to the state wait for frame end 3126. FIG. 33 illustrates the TRAILER_CHECK macro.

If the RLCN_DETECTOR_A process receives a frame decoded on A event, a valid frame is decoded 3302, 3304. The variable zStartupCycle is increased, and the timer tSecondFrame is set 3306. The variable zCritical is set to true 3306. If a reset occurs the node can be in one of the critical regions P2, P3, P6, P7 or P10. The process transitions to the wait for CHIRP state 3308 and waits for a CHIRP on A event 3310.

If the RLCN_DETECTOR_A process is in the wait for frame end state and the leading node resets during the transmission of the frame, then this is signaled by a CHIRP on A event 3312 and results in setting the error TRAILER ERROR 3314. The reset is in the critical phase P2, P5, P9 or P10. Therefore, zCritical is set to true 3316.

The RLCN_DETECTOR_A process signal the RLCN error detected on A and transitions to the wait for CAS_MTS state 3108. The header and TRAILER_CHECK is done in a loop, until zStartupCycle reaches five 3128, 3130, 3132 (see Box B in FIG. 31). In cycle five the other coldstart nodes can join the startup 3134. Hence, the last decoded frame could also be a frame from another node than the leading coldstart node. This happens if the configured key slot of the following coldstart node is lower than from the leading coldstart node. A decoded frame in the fifth cycle indicates that the leading coldstart node is in Phase P11 or P12. These phases are not critical. The variable zCritical is set to false 3136.

In the NIT the SyncCalcResult is analyzed (see Box C 3138 in FIG. 31). The number of startup nodes zStartupX is used to decide if a node is joining in cycle five, or if the leading coldstart node goes into the coldstart gap phase. If the zStartupX argument has the value of one, only the startup frame from the leading nodes was transmitted during the cycle. The leading node goes into the coldstart gap phase. The RLCN_DETECTOR_A process transitions to the wait for CE start state 3140 (see Box D in FIG. 31). If the next decoded CE is started 3142, the branch information, from the argument zBranch, is stored in the variable vBranch 3144 to know the branch number of the sending node. The RLCN_DETECTOR_A process transitions to the wait for header or CAS_MTS state 3146.

If a new CAS is decoded 3148, it is determined if the node that transmitted before the CAS was decoded still had startup attempts left 3150. This is stored in the variable vRemainingColdstartAttempts. If the variable vRemainingColdstartAttempts is greater than zero, it results in the RCA_ERROR 3152, which indicates left remaining coldstart attempts. The event RLCN error detected on A is sent and the RLCN_DETECTOR_A process transitions back to the wait for CAS_MTS state 3108.

If the CAS_MTS decoded on A event is received in the wait for CE start event and the variable vRemainingColdstartAttempts is zero, a startup attempt from another coldstart node is assumed and observed. The RLCN_DETECTOR_A process enters the first HEADER_CHECK macro after setting the variable vRemainingColdstartAttempts, the timer tSecondFrame and the variable zCritical. If the RLCN_DETECTOR_A process is in the wait for header or CAS_MTS state and receives a header received on A event 3154 it sets the variable zCritical to true 3156, resets the variable zStartupCycle to zero, and counts down one startup attempt 3124.

The coldstart node has left the coldstart gap phase and has started the next coldstart attempt. The RLCN_DETECTOR_A process enters the TRAILER_CHECK macro 3126 (see Box B in FIG. 31).

If the RLCN_DETECTOR_A process is in the wait for header or CAS_MTS state and receives a CHIRP on A event 3158, this results in the error CE_ERROR 3152.

The detector process has not decoded a valid CE and transmits the RLCN error detected on A event. The process transitions back to the wait for CAS_MTS state 3108.

If a node joined in the fifth cycle, the zStartupX argument is greater than one 3162 (see Box C 3138 in FIG. 31). The zStartupCycle is increased by one 3164. The next sync calc results show how many nodes have joined. If the number is less than two, or a zSyncCalcResult differing from WITHIN_BOUNDS occurs 3166, an UNDEFINED error is stored in zError 3168 (see Box E in FIG. 31). When no error occurs the RLCN_DETECTOR_A process observes the cycles until the $9^{th}$ cycle 3168, 3170, 3172 and transitions back to the wait for CAS_MTS state 3108. It is assumed that all nodes are in normal operation.

When an error is detected this results in transmitting the RLCN error detected on A signal. This includes the arguments zError, zCritical, zStartupNodeID, zStartupCycle and zBranch.

Figure 34:
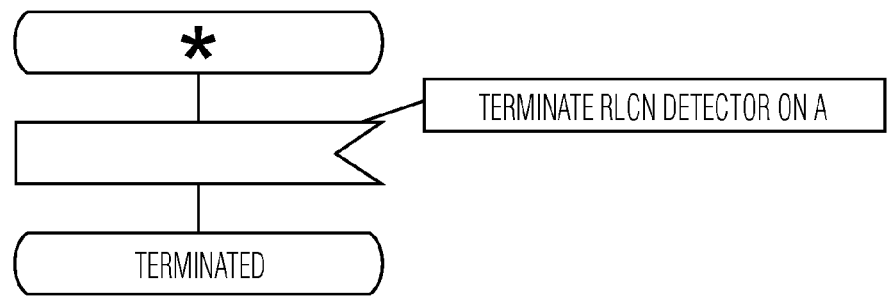
FIG. 34 illustrates the mechanism to terminate the whole RLCN process.

FIG. 34 illustrates the mechanism to terminate the whole RLCN process. This is only used if a protocol error occurs.

Deaf Coldstart Node Detection

The DCN detector observes the startup process until more than two startup frames are seen during one communication cycle. When a deaf node is detected, relevant information is stored, a failure type is saved, and the DCN error on A output flags this. For this error it is necessary to define the new type T_DCNDetectorError, as shown in Table 3.

TABLE 3

| Formal definition of T_DCNDetectorError |
| --- |
| newtype T_DCNDetectorError<br>literals SECOND_CAS_ERROR, MULTIPLE_NODES_SEND, SECOND_CHECK_FAIL, CAS_MTS_TOO_LONG;<br>endnewtype; |

FIG. 35 illustrates the declarations for the DCN detector.

Figure 36:
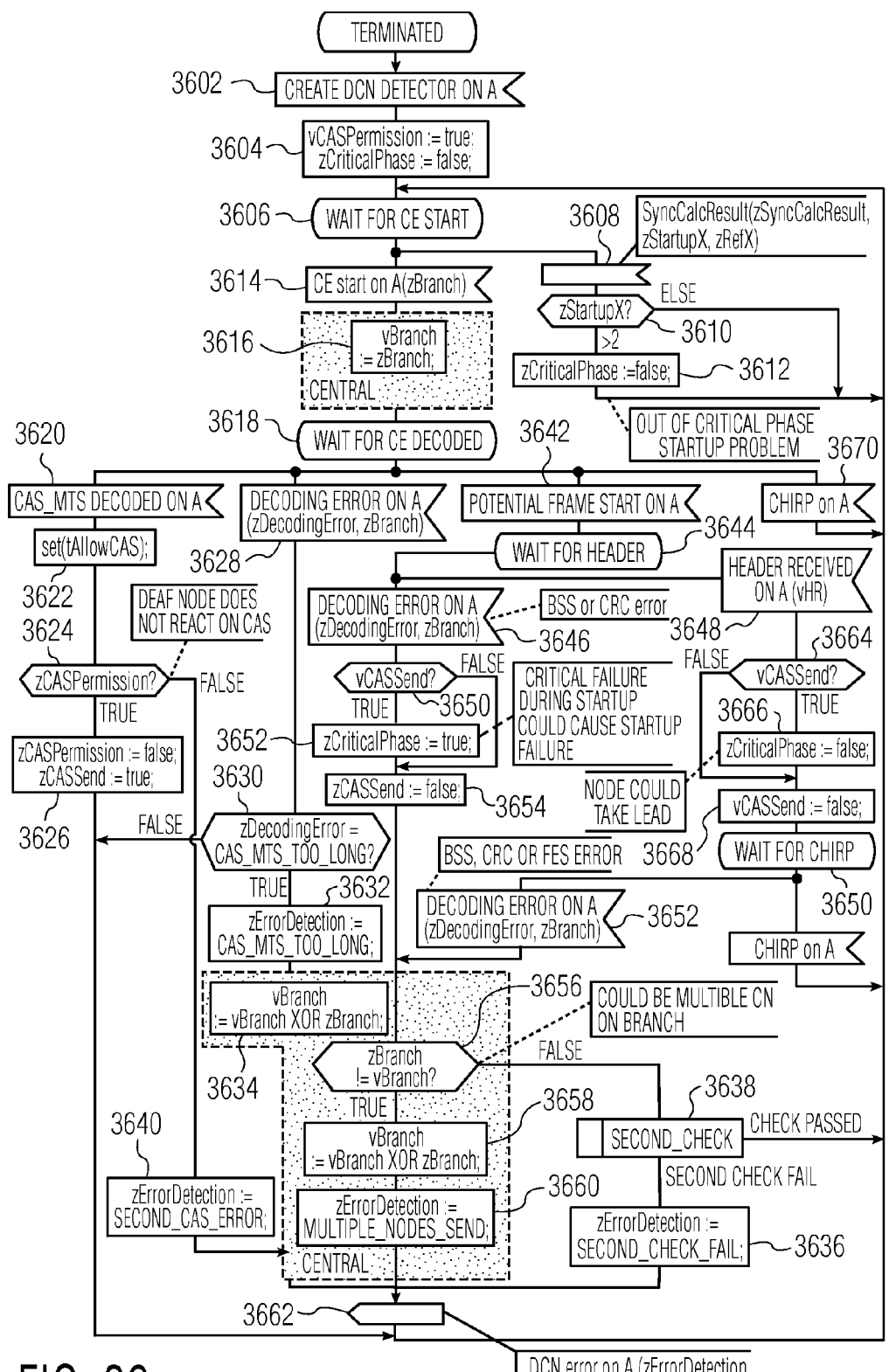
FIG. 36 illustrates the extended DCN_DETECTOR_A process.

FIG. 36 illustrates the extended DCN_DETECTOR_A process. If the DCN detector is placed centrally, overwriting can also be detected when more than one node sends data at the same time from different branches. Therefore the DCN detector uses the later described parts in the grey marked regions that are extensions to the DCN_DETECTOR_A process. The DCN detector may be placed locally at a CC, and if so the marked regions are not used. The basic concept of detecting a DCN is to detect collisions and frames or symbols that are out of the schedule.

If a frame is decoded and the CODEC process signals a decoding error on A event, a sequence like BSS or FES or one of the CRC checks failed. The DCN detector waits for the next awaited sequence and decodes it to determine if the next awaited sequence is also corrupted. The DCN detector signals a DCN error on A event because of a collision.

The DCN_DETECTOR_A process transitions to the wait for CE start state 3606 when it is created with the create DCN detector on A event 3602. The variable vCASPermission is set to true 3604 to indicate that a decoded CAS is allowed. The variable zCritical is also set to true 3604 to indicate that the communication can be in a critical region. The critical region ends with the receiving of a valid header from the leading coldstart node.

If the DCN_DETECTOR_A process is in the wait for CE start state, then it observes the ongoing communication until more than one startup node are detected 3608, 3610. Therefore, the argument zStartupX from the zSyncCalcResult has to be greater than two 3610. If this is the case, the variable zCriticalPhase is set to false 3612. If the DCN_DETECTOR_A process is in the wait for CE start state and receives a CE start on A event 3614, then the variable vBranch is set to the value of the argument zBranch 3616 to store the active branches. The DCN_DETECTOR_A process transitions to the wait for CE decoded state 3618.

The timer tAllowCAS is set when a CAS is decoded. The variable zCASPermission is checked 3624. Is the value false, the CAS is transmitted during the time window of tAllowCAS. This leads to the error SECOND_CAS_ERROR 3640. It is stored in the zErrorDetection variable. A decoded second CAS in this time window indicates that the transmitting node has not decoded the first CAS.

Figures 40, 41:
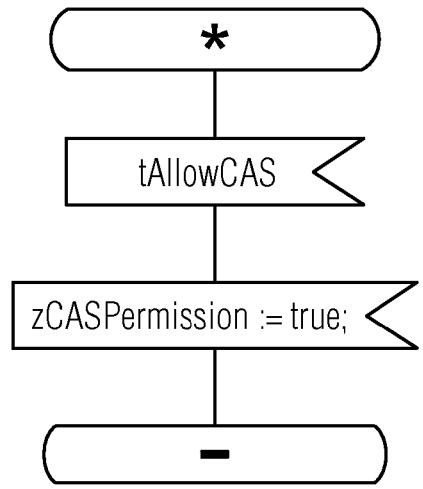
FIG. 40 illustrates the concurrent process of the timer tAllowCAS.
FIG. 41 illustrates the declaration of the used variables for Babbling Idiot failure detection.

The node is deaf. Therefore, the DCN error on A event is transmitted. The DCN_DETECTOR_A process transitions back to the wait for CE start state. When the timer tAllowCAS expires zCASPermission is set to true again. FIG. 40 illustrates the concurrent process of the timer tAllowCAS.

If the CAS is decoded 3620 and the variable zCASPermission is set to true 3622, then a node tries the first startup attempt 3624. The DCN_DETECTOR_A process sets the variable zCASPermission to false and the variable vCASSend to true 3626. The variable vCASSend indicates that the first CAS of a startup attempt is received. The communication on the bus is in the critical region. The process transitions back to the wait for CE start state 3606.

If the DCN_DETECTOR_A process is in the wait for CE start state and receives a decoding error with the argument CAS_TOO_LONG 3628, 3630, then the deaf node could have started sending its CAS. This is stored as CAS_MTS_TOO_LONG in zErrorDetection 3632. In the central device, the branch information of the transmitting node is stored in the variable vBranch with an XOR operation of the old branch information 3634. Hence, just the changed branch is stored in the variable. This is the branch of the DCN. The DCN_DETECTOR_A process signals the DCN error on A event and transitions back to the wait for CE start state 3606.

If the DCN_DETECTOR_A process receives a decoding error other than CAS_MTS_TOO_LONG when it is in the wait for CE decoded state 3630, then it transitions back to the wait for CE start state 3606. It is no indication for a DCN scenario. When the first potential frame start is decoded in the state wait for CE decoded 3642, then the DCN_DETECTOR_A process transitions to the wait for header state 3644.

There are two possible events in this state: the decoding error on A event 3646; and the header received on A event 3648. If the decoding error on A event is received, the detector checks the variable vCASSend 3650. If there was a CAS before, the variable has the value true and the phase is critical. Therefore, the variable zCriticalPhase is set to true 3652. The variable vCASSend is set to false 3654 to indicate that the last CE is no CAS.

In the central device, the DCN_DETECTOR_A process checks the branch information 3656. If a transmitting branch during the decoding error does not equal the stored branch from the last CE start on A event, the new branch information is stored in the variable vBranch with the XOR operation on the old branch information 3658. The error MULTIPLE_NODES_SEND is stored in the variable zErrorDetection 3660. This indicates that more than one node is transmitting at the same time. The DCN error on A event is transmitted 3662 and the DCN_DETECTOR_A process transitions back to the wait for CE start state 3606. If this branch information equal, a SECOND_CHECK is performed 3638. A local device, directly transitions from the wait for header state to the SECOND_CHECK macro when the decoding error on A event is received.

Figure 37:
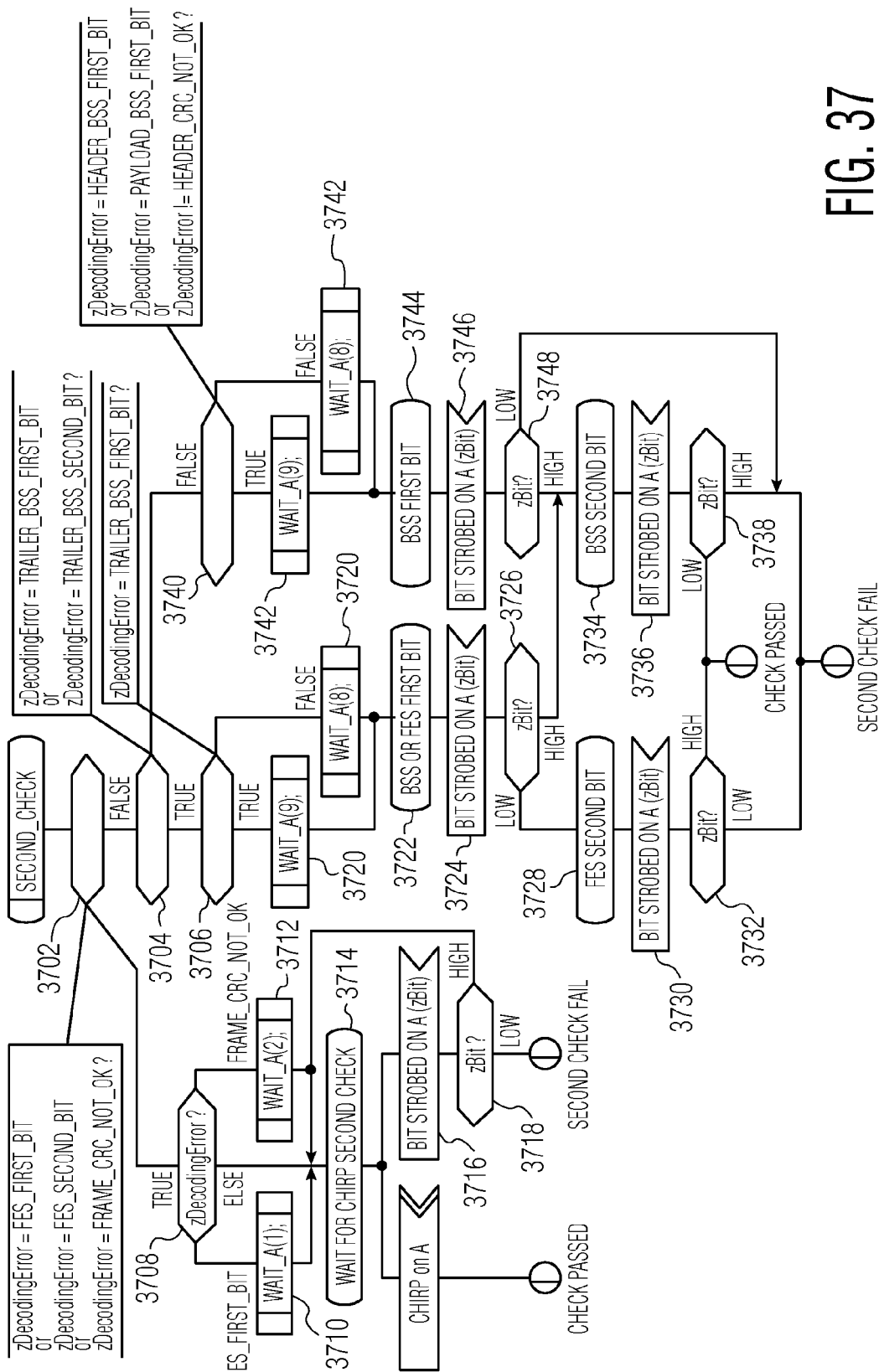
FIG. 37 illustrates the extended SECOND_CHECK macro.

FIG. 37 illustrates the extended SECOND_CHECK macro. The SECOND_CHECK macro is also entered when the DCN_DETECTOR_A process is in the wait for header state, receives a valid header on A event 3648 and receives a decoding error on A event 3652 during waiting for a CHIRP in the wait for CHIRP state 3650. In the central device, the branch data is also checked like described before. The local device enters directly the SECOND_CHECK macro 3638. The SECOND_CHECK macro checks the next awaited sequence after the decoding error, to see if this is also corrupted 3702, 3704, 3706. If the next sequence also corrupted it indicates another node sending data that collides with another frame. The awaited sequence can be the next BSS, the FES or a phase of at least 11 gdBit times of idle after the frame. This depends on the first error. The SECOND_CHECK macro first checks the extended decoding error information, to localize the corrupted bit in the frame.

Figure 38:
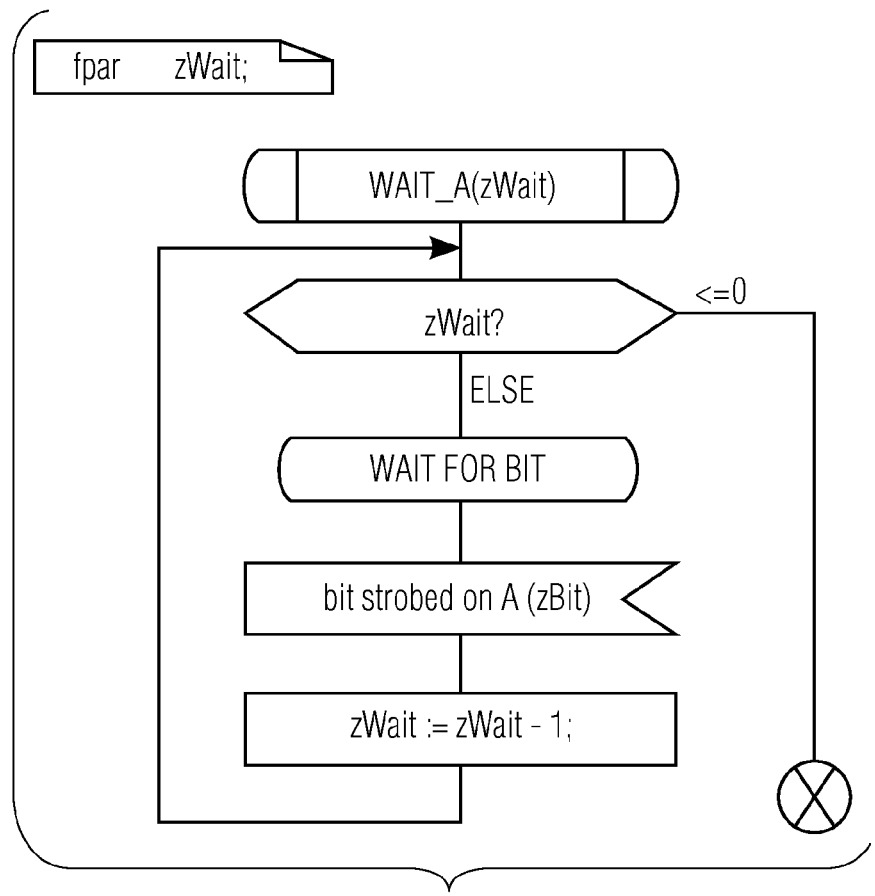
FIG. 38 illustrates the function WAIT_A( )

The DCN_DETECTOR_A process waits until the corrupted sequence is over and the next one starts. Therefore, it uses the function WAIT_A( ). FIG. 38 illustrates the function WAIT_A( ). The detector waits for the frame end and transitions into the wait for CHIRP SECOND_CHECK state, if the first decoding error is signaled during decoding the FES 3708, 3710, 3712, 3714 (see FIG. 28). The DCN_DETECTOR_A process waits for the CHIRP on A event 3714, that indicates a decoded high phase of 11 gdBit. If a low bit decoded in this phase, it indicates a second failure 3716, 3718. The SECOND_CHECK macro exits with SECOND_CHECK fail. The DCN_DETECTOR_A waits for the next BSS or FES 3720 when the decoding error in a trailer BSS 3706 and transitions to the BSS or FES first bit state 3722. The next bit strobed on A event gives the argument zBit 3724. If the bit low 3726, it is assumed that it is the first bit of the FES and the DCN_DETECTOR_A process transitions to the FES second bit state 3728. If the next strobed bit is high 3730, 3732, the SECOND_CHECK macro exits with check passed. Else it exits with SECOND_CHECK fail. The FES is also corrupted by a deaf node. If the strobed bit in the BSS or FES first bit state is a high bit, then it is assumed, that this sequence is a BSS in the trailer. The DCN_DETECTOR_A transitions to the BSS second bit state 3734 and checks the next strobed bit 3736, 3738. If it a low bit, the SECOND_CHECK macro exits with check passed, else it has decoded a second failure and exits with SECOND_CHECK fail.

The third case is a decoding error in the header or payload segment 3740. Therefore, the SECOND_CHECK macro waits 3742 for the next BSS and transitions to the BSS first bit state 3744. The next strobed bit has to be high 3746, 3748 to enter the BSS second bit state 3734. If it low, the SECOND_CHECK macro exits with SECOND_CHECK fail. In the other case the DCN_DETECTOR_A process checks the second bit of the BSS as described above.

If the macro SECOND_CHECK exits with check passed, then the DCN_DETECTOR_A process transitions to the wait for CE start state 3606. If the macro exits with SECOND_CHECK fail, the variable zErrorDetection is set to SECOND_CHECK FAIL 3636, the DCN_DETECTOR_A process signals the DCN error on A event 3622 and transitions back to the wait for CE start state 3606. A DCN failure is detected.

When the DCN_DETECTOR_A process is in the wait for header state and receives the header received on A event 3648, then the variable vCASSend is checked 3664.

The value of the variable is true when the last decoded CE is a CAS. The variable zCriticalPhase is set to false 3666, because the first leading coldstart node has taken the lead by sending the CAS. Other coldstart nodes abort their startup attempt and can integrate in the startup attempts of the DCN. The variable vCASSend is set to false 3668 to indicate that the current CE is no CAS. The DCN_DETECTOR_A process transitions to the wait for CHIRP state 3650. The decoding error on A path is described above. When the DCN_DETECTOR_A process receives the CHIRP on A event 3670, the frame is transmitted and the CHIRP is decoded after the frame. The DCN_DETECTOR_A process transitions back to the wait for CE start state 3606.

DCN error on A signals the error zErrorDetection, if the error happened in a critical phase by zCriticalPhase and the involved branches.

Figure 39:
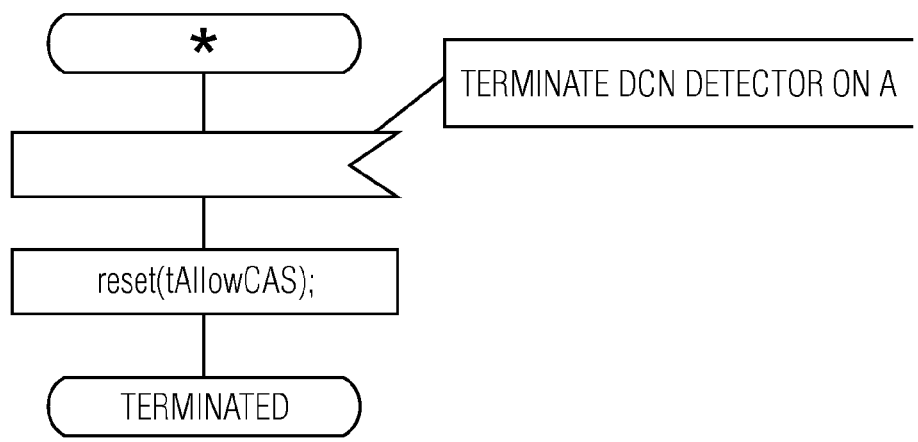
FIG. 39 illustrates the mechanism to terminate the whole DCN process.

The POC of the guardian solution may terminate this process by terminating the DCN detector on A. FIG. 39 illustrates the terminate DCN detector on A process.

Babbling Idiot Detection

The Babbling Idiot detector is started by the POC when the guardian is already synchronized, using the start BI_DETECTOR_ON A event. It detects babbling nodes in the idle phases between frames in the static segment and in the NIT, by not allowing CE start on A events during those phases. During time windows where frames can be send in the static segment the Babbling Idiot detector reacts to decoding and content errors and counts them. When this counter exceeds gCBGMaxTolFaults, the Babbling Idiot detector signals a babbling node.

Figure 42:
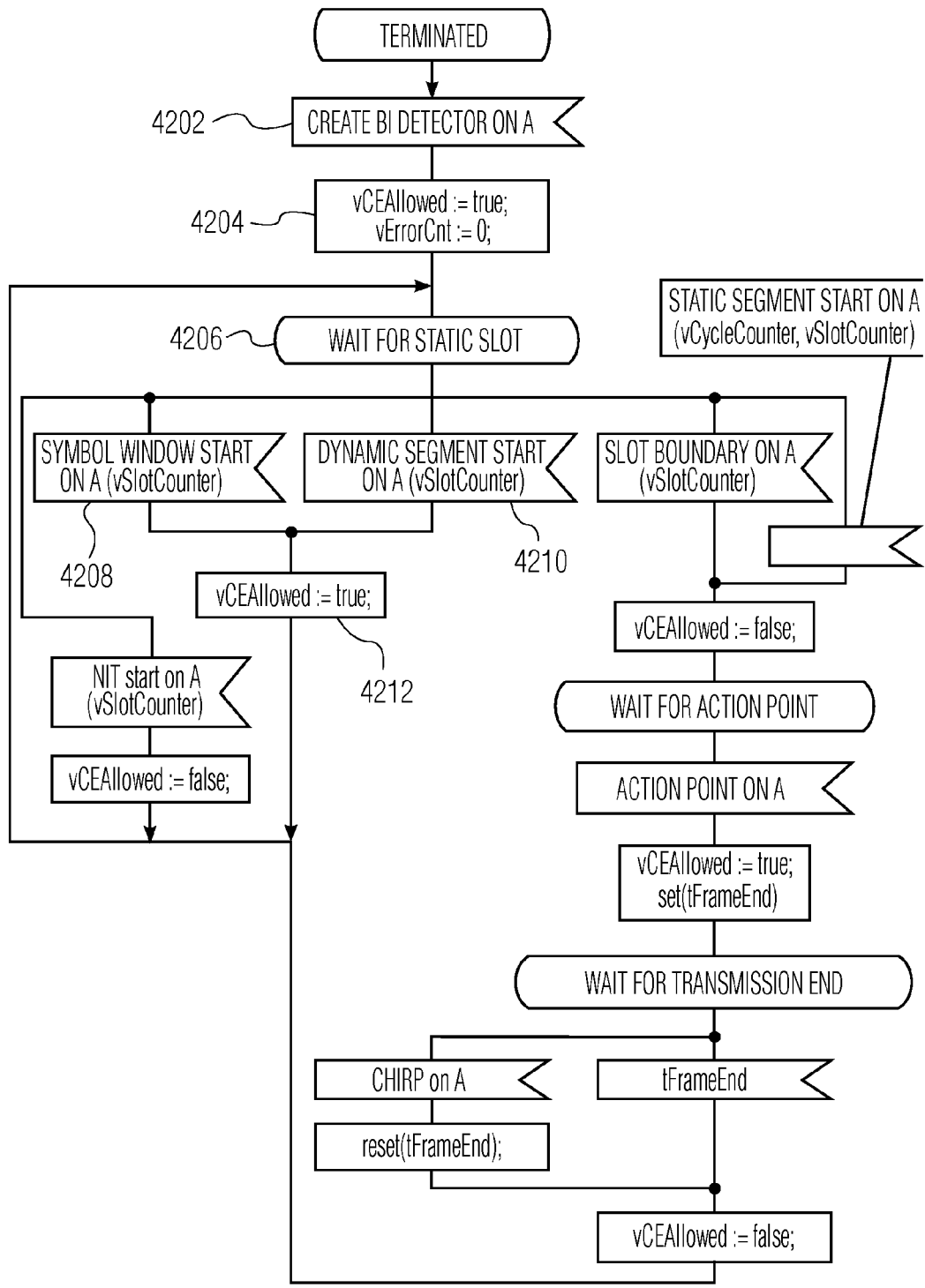
FIG. 42 illustrates the BI_DETECTOR_ON A process.

FIG. 41 illustrates the declaration of the used variables for Babbling Idiot failure detection. FIG. 42 illustrates the BI_DETECTOR_ON_A process. First, the bi detector on A process is created 4202. Next, the vCEAllowed variable is set to true to indicate that a CE start on A is allowed 4204. The vErrorCnt is set to zero 4204. A misbehaving node is detected in the idle phase between a sent frame and the next frame start when a CE start on A is decoded 4206, 4208, 42010. This phase is marked by setting the variable vCEAllowed to false 4212.

Figure 43:
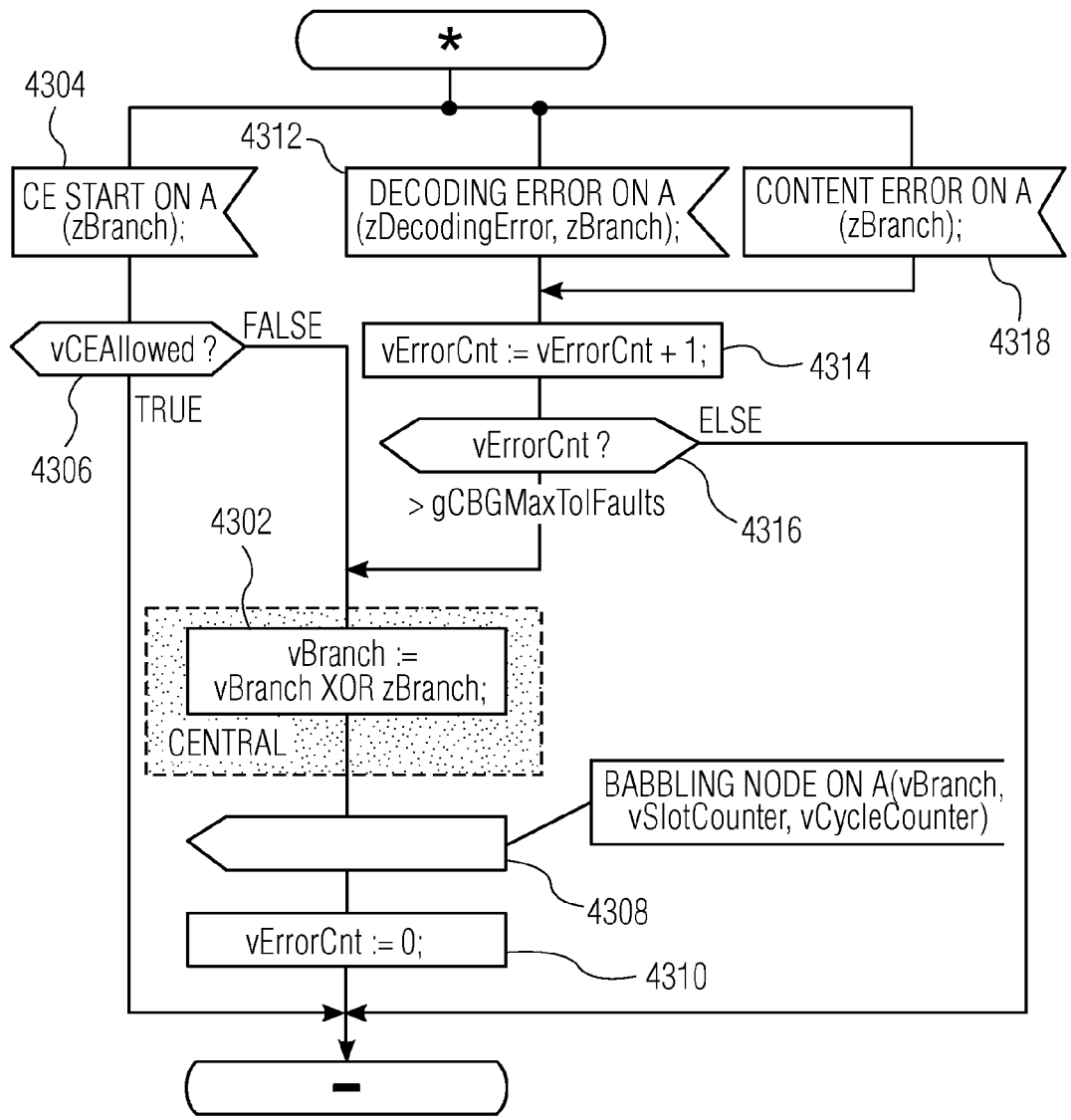
FIG. 43 illustrates the Babbling Idiot detection state.
Figure 44:
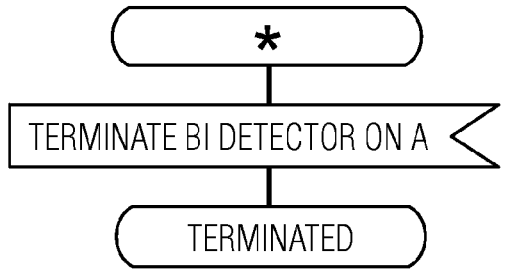
FIG. 44 illustrates the termination behavior of the Babbling Idiot detector.

FIG. 43 illustrates the Babbling Idiot detection state. The branch information is stored with an XOR operation of the old branch information and the argument zBranch 4302. The Babbling Idiot detector signals a babbling node on A event 4308, 4310 as shown in FIG. 43. When the action point on A is decoded, the vCEAllowed variable is set to true until the timer tFrameEnd signals the end of the window in which a CE start on A event is allowed 4304, 4306. A possible frame start is estimated during this phase. The Babbling Idiot detector reacts on decoding 4312 and content errors 4314, and counts them in the variable vErrorCnt 4314. If this variable exceeds the defined maximum value of gCBGMaxTolFaults, the branch information is stored and the babbling node on A event is signaled 4316. This detection is not bound to the static segment. A babbling node on A event contains the last used branch detected branch zBranch, the vSlotCounter, and the vCycleCounter 4308. After this event, the error counter is reset to zero 4310. FIG. 44 illustrates the termination behavior of the Babbling Idiot detector.

Error Containment

The error containment mechanism may react to the signals RLCN detected on A, DCN detected on A, and Babbling node detected on A. The error containment mechanism uses the received information to localize the faulty node on a particular branch. When the error containment mechanism is localized, it may block the communication for a specified time window or permanently from the branch in case of a central device or from the node itself in a local solution. In both cases the fault is contained and cannot propagate through the network.

In case of the RLCN and the DCN, other coldstart nodes may take the lead during this time. The misbehavior of the Babbling Idiot may be checked after expiration of the time window. When the Babbling Idiot node is not affecting the communication anymore, the branch including the Babbling Idiot node or the Babbling Idiot node may be allowed participate again.

A limitation of a central solution may be that one whole branch is removed from the network. This branch may include other properly functioning nodes. Further, if all coldstart nodes or sync nodes are placed on this branch it is possible that the network loses synchronization.

For all failure types, it may be beneficial to spread coldstart nodes and nodes for synchronization over multiple or all branches. This does not provide direct prevention of the failure, but when a failure is detected by a central device and a complete branch is blocked, it is necessary to have other coldstart nodes on other branches that can take the lead. Otherwise the failure affects the branch and after blocking this branch, it affects the whole network. Also, when all synchronization nodes are placed on this branch, the network loses its synchronization in the blocking phase. Hence, it may be beneficial to place coldstart nodes and sync nodes on different branches and to place one node more than the minimum requirement of the FlexRay Protocol Specification in the network, to still follow the specification if one branch is blocked.

For a local guardian, it may be beneficial to place at least three coldstart nodes in the network. The failure propagation and the startup failure may be prevented by blocking the faulty node. But this configuration is not very robust against failures on this bus line.

Hardware Implementation

Figure 45:
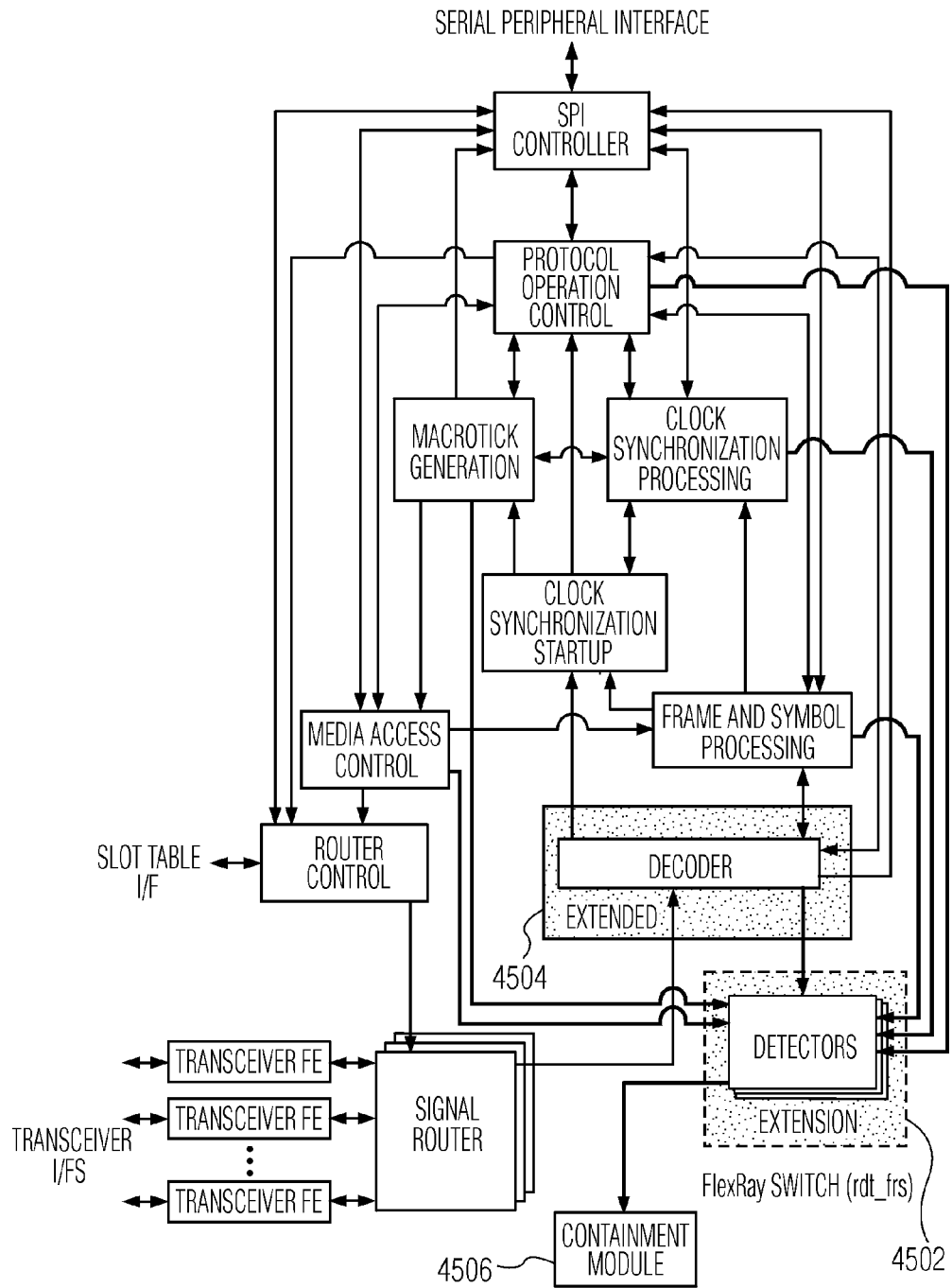
FIG. 45 illustrates an embodiment of a hardware implementation of a FlexRay network guardian.
Figure 46:
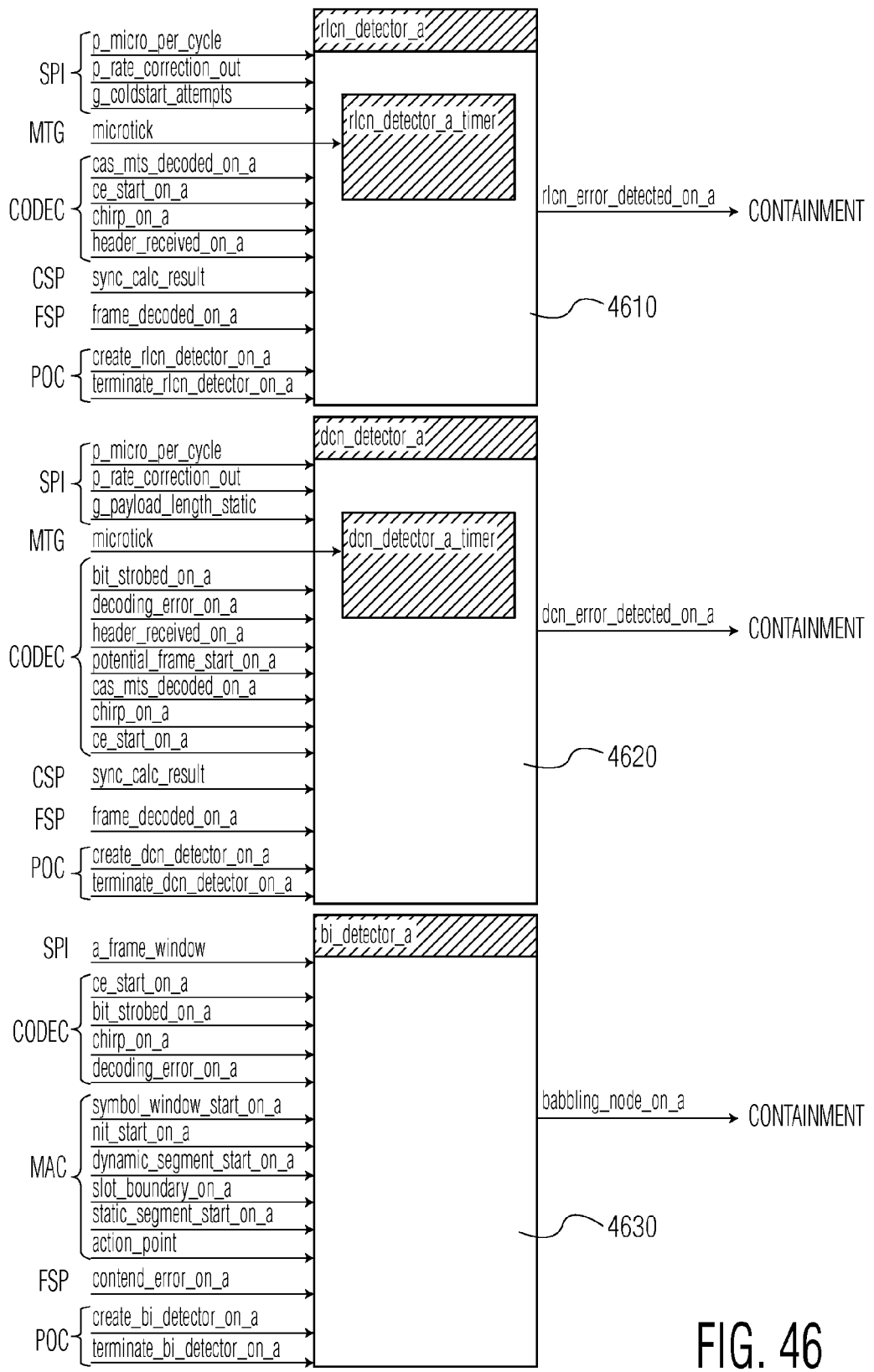
FIG. 46 illustrates that the signals from the FSP, CSP, MTG and MAC process are also connected to the decoders.

An example of a hardware implementation of a FlexRay network guardian may be accomplished by extending an existing design for a FlexRay Switch. FIG. 45 illustrates an embodiment of a hardware implementation of a FlexRay network guardian. The extensions from the existing design are the new signals from the POC to start and terminate the detectors, the detector modules 4502 and the extensions in the CODEC module 4504. The other elements in FIG. 45 otherwise function the same as the same elements in FIG. 3. FIG. 46 illustrates that the signals from the FSP, CSP, MTG and MAC process are also connected to the decoders. The existing design implies all reception related modules from the FlexRay Protocol Specification v. 3.0.1. The FlexRay network guardian may be configured to be used locally with one node or centrally. Both a central and a local implementation have to decode frames, synchronize with the network, and monitor the communication. This is done by the detector modules. The output is sent to a containment module 4506. The containment module 4506 may stop a branch or a node from transmitting for a defined time.

This implementation may be implemented using the hardware description language VHDL. Based on the modifications described with respect to FIGS. 25-45, the existing FlexRay design may be extended in the described way. The RLCN detector 4610, DCN detector 4620, and the BI detector 4630 may be separate circuits and use extra timer modules for the μT timers tSecondFrame and tAllowCAS. The RLCN detector 4610, DCN detector 4620, and the BI detector 4630 may be implemented as separate circuits each on its own integrated circuit (IC) or as separate circuits together on a single IC. Also any combination of the three detectors may be implemented together and used as a FlexRay network guardian based upon the requirements of the FlexRay network. Also, the complete FlexRay network guardian may be implemented on a single IC or as a combination of ICs.

The FlexRay network guardian, RLCN detector, DCN detector, and the BI detector have been described as being implemented as a fixed circuit in hardware because of benefits associated with cost and the speed needed in order to protect the network. It is possible to also implement the FlexRay network guardian, RLCN detector, DCN detector, and the BI detector in programmable logic or as software running on some sort of processor. Such an approach may be more expensive, but it does provide the possibility of upgrading the FlexRay network guardian, RLCN detector, DCN detector, and the BI detector.

SUMMARY

For the detection processes, it is helpful to know how the failure is affecting the ongoing communication in the network. It is not always possible to give direct positive proof for the presence of a particular failure from observing the bus, but with the use of the results from the failure analysis described above, it is possible to classify a given situation. When a possible failure propagation is detected, the relevant data is stored and propagated to the containment process.

Three different FlexRay network problems have been described: RLCN, DCN, and BI. Detectors to detect each problem have also been described. A FlexRay network implementation may include any combination of the three detectors described. Such detectors may also be associated with only a single node, single branch, or the whole network. Multiple detectors of the same type may be placed in the FlexRay network to protect specific nodes or branches as needed. The failure detectors may also be implemented in any type of FlexRay network architecture, for example, passive bus, active start, hybrid, etc.

It should be apparent from the foregoing description that various exemplary embodiments of the invention may be implemented in hardware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media. Further, as used herein, the term "processor" will be understood to encompass a microprocessor, field programmable gate array (FPGA), application-specific integrated circuit (ASIC), or any other device capable of performing the functions described herein.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:
1. A FlexRay network guardian comprising:
a resetting leading coldstart node (RLCN) detector configured to detect a RLCN failure;
a deaf coldstart node (DCN) detector configured to detect a DCN failure;
a babbling idiot (BI) detector configured to detect a BI failure; and
a FlexRay network decoder configured to output a signal regarding the status of the FlexRay network to the RLCN detector, DCN detector, and BI detector,
wherein the RLCN detector, DCN detector, and BI detector are configured to send an indication of a failure to a containment module.

2. The FlexRay network guardian of claim 1, wherein the RLCN detector, DCN detector, and BI detector receive signals regarding the status of the FlexRay network from a media access control device, a macrotick generation device, a frame and symbol processing device, a clock synchronizing processing device, and a protocol operation control device.

3. The FlexRay network guardian of claim 1, wherein the containment module disables one of a single node and a network branch in a FlexRay network.

4. The FlexRay network guardian of claim 1, wherein a portion of the received signals regarding the status of the FlexRay network are extensions to the FlexRay network protocol.

5. The FlexRay network guardian of claim 1, wherein the BI detector is further configured to:
   set a timer upon the detection of the BI failure;
   upon expiration of the set timer, determine that the BI failure has ceased;
   send an indication to the containment module that the BI failure has ceased.

6. The FlexRay network guardian of claim 1, wherein detecting a BI failure includes detecting a decoding error or a content error on the FlexRay network, incrementing an error count, and determining if the error count exceeds an error count threshold.

7. The FlexRay network guardian of claim 1, wherein detecting a RLCN failure includes detecting leading coldstart node resetting during one of a plurality of predetermined time periods indicative of a RLCN failure.

8. The FlexRay network guardian of claim 1, wherein detecting a DCN failure includes detecting when a second check failure occurs.

9. The FlexRay network guardian of claim 1, wherein detecting a DCN failure includes detecting when a second collision avoidance symbol (CAS) error occurs.

10. The FlexRay network guardian of claim 1, wherein detecting a DCN failure includes detecting when multiple nodes on a branch are sending data at the same time on the FlexRay network.

11. A FlexRay network guardian comprising:
   a resetting leading coldstart node (RLCN) detector configured to detect a RLCN failure;
   a deaf coldstart node (DCN) detector configured to detect a DCN failure;
   a babbling idiot (BI) detector configured to detect a BI failure;
   a FlexRay network decoder connected to the RLCN detector, DCN detector, and BI detector;
   a protocol operation control device connected to the FlexRay network decoder, RLCN detector, DCN detector, and BI detector;
   a macrotick generation device connected to the protocol operation control device, RLCN detector, DCN detector, and BI detector;
   a clock synchronization processing device connected to the protocol operation control device, macrotick generation device, RLCN detector, DCN detector, and BI detector;
   a frame and symbol processing device connected to the protocol operation control device,
   clock synchronization processing device, FlexRay network decoder, RLCN detector, DCN detector, and BI detector;
   a media access control device connected to the protocol operation control device, macrotick generation device, frame and symbol processing device, RLCN detector, DCN detector, and BI detector,
   wherein the RLCN detector, DCN detector, and BI detector receive signals regarding the status of the FlexRay network from the media access control device, the macrotick generation device, the frame and symbol processing device, the clock synchronizing processing device, FlexRay network decoder, and the protocol operation control device,
   wherein the RLCN detector, DCN detector, and BI detector are configured to send an indication of a failure to a containment module.

12. The FlexRay network guardian of claim 11, wherein the containment module disables a single node and a network branch in a FlexRay network.

13. The FlexRay network guardian of claim 11, wherein a portion of the received signals regarding the status of the FlexRay network are extensions to the FlexRay network protocol.

14. The FlexRay network guardian of claim 11, wherein the BI detector is further configured to:
   set a timer upon the detection of the BI failure;
   upon expiration of the set timer, determine that the BI failure has ceased;
   send an indication to the containment module that the BI failure has ceased.

15. The FlexRay network guardian of claim 11, wherein detecting a BI failure includes detecting a decoding error or a content error on the FlexRay network, incrementing an error count, and determining if the error count exceeds an error count threshold.

16. The FlexRay network guardian of claim 11, wherein detecting a RLCN failure includes detecting leading coldstart node resetting during one of a plurality of predetermined time periods indicative of a RLCN failure.

17. The FlexRay network guardian of claim 11, wherein detecting a DCN failure includes detecting when a second check failure occurs.

18. The FlexRay network guardian of claim 11, wherein detecting a DCN failure includes detecting when a second collision avoidance symbol (CAS) error occurs.

19. The FlexRay network guardian of claim 11 wherein detecting a DCN failure includes detecting when multiple nodes on a branch are sending data at the same time on the FlexRay network.

\* \* \* \* \*